(12) United States Patent
Futerman et al.

(10) Patent No.: US 12,300,862 B2
(45) Date of Patent: May 13, 2025

(54) BATCH SYSTEMS AND METHODS FOR HYDROGEN GAS EXTRACTION FROM A LIQUID HYDROGEN CARRIER

(71) Applicants: ELECTRIQ-GLOBAL ENERGY SOLUTIONS LTD., Tirat Carmel (IL); Roman Futerman, Nesher (IL); Erez Karasenti, Haifa (IL); Alexander Zilberman, Haifa (IL); Denis Ginzburg, Kadima Tzoran (IL)

(72) Inventors: Roman Futerman, Nesher (IL); Erez Karasenti, Haifa (IL); Alexander Zilberman, Haifa (IL); Denis Ginzburg, Kadima Tzoran (IL)

(73) Assignee: ELECTRO-GLOBAL ENERGY SOLUTIONS LTD., Tirat Carmel (IL)

( * ) Notice: Subject to any disclaimer, the term of this patent is extended or adjusted under 35 U.S.C. 154(b) by 986 days.

(21) Appl. No.: 17/048,543

(22) PCT Filed: Apr. 17, 2019

(86) PCT No.: PCT/IB2019/000483
§ 371 (c)(1),
(2) Date: Oct. 16, 2020

(87) PCT Pub. No.: WO2019/202391
PCT Pub. Date: Oct. 24, 2019

(65) Prior Publication Data
US 2021/0155476 A1    May 27, 2021

Related U.S. Application Data

(60) Provisional application No. 62/723,331, filed on Aug. 27, 2018, provisional application No. 62/658,635, filed on Apr. 17, 2018.

(51) Int. Cl.
*H01M 8/04082* (2016.01)
*B01J 16/00* (2006.01)
(Continued)

(52) U.S. Cl.
CPC ....... *H01M 8/04208* (2013.01); *B01J 16/005* (2013.01); *B01J 19/0013* (2013.01);
(Continued)

(58) Field of Classification Search
CPC . B01J 16/00; B01J 16/005; B01J 19/00; B01J 19/0006; B01J 19/0013; B01J 19/18;
(Continued)

(56) References Cited

U.S. PATENT DOCUMENTS

| 3,459,510 A | 8/1969 | Litz et al. |
| 6,534,033 B1 | 3/2003 | Amendola et al. |

(Continued)

FOREIGN PATENT DOCUMENTS

| CN | 201381220 Y | 1/2010 |
| CN | 201842638 U | 5/2011 |

(Continued)

OTHER PUBLICATIONS

Office Action issued in Chinese Patent Application No. 201980040908.6, dated Oct. 21, 2023, and translation thereof (19 pages).
(Continued)

*Primary Examiner* — Natasha E Young
(74) *Attorney, Agent, or Firm* — Finnegan, Henderson, Farabow, Garrett & Dunner, LLP

(57) ABSTRACT

A system for extracting hydrogen gas from a liquid hydrogen carrier may include a hydrogen gas reactor, a catalyst for facilitating extraction of the hydrogen gas from the liquid hydrogen carrier, and a reservoir for containing the liquid hydrogen carrier and a spend liquid hydrogen carrier. The system may be configured to regulate a flow of liquid
(Continued)

hydrogen carrier in and out of the hydrogen gas reactor, to move a catalyst relative to a volume of the liquid hydrogen carrier, and to provide a continuous flow of the hydrogen gas, in response to a demand for the hydrogen gas.

8 Claims, 31 Drawing Sheets

(51) Int. Cl.
| | |
|---|---|
| *B01J 19/00* | (2006.01) |
| *B01J 19/18* | (2006.01) |
| *B01J 27/185* | (2006.01) |
| *C01B 3/04* | (2006.01) |
| *C01B 3/06* | (2006.01) |
| *C01B 3/32* | (2006.01) |
| *F17C 11/00* | (2006.01) |
| *H01M 4/90* | (2006.01) |
| *H01M 8/065* | (2016.01) |

(52) U.S. Cl.
CPC .......... *B01J 19/18* (2013.01); *B01J 27/1853* (2013.01); *C01B 3/04* (2013.01); *C01B 3/065* (2013.01); *C01B 3/32* (2013.01); *F17C 11/005* (2013.01); *H01M 4/90* (2013.01); *H01M 8/04201* (2013.01); *H01M 8/04216* (2013.01); *H01M 8/065* (2013.01); *B01J 2219/00063* (2013.01); *B01J 2219/00162* (2013.01); *B01J 2523/305* (2013.01); *B01J 2523/51* (2013.01); *B01J 2523/845* (2013.01); *B01J 2523/847* (2013.01); *F17C 2201/018* (2013.01); *F17C 2221/012* (2013.01); *F17C 2270/0184* (2013.01); *H01M 2220/20* (2013.01); *H01M 2250/20* (2013.01)

(58) Field of Classification Search
CPC ........ B01J 19/24; B01J 19/248; B01J 19/249; B01J 27/00; B01J 27/14; B01J 27/185; B01J 27/1853; B01J 2219/00; B01J 2219/00049; B01J 2219/00051; B01J 2219/00054; B01J 2219/00056; B01J 2219/00058; B01J 2219/00063; B01J 2219/00162; B01J 2219/24; B01J 2219/2401; B01J 2219/245; B01J 2219/2451; B01J 2219/2453; B01J 2219/2476; B01J 2219/2477; B01J 2219/2479; B01J 2219/2491; B01J 2219/2493; B01J 2219/2495; B01J 2523/00; B01J 2523/30; B01J 2523/305; B01J 2523/50; B01J 2523/51; B01J 2523/80; B01J 2523/84; B01J 2523/845; B01J 2523/847; C01B 3/00; C01B 3/02; C01B 3/04; C01B 3/06; C01B 3/065; C01B 3/32; C01B 2203/00; C01B 2203/10; C01B 2203/1005; C01B 2203/1035; C01B 2203/16; C01B 2203/1685; F17C 11/00; F17C 11/005; F17C 2201/00; F17C 2201/01; F17C 2201/0176; F17C 2201/018; F17C 2221/00; F17C 2221/01; F17C 2221/012; F17C 2270/00; F17C 2270/01; F17C 2270/0165; F17C 2270/0184

See application file for complete search history.

(56) References Cited

U.S. PATENT DOCUMENTS

| | | |
|---|---|---|
| 6,932,847 B2 | 8/2005 | Amendola et al. |
| 7,097,813 B2 | 8/2006 | Ord et al. |
| 7,220,290 B2 | 5/2007 | Amendola et al. |
| 7,316,718 B2 | 1/2008 | Amendola et al. |
| 7,530,931 B2 | 5/2009 | Amendola et al. |
| 7,540,892 B2 | 6/2009 | Strizki et al. |
| 7,585,338 B2 | 9/2009 | Yoshizaki |
| 7,674,540 B2 | 3/2010 | Adams et al. |
| 8,506,659 B2 | 8/2013 | Ord et al. |
| 8,530,102 B2 | 9/2013 | Sarata et al. |
| 8,764,858 B2 | 7/2014 | Barton et al. |
| 8,802,052 B2* | 8/2014 | Chen .................. C01B 3/16 423/655 |
| 8,821,834 B2 | 9/2014 | Curello et al. |
| 9,102,528 B2 | 8/2015 | Wallace et al. |
| 9,266,727 B2 | 2/2016 | Stimits et al. |
| 9,669,371 B2 | 6/2017 | Wallace et al. |
| 9,845,239 B2 | 12/2017 | Wallace et al. |
| 2003/0009942 A1 | 1/2003 | Amendola et al. |
| 2003/0037487 A1 | 2/2003 | Amendola et al. |
| 2006/0147776 A1 | 7/2006 | Sarata et al. |
| 2009/0110974 A1* | 4/2009 | Yoon .................. C01B 3/065 429/444 |
| 2009/0155642 A1 | 6/2009 | Popham |
| 2012/0195825 A1* | 8/2012 | Koschany ............ C01B 3/065 422/119 |
| 2014/0193304 A1 | 7/2014 | Cenci et al. |
| 2016/0087294 A1 | 3/2016 | Rosenzweig et al. |

FOREIGN PATENT DOCUMENTS

| | | |
|---|---|---|
| CN | 104973567 A | 10/2015 |
| CN | 104973568 A | 10/2015 |
| CN | 107098310 A | 8/2017 |
| EP | 3006803 | 9/2017 |
| ES | 2387171 | 8/2013 |
| JP | 2009 242232 A | 10/2009 |
| JP | 4899474 | 3/2012 |
| JP | 2012 508093 A | 4/2012 |
| WO | WO 2010/051557 A | 5/2010 |
| WO | WO 2016/161955 A | 10/2016 |
| WO | WO2017/127022 | 7/2017 |

OTHER PUBLICATIONS

Examination Report issued in European Patent Application No. 19742248.8-1108, dated Sep. 13, 2022 (5 pages).
International Search Report and Written Opinion issued Dec. 12, 2019, in International Application No. PCT/IB2019/000483 (18 pgs.).
Office Action issued in Japanese Patent Application No. 2021-506077, dated May 30, 2023, and translation thereof (7 pages).
Office Action issued for Indian Patent Application No. 202017049920, dated Feb. 28, 2024 (6 pages).
Office Action issued in Australian Patent Application No. 2019253968, dated Jun. 11, 2024 (4 pages).

* cited by examiner

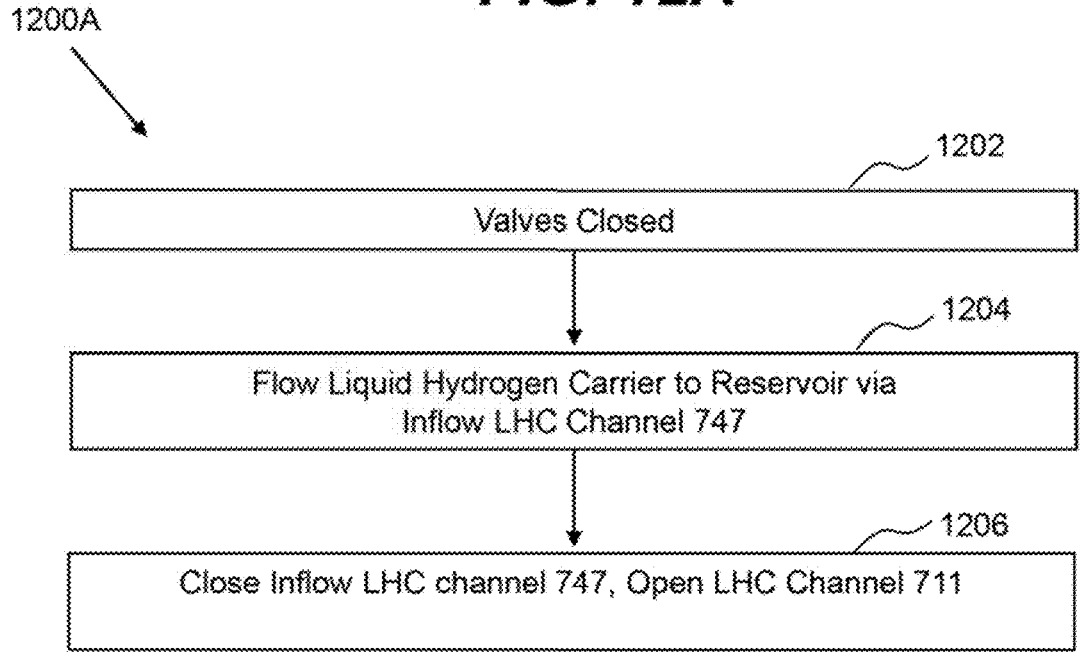
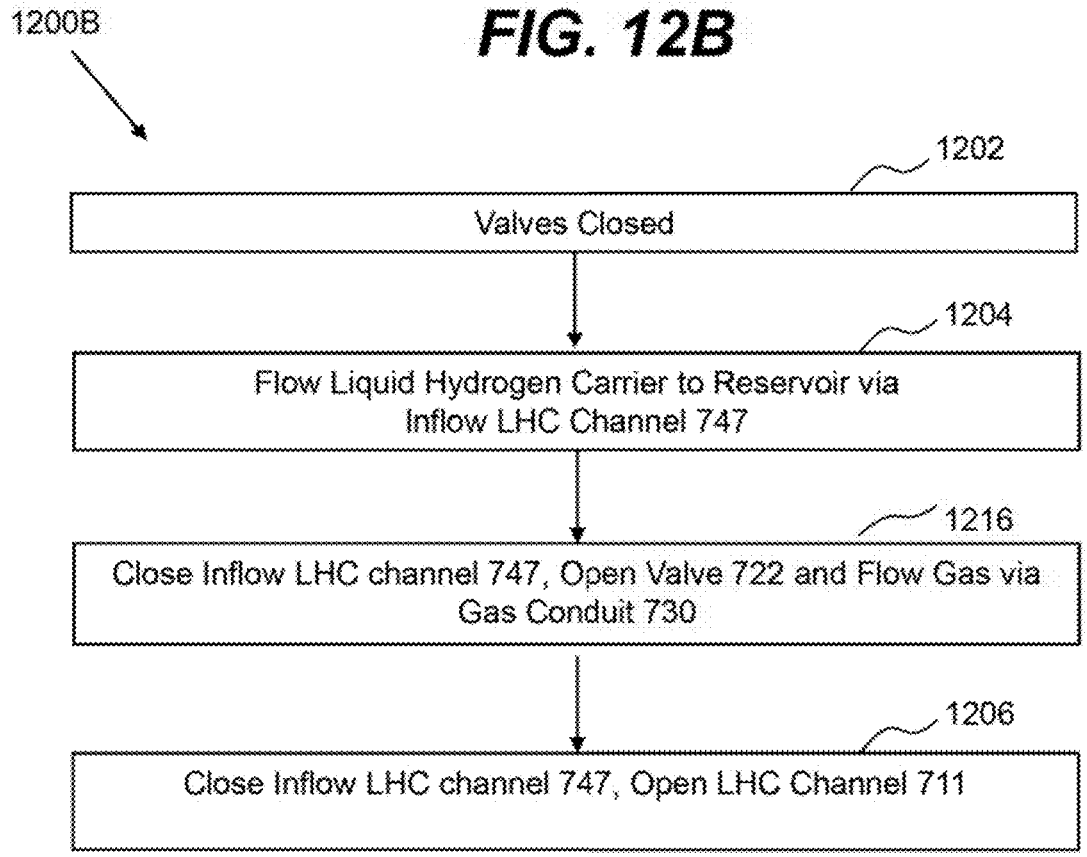

BATCH SYSTEMS AND METHODS FOR
HYDROGEN GAS EXTRACTION FROM A
LIQUID HYDROGEN CARRIER

CROSS REFERENCES TO RELATED
APPLICATIONS

This application is a national stage entry under 35 U.S.C. § 371 based on International Application No. PCT/IB2019/000483, now WO 2019/202391, filed on Apr. 17, 2019, and claims the benefit of U.S. Provisional Application No. 62/658,635, filed on Apr. 17, 2018, and U.S. Provisional Application No. 62/723,331 filed on Aug. 27, 2018. Each of the foregoing applications is incorporated herein by reference in its entirety.

TECHNICAL FIELD

The present disclosure generally relates to a system for extracting hydrogen from a liquid hydrogen carrier. In particular, the present disclosure relates to a system for obtaining hydrogen from a liquid hydrogen carrier using a catalyst placed in a hydrogen gas reactor.

BACKGROUND

With the limited supply of fossil fuels and their adverse effect on the climate and the environment, it has become a global priority to seek alternate sources of energy that are clean, abundant, and sustainable. While sources such as solar, wind, and hydrogen can meet the world's energy demand, considerable challenges remain to find materials that can store and/or convert energy efficiently.

Hydrogen has become an increasingly attractive source for clean energy production in recent years. Hydrogen, which has the highest energy per mass of any fuel, may provide a highly efficient zero-emission energy source for mobility devices, such as cars, bicycles, aircraft or other electric vehicles. However, considerable challenges related to hydrogen extraction from a liquid hydrogen carrier still need to be addressed in order to use hydrogen for transportation purposes.

At ambient conditions, hydrogen is a volatile gas. One kg of hydrogen occupies 11.2 m$^3$ (~100 g/m$^3$)—a volume that may be impractically large for certain hydrogen-based energy applications. One goal in hydrogen utilization, therefore, is the reduction of hydrogen volume, either by compression, liquefaction, adsorption to high surface area materials, or embedding in solid compounds. Solid state hydrogen storage may result in high hydrogen volumetric densities, exceeding a volumetric density of liquid hydrogen, for example, by more than a factor of two. Other challenges from the materials perspective may include combined volumetric and gravimetric hydrogen density that may be required for use in the transportation industry (e.g., 5.5 mass % $H_2$ and 40 kg$H_2$/m$^3$, respectively), suitable thermodynamic stability for the working temperature (e.g., −40 to 200° C.), and sufficiently fast reaction kinetics to allow rapid hydrogen uptake and delivery (e.g., refueling of 5 kg of $H_2$ in few minutes).

Metal hydrides and metal borohydrides may offer a hydrogen storage medium. Metal borohydrides may be dissolved in a liquid, such as water, resulting in a liquid hydrogen carrier. Metal borohydrides may be capable of storing hydrogen at targets levels of 100 g of $H_2$ per liter of the liquid carrier. Under appropriate temperature and pressure conditions, metal borohydrides may release hydrogen that can be used as a fuel (e.g., for a fuel cell). Efficiently releasing hydrogen from such a liquid carrier and/or gaining access to most or all of the hydrogen stored in a liquid carrier, however, may present certain challenges. Thus, there is a need to develop solutions for the efficient production of hydrogen from a liquid hydrogen carrier resulting in a spent liquid hydrogen carrier containing a low concentration of hydrogen.

Consistent with a disclosed embodiment, a system for extracting hydrogen gas from a liquid hydrogen carrier is provided. The system may include a hydrogen gas reactor including a catalyst configured to generate the hydrogen gas after exposure to the liquid hydrogen carrier, a liquid hydrogen carrier channel for flowing the liquid hydrogen carrier into the hydrogen gas reactor, and a hydrogen gas outlet through which the generated hydrogen gas is flowed front the hydrogen gas reactor. The system may be configured such that in response to an increase in a hydrogen gas flow rate through the hydrogen gas outlet, a volume of the liquid hydrogen carrier within the hydrogen gas reactor is increased, and the system may be configured such that in response to a decrease in the hydrogen gas flow rate through the hydrogen gas outlet, the volume of the liquid hydrogen carrier within the hydrogen gas reactor is decreased.

Consistent with another disclosed embodiment, a method for extracting hydrogen gas from a liquid hydrogen carrier using a hydrogen gas reactor and a liquid hydrogen carrier reservoir fluidly connected to the hydrogen gas reactor by a liquid hydrogen carrier channel is provided. The method may include flowing the liquid hydrogen carrier between liquid hydrogen carrier reservoir and the hydrogen gas reactor through the liquid hydrogen carrier channel, in response to a pressure difference between the hydrogen gas reactor and the liquid hydrogen carrier reservoir. The method may further include extracting the hydrogen gas in the hydrogen gas reactor by exposing a surface of a catalyst, to the liquid hydrogen carrier, the catalyst disposed within the hydrogen gas tractor, and flowing the hydrogen gas from the hydrogen gas reactor via a hydrogen gas outlet.

Consistent with another disclosed embodiment, a method or extracting hydrogen gas from a liquid hydrogen carrier using a hydrogen gas reactor and a liquid hydrogen carrier reservoir fluidly connected to the hydrogen gas reactor is provided. The method may include flowing the liquid hydrogen carrier from the liquid hydrogen carrier reservoir into the hydrogen gas reactor through a first liquid hydrogen carrier channel, in response to a force of gravity. The method may further include exposing a surface of a catalyst, to the liquid hydrogen carrier, the catalyst being disposed within the hydrogen gas reactor, extracting the hydrogen gas in the hydrogen gas reactor in response to the exposure of the surface of the catalyst, to the liquid hydrogen carrier, and flowing the hydrogen gas from the hydrogen gas reactor into the liquid hydrogen carrier reservoir via a gas connecting channel. The method may further include flowing the hydrogen gas from the hydrogen gas reactor via a hydrogen gas outlet, and flowing the liquid hydrogen carrier between liquid hydrogen carrier reservoir and the hydrogen gas reactor through a second liquid hydrogen carrier channel, in response to a pressure difference between the hydrogen gas reactor and the liquid hydrogen carrier reservoir.

Consistent with another disclosed embodiment, a system for extracting hydrogen gas using a liquid hydrogen carrier is provided. The system may include a hydrogen gas reactor comprising an enclosure, the enclosure being configured to hold the liquid hydrogen carrier, and a catalyst configured to selectively move into and out of the liquid hydrogen carrier, when the liquid hydrogen carrier is present in the hydrogen gas reactor, to generate the hydrogen gas in response to contact between the catalyst and the liquid hydrogen carrier.

Consistent with another disclosed embodiment, a system for extracting hydrogen gas using a liquid hydrogen carrier is provided. The system may include a hydrogen gas reactor including an enclosure, a catalyst disposed within the enclosure, and at least one movable element configured to selectively move the liquid hydrogen carrier relative to the catalyst in order to change a surface area of the catalyst exposed to the liquid hydrogen carrier.

Consistent with another disclosed embodiment, a method for extracting hydrogen gas in a hydrogen gas reactor using a liquid hydrogen carrier is provided. The method may include receiving at least one indicator associated with a demand for a change in a flow rate of the hydrogen gas from the hydrogen gas reactor, and in response to the received at least one indicator, causing relative motion between a catalyst and the liquid hydrogen carrier to change an amount of a surface area of the catalyst contacted by the liquid hydrogen carrier.

Consistent with another disclosed embodiment, a system for extracting hydrogen gas from a liquid hydrogen carrier is provided. The system may include a first hydrogen gas reactor having a first hydrogen gas outlet, at least a second hydrogen gas reactor having a second hydrogen gas outlet, and a hydrogen gas flow conduit, wherein the hydrogen gas flow conduit includes a first branch configured to carry hydrogen gas received from the first hydrogen gas outlet to a check valve, a second branch configured to carry hydrogen gas received from the second hydrogen gas outlet to the check valve, and an outflow end. The first and the second hydrogen gas reactors may be configured to extract hydrogen gas by exposing the liquid hydrogen carrier to a catalyst. Further, the check valve may be configured to flow hydrogen gas from the first branch to the outflow end and block a flow of hydrogen gas from the second branch to the outflow end, when a hydrogen gas pressure in the first branch is higher than a hydrogen gas pressure in the second branch, and the check valve may be configured to flow hydrogen gas from the second branch to the outflow end and block a flow of hydrogen gas from the first branch to the outflow end, when the hydrogen gas pressure in the second branch is higher than the hydrogen gas pressure in the first branch.

Consistent with another disclosed embodiment, a system for extracting hydrogen gas using a liquid hydrogen carrier is provided. The system may include a first hydrogen gas reactor having a first gas outlet, the first gas outlet including a first check valve having a first inflow side and a first outflow side, and a second hydrogen gas reactor having a second gas outlet, the second gas outlet including a second check valve having a second inflow side and a second outflow side. The system may further include a hydrogen gas flow conduit. The hydrogen gas flow conduit may include a first branch configured to carry hydrogen gas received from the first gas outlet, a second branch configured to carry hydrogen gas received from the second gas outlet, and an outflow end. The first and second hydrogen gas reactors may be configured to extract hydrogen gas by exposing the liquid hydrogen carrier to a catalyst. Further, the first check valve may be configured to allow a flow of the hydrogen gas from the first hydrogen gas reactor to the outflow end when pressure difference between the first inflow side and the first outflow side is positive and above a threshold value, and the second check valve may be configured to allow a flow of the hydrogen gas from the second hydrogen gas reactor to the outflow end when pressure difference between the second inflow side and the second outflow side is positive and above a threshold value.

Consistent with another disclosed embodiment, a method for extracting hydrogen gas from a liquid hydrogen carrier is provided. The method may include generating hydrogen gas in a first hydrogen gas reactor by exposing a first liquid hydrogen carrier in the first hydrogen gas reactor to a first catalyst, supplying the generated hydrogen gas from the first hydrogen gas reactor to a check valve in fluid communication with a first hydrogen gas outlet associated with the first hydrogen gas reactor, and generating hydrogen gas in a second hydrogen gas reactor by exposing a second liquid hydrogen carrier in the second hydrogen gas reactor to a second catalyst. The method may further include supplying the generated hydrogen gas from the second hydrogen gas reactor to the check valve. The check valve may be in fluid communication with a second hydrogen gas outlet associated with the second hydrogen gas reactor. The method may further include flowing the generated hydrogen gas from the first hydrogen gas reactor through the check valve and blocking a flow of hydrogen gas from the second hydrogen gas reactor through the check valve, when a hydrogen gas pressure associated with the first hydrogen gas outlet of the first hydrogen, gas reactor is higher than a hydrogen gas pressure associated with the second hydrogen gas outlet of the second hydrogen gas reactor. The method may further include flowing the generated hydrogen gas from the second hydrogen gas reactor through the check valve and blocking a flow of hydrogen gas from the first hydrogen gas reactor through the check valve, when a hydrogen gas pressure associated with the second hydrogen gas outlet of the second hydrogen gas reactor is higher than a hydrogen gas pressure associated with the first hydrogen gas outlet of the first hydrogen gas reactor.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIGS. 12A-12E show exemplary processes for stalling a system for hydrogen extraction consistent with disclosed embodiments.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The present disclosure relates to systems and methods for production of hydrogen gas from a liquid hydrogen carrier. The disclosed methods and systems, for example, may be used to provide an on-demand source of hydrogen, for example, to support a fuel-cell system requiring on-demand hydrogen production. In some embodiments, the disclosed systems and methods may be used to supply hydrogen for powering an electric vehicle such as a car, truck, bicycle, moped, golf-cart, aircraft, or spacecraft. The disclosed systems may also be, used to supply hydrogen for powering electronic devices, such as a cell phone or other mobile device, a laptop, a personal computer, a camera, a wearable electronic device, an IoT device, a medical device, a remote-controlled car or drone, or any other electronic device. The applications above are exemplary only, and the disclosed systems may be used to generate hydrogen in a variety of other applications.

Figure 1:
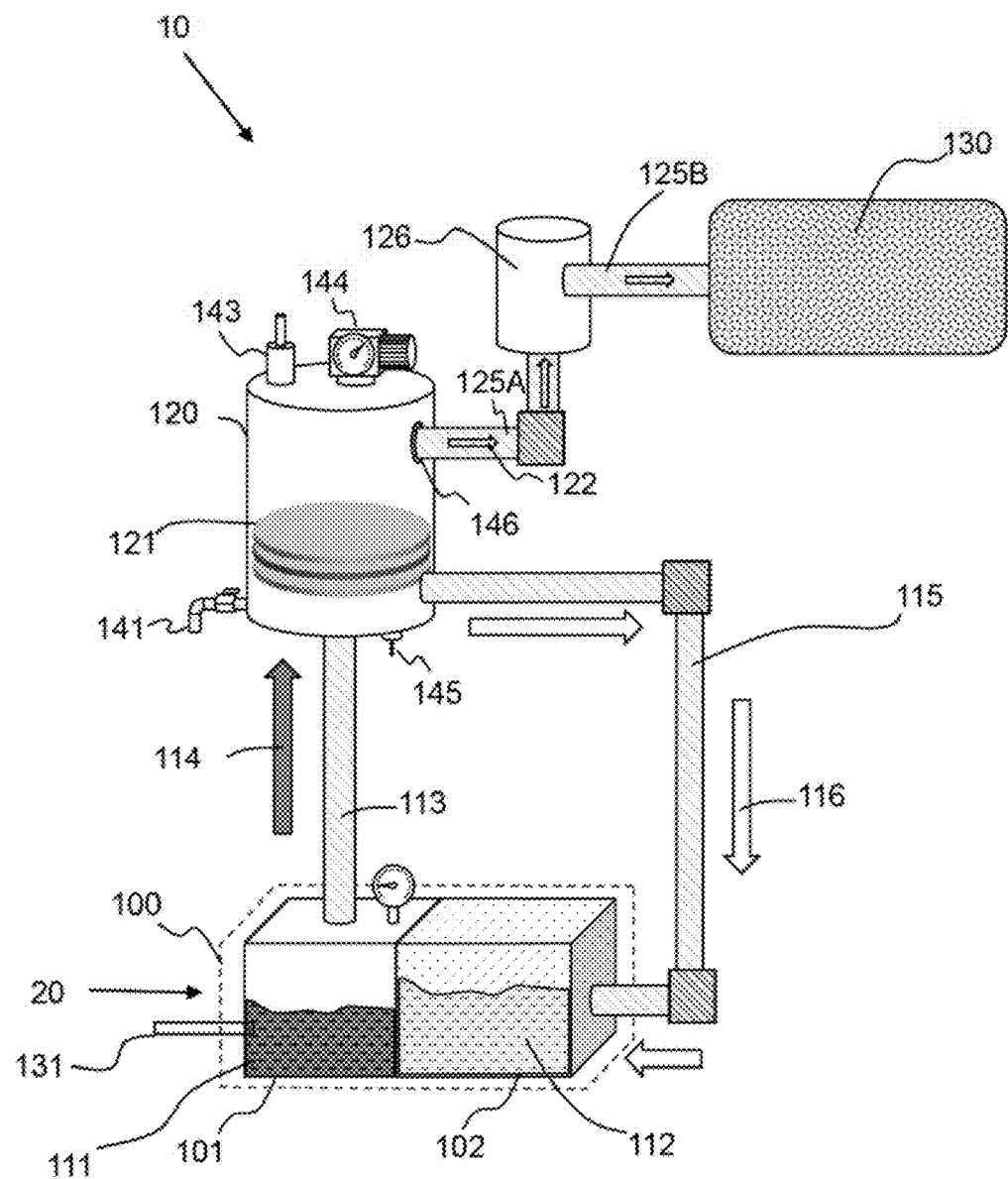
FIG. 1 illustrates an exemplary system for hydrogen extraction consistent with disclosed embodiments.
Figure 1:
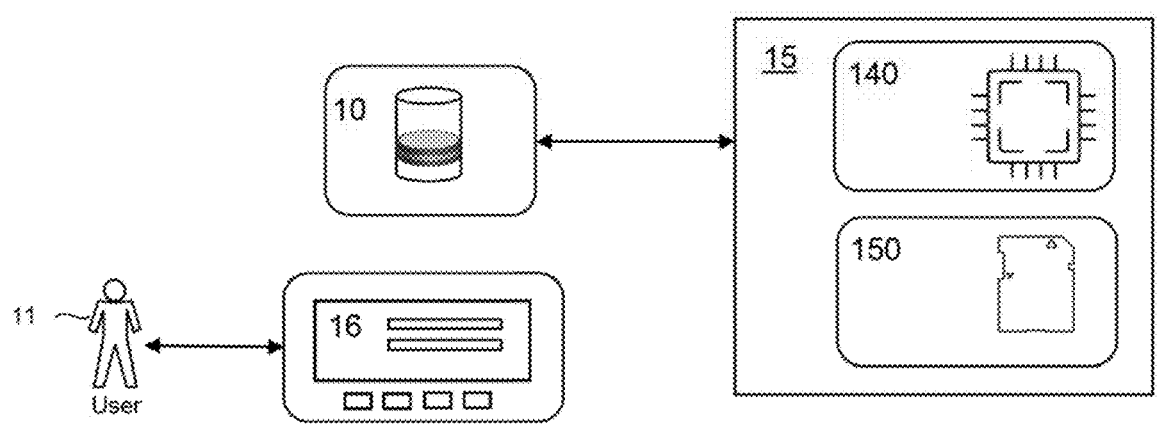

FIG. 1 shows an exemplary embodiment of a hydrogen generating system 10. Hydrogen generating system 10 may include a storage system 20 for storing a hydrogen liquid carrier. Storage system 20 may include a liquid hydrogen carrier tank 100, a carrier outlet line 113, (arrow 114 indicates a flow of a liquid hydrogen carrier), and a spent liquid hydrogen carrier inlet line 115 (arrow 116 indicates a flow of a spent liquid hydrogen carrier). Liquid hydrogen carrier tank 100 may also include a liquid hydrogen carrier inlet 131 to receive a liquid hydrogen carrier. Liquid hydrogen carrier tank 100 may be configured to store liquid hydrogen carrier for extraction of hydrogen in accordance with the disclosed embodiments. Liquid hydrogen carrier tank 100 may supply liquid hydrogen carrier to a hydrogen gas reactor (hydrogen gas reactor) 120 through carrier outlet line 113 for extraction of hydrogen within hydrogen gas reactor 120, as described in further detail below. In some embodiments, liquid hydrogen carrier tank 100 may include two chambers (e.g., chambers 101 and 102), as shown in FIG. 1. In such embodiments, chamber 101 may be configured to store a liquid hydrogen carrier 111 for supply to the hydrogen gas reactor 120. Chamber 102 may be configured to store a spent liquid hydrogen carrier 112 produced during the hydrogen extraction process, which may be received through spent liquid hydrogen carrier line 115, as shown in FIG. 1. Alternatively, liquid hydrogen carrier tank 100 may include a single chamber, and storage system 20 may have separate tanks for storing liquid hydrogen carrier and spent liquid hydrogen carrier 112. Liquid hydrogen carrier tank 100 may be made of a material that has relatively high resistance to extreme alkaline conditions (e.g., pH>14) of liquid hydrogen carrier 111. For example, liquid hydrogen carrier tank 100 may be made of or coated with an alkaline-resistant polymer, such as a polyolefin plastic, polytetrafluoroethylene (Teflon®), polyvinylidene fluoride, etc. In some embodiments, liquid hydrogen carrier tank 100 may also be made of an alkaline-resistant metal, such as 316 stainless steel, Monel®, Inconel®, Incoloy®, Hastelloy®, or the like. Additionally or alternatively, liquid hydrogen carrier tank 100 may include a fluoropolymer layer such as PTFE, PTFA, FEP, Hiperflon® and the like. Liquid hydrogen carrier tank 100 may also include purge tube 142 for expelling fluid from the tank.

Liquid hydrogen carrier 111 may be any liquid suitable for producing hydrogen when placed in contact with a catalyst. Liquid hydrogen carrier 111 may include metal borohydrides or other materials suitable for hydrogen. In an illustrative embodiment, metal borohydrides may include any chemical compound that may be described by formula $M^1$-$BH_4$, where $M^1$ may be a metal selected from Group 1 of the periodic table of elements, as defined by the International Union of Pure and Applied Chemistry (IUPAC), or alloys of metals selected from Group 1 of the periodic table of elements. In an illustrative embodiment, metal $M^1$ may include Li, Na, K, Rh, Cs, Ca, and Fr. In some embodiments, however, metal $M^1$ may be selected from Group 2 of the periodic table and may include Mg and Be. Alternatively, $M^1$ metal may also include Al, Ti, Be, Zn, Sc, Ca or other suitable metals.

In some embodiments, liquid hydrogen carrier 111 may include chemical compounds containing more than one metal. In an illustrative embodiment, liquid hydrogen carrier 111 may include ternary hydrides with a chemical compound described by a formula $M^{1a}M^{1b}$-$H_4$, where $M^{1a}$ and $M^{1b}$ may be metals. In an example embodiment, $M^{1a}$ may include Li, Na, K, Rb, Cs, Ti, Be, Zn, Fr, or other suitable metals. In an example embodiment, $M^{1b}$ may include B, Al, Ni, Zn, Be, Ca, Sc, Ti, or other suitable metals. Additionally, or alternatively, liquid hydrogen carrier may include quaternary hydrides, such as Li—B—N—H or other suitable quaternary hydrides described by formula $M^{1a}M^{1b}M^{1c}$-$H_4$.

Liquid hydrogen carrier 111 may include other chemical compounds other than an aqueous solution of metal borohydrides. For example, liquid hydrogen carrier may include solubility-enhancing chemicals or stabilizers, such as soluble metal hydroxides (e.g., potassium hydroxide). Other usable stabilizers may include potassium hydroxide or lithium hydroxide, among others. The liquid component of a liquid hydrogen carrier may include any suitable liquid. Such liquids may include water or alcohols. Liquid hydrogen carrier 111 may also include additives, stabilizers, or other reaction enhancers, such as potassium hydroxide as a stabilizer, and surfactant, or thickener of gelation agent. Liquid hydrogen carrier 111 may be a marketed liquid borohydride such as Electriq Global (EG) E-Fuel.

Liquid hydrogen carrier 111 may iodide other chemical compounds other than an aqueous solution of metal hydrides or metal borohydrides. For example, liquid hydrogen carrier 111 may include solubility-enhancing chemicals or stabilizers, such as soluble metal hydroxides (e.g., sodium hydroxide). Other usable stabilizers may include potassium hydroxide or lithium hydroxide, among others. The liquid component of liquid hydrogen carrier 111 may include any suitable liquid. Such liquids may include water or alcohols. The liquid carrier may also include additives, stabilizers, or other reaction enhancers, such as sodium hydroxide as a stabilizer, a polyglycol is a surfactant, or many others. As used herein, liquids may include any fluid or substance that flows and has constant (or nearly constant) volume. Liquids may include flowable media that conforms to the shape of its container. The liquids of the disclosed embodiments may exhibit a wide range of viscosities. In some cases, the disclosed liquids may have viscosities similar to or less than water. In other cases, the disclosed liquids may have viscosities greater than water. The disclosed liquids may have viscosities of 1 cP or less. In other cases, however, the disclosed liquids may have viscosities greater than 1 cP, greater than 10 cP, greater than 100 cP, or greater than 1000 cP. In some example, the disclosed liquids may include a watery consistency. In other cases, the disclosed liquids may exhibit a paste-like consistency. The disclosed liquids may include flowable media, such as paste, colloidal solutions. Bingham plastic fluids, suspensions and the like.

In various embodiments, system 10 may include a catalyst 121, which may include any suitable catalyst for facilitating hydrogen production. For example, catalyst 121 may include transition metals, such as Fe, Co, Cu, Ni, Ru, Pt, B, alloys, and combinations thereof. In some embodiments, catalyst 121 may include a Group III metal, Cobalt-P, Cobalt-B, Cobalt-Ni, P and Cobalt-NIB or Electriq Global™ E-Switch. In accordance with the present disclosure the catalyst: may include a metal structure and a catalytic coating on the metal structure. The coating may include an material suitable for facilitating, the production of hydrogen when in contact with liquid hydrogen carrier 111. For example, the coating may include a layer including Ni. In some cases, the coating may include an outer layer disposed on the inner layer. The outer layer may include a component that is catalytic to the hydrogen production process. In some embodiments, the outer layer may include a Group III metal (e.g., Cobalt-P, Cobalt-B, Cobalt-Ni,P and Cobalt-NIB). The outer layer may be applied using various coating or plating methods.

Certain coating materials and techniques may be used depending on hydrogen production requirements. For example, Cobalt-P may be deposited on a nickel cathode under induced constant-potential conditions to achieve a homogenous coating with a relatively uniform cluster size and distribution compared to other techniques. Catalysts prepared by deposition of Cobalt-P at induced constant potential may also produce a higher hydrogen flow over time and exhibit a higher durability compared to catalysts plated using other techniques. It is understood, however, that other coating or plating techniques, such as electroless deposition or electrodeposition may be used.

In some embodiments, the metal structure of the catalyst may be composed of stainless steel. The catalytic coating on the metal structure (e.g., a Ni-based coating) may include a certain roughness value or range of roughness values, which may facilitate interaction between the catalyst material and liquid hydrogen carrier. In some embodiments, the catalyst coating including a Ni layer may have a roughness value between 6.3-25 μm calculated as the Roughness Average (Ra). While the present disclosure provides examples of exemplary roughness values, it should be noted that aspects of the disclosure in their broadest sense, are, not limited to these particular values.

Liquid hydrogen carrier 111 may be configured such that liquid hydrogen carrier 111 decomposes to release hydrogen when placed in fluid contact with the catalyst. In various embodiments, the chemical reaction between reactants, such as $M^1BH_4$ and water may be performed when reactants are dissolved in water. The $M^1BH_4$-based carrier may be stored for prolonged periods of time without significant decomposition. However, in the presence of the catalyst 121, and at wide temperature range, the carrier may generate hydrogen. For example, a reaction may be described by the following exemplary formula: $M^1BH_4 + 2H_2O \rightarrow MBO_2 + 4H_2$. The generated hydrogen ($4H_2$) may then be used for consumption by the fuel cell or another device. In various embodiments, spent liquid hydrogen carrier 112 is formed during a reaction when hydrogen is released from a liquid hydrogen carrier. In an illustrative embodiment, an aqueous solution of $M^1$-$BH_4$ may be used as a liquid hydrogen carrier, and via chemical reaction, may release hydrogen and form spent liquid hydrogen carrier 112, that may be an aqueous solution of metal borate. While an aqueous solution of metal borate is one example of spent liquid hydrogen carrier 112, carrier 112 may include various other chemical compounds. In an illustrative process, when metal hydrides are used as a liquid hydrogen carrier, the resulting spent liquid hydrogen carrier 112 may include metals and metaborates.

Hydrogen generating system 10 may further include hydrogen gas reactor 120 for producing hydrogen. For example, liquid hydrogen carrier 111 may release hydrogen in hydrogen gas reactor 120 when in contact with a catalyst 121, as described above. Hydrogen gas reactor 120 may be configured to facilitate the extraction of hydrogen, for example by adjusting or changing the surface area of the catalyst 121 based on the amount of carrier within hydrogen gas reactor 120. For example, hydrogen gas reactor 120 may be configured to reduce the spacing between catalysts 121 in order to increase the wetted surface area of the catalysts, thereby increasing the hydrogen gas production. Hydrogen gas reactor 120 may further include at least one of a pressure regulator 144, safety valve 143 and/or a thermocouple sensor 145. Hydrogen gas reactor 120 may be made of or coated with a material that has relatively high resistance to extreme alkaline conditions (e.g., pH>14) of liquid hydrogen carrier 111 and/or has relatively high heat transfer properties. For example, hydrogen gas reactor 120 may be made of 316 stainless steel, Monel®, Inconcl®, Incoloy®, Hastelloy®, or other alkaline-resistant materials. Hydrogen gas reactor 120 may also include purge tube 141 for expelling liquid hydrogen carrier (or spent liquid hydrogen carrier) from reactor 120.

Figure 3A:
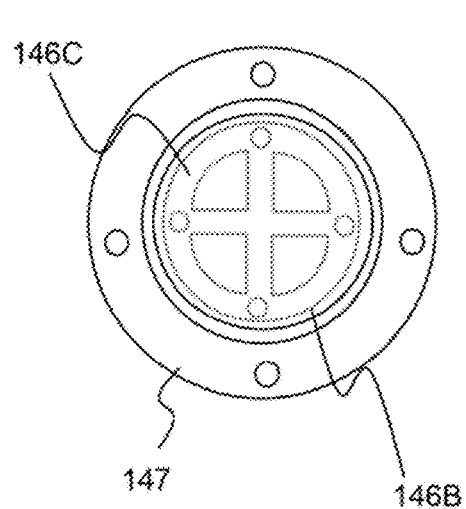
FIGS. 3A and 3B are schematic illustrations of a filter for a system for hydrogen extraction consistent with disclosed embodiments.
Figure 3B:
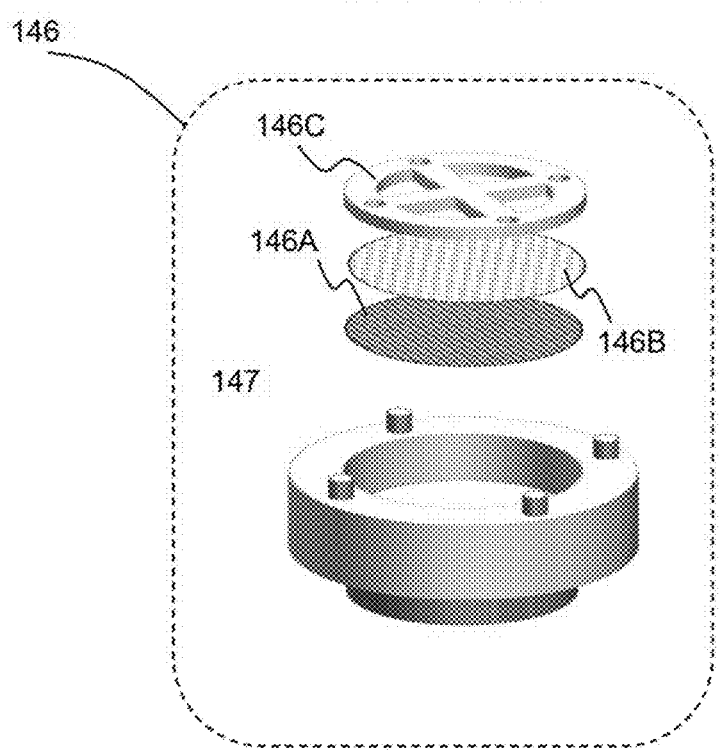

As shown in FIG. 1, a hydrogen outflow line 125A (arrow 122 indicates the direction of hydrogen flow) may deliver hydrogen front hydrogen gas reactor 120 to a hydrogen storage chamber 126. Chamber 126 may then deliver hydrogen via a hydrogen line 125B to a fuel cell 130. Hydrogen gas reactor 120 may further include a filter 146, described in more detail below in FIG. 3A and FIG. 3B. FIG. 3A slows a top view of filter 146 and FIG. 3B shows a three-dimensional view of filter 146. Filter 146 may be arranged to filter a gas-mist mixture (e.g., produced during the catalyzed hydrolysis reaction within hydrogen gas reactor 120) from the hydrogen to protect fuel cell 130 from damage. Filter 146 may be embedded within hydrogen gas reactor 120, e.g., adjacent to hydrogen outlet 125A. In some embodiments, filter 146 may be embedded within a covering of hydrogen gas reactor 120.

In various embodiments, generated hydrogen may be delivered via outflow line 125A to hydrogen storage chamber 126 and, subsequently, to fuel cell 130. In various embodiments, system 10 may include pressure sensors and pressure pumps (not shown in FIG. 1) facilitating the flow of a liquid hydrogen carrier, spent liquid hydrogen carrier 112, and flow of hydrogen through lines 113, 115, 125A and 125B. For example, a pump may be used to pump liquid hydrogen carrier 111 into a pressurized hydrogen gas reactor 120. In some embodiments, liquid hydrogen carrier 111 may flow into hydrogen gas reactor 120 as hydrogen is released from hydrogen gas reactor 120 and stored in hydrogen chamber 126. In an example embodiment, a pump may be used to transfer hydrogen from hydrogen gas reactor 120 to chamber 126.

System 10 may also include controllers that may be operated by a computing system 15, shown schematically in FIG. 1. Computing system 15 may include a computer-readable storage medium 150 that can retain and store data and program instructions for execution by a processor 140. Storage medium 150 may include, for example, an electronic storage device, a magnetic storage device, an optical storage device, an electromagnetic storage device, or any suitable combination of such devices or other suitable electronic storage devices. A non-exhaustive list of more specific examples of the computer readable storage medium may include a random access memory (RAM), a read-only memory (ROM), an erasable programmable read-only memory (EPROM or Flash memory), a static random access memory (SRAM) a memory stick, or/and the like.

Program instructions stored on computer-readable storage medium 150 may include assembler instructions, machine dependent instructions, firmware instructions, source code or object code written in any combination of one or more programming languages, including an object oriented programming languages, procedural programming languages or functional programming languages. The programming language may be Fortran, Lisp, C++ or the like. The program instructions may be executed by processor 140 of computing system 15. In some embodiments, the computing system may provide a user interface 16 configured to allow a user 11 to modify data, update program instructions or enter various parameters used by the program instructions.

In various embodiments, processor 140 of computer system 15 may be configured to receive a signal (also referred to as indicator) indicating a demand for the hydrogen gas. In response processor 140 may control one or more valves to adjust the rate of flow of liquid hydrogen carrier 111 to meet the demand for the hydrogen gas. In an illustrative embodiment, the signal indicating the demand for the hydrogen gas may be generated by any power consuming system configured to use hydrogen as a source of fuel. For example, for system 10 installed on a vehicle, the signal indicating the demand for hydrogen gas may originate from or may be associated various vehicle systems (e.g., power control processors, accelerator systems, hydrogen combustion control systems, advanced driver assist systems (ADAS), autonomous vehicle control systems, etc.). In some embodiments, the processor 140 may also employ a feedback control system to adjust the flow rate of liquid hydrogen carrier 111. The processor 140 may receive a measured parameter value associated with the system and control the flow rate of liquid hydrogen carrier 111 to reduce or eliminate the difference between the measured parameter value and a target value for the parameter. For example, the processor may measure a speed, a power output, or another parameter associated with a device powered hydrogen produced in hydrogen gas reactor 120 and may adjust liquid hydrogen carrier 111 based on the parameter. In such embodiments, processor 140 may employ a logic controller, such as a PID controller or the like to facilitate the feedback control process.

It should be noted, that various other techniques may be used other than computing system 15 to control the rate of flow of liquid hydrogen carrier 111 to meet the demand for the hydrogen gas. For example, in some embodiments, the rate of flow of liquid hydrogen carrier 111 may be automatic and may occur, for example, in response to a pressure drop between the hydrogen gas reactor 120 and the chamber 101 of liquid hydrogen carrier tank 100.

Figure 2:
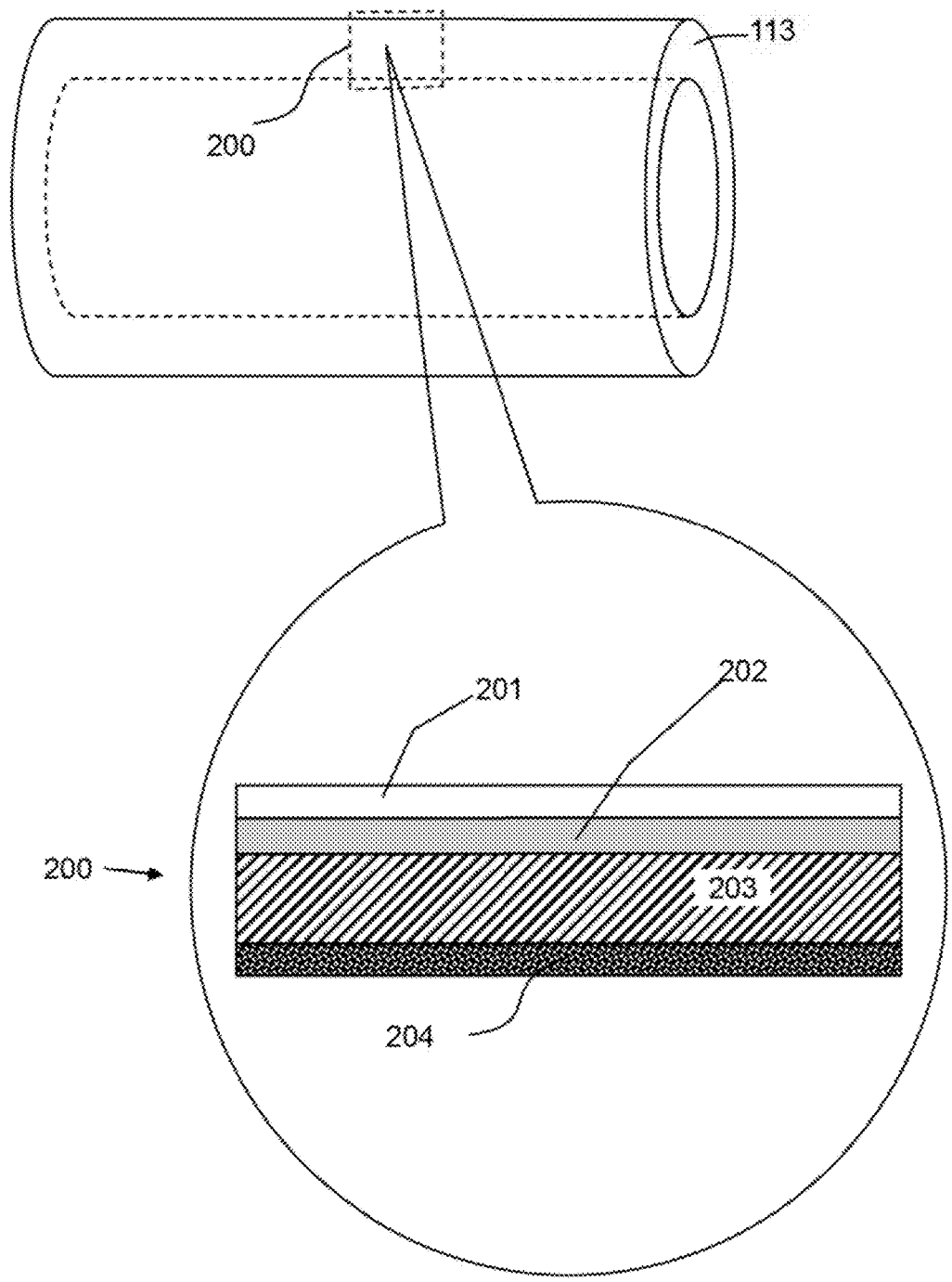
FIG. 2 shows an exemplary cross-sectional view of a liquid hydrogen carrier line wall.

Carrier outlet line 113 may have various configurations. FIG. 2 shows one example configuration for a region 200 of carrier outlet line 113. For example, in some embodiments, carrier outlet line 113 may include an outer protective layer 201, an insulation layer 202, a structural layer 203 and a chemically inert layer 204. In various embodiments, described layers are only illustrative, and various other suitable layers may be present, or some of the layers described above may be omitted. For example, more than one suitable structural layer may be present. In some embodiments, a portion of outlet line 113 may contain a first set of layers forming a first portion of line 113 and another portion may contain a second set of layers forming a second portion of line 113 with the first line portion and the second line portion connected at a junction.

In some embodiments, outer protective layer 201 may include any layer that may protect outlet line 113 from interaction with an ambient environment. In an example embodiment, the outer protective layer may include a plastic layer (e.g., polyvinyl chloride or polytetrafluoroethylene layer) or rust preventing layer which may be formed as a metallic zinc layer, an oxide layer (e.g., aluminum oxide) and/or the like, in various embodiments, an insulation layer 202 may include a porous layer containing gas to reduce or minimize the effects of environmental temperature fluctuations on properties of a liquid hydrogen carrier. In an example embodiment, a material used in the insulation layer may include foam formed from various suitable materials such as expanded polystyrene foam.

In various embodiments, structured layer 203 may be formed from a material that can reduce or prevent the risk of a rupture or a leak of the outlet line 113 due to pressure within line 113. In an example embodiment, structured layer 203 may include copper, aluminum, stainless steel and/or the like. In some embodiments, structured layer 203 may contain an internal mechanical structure (e.g., the structured layer may be formed of a composite material with strength enforcing fibers or a strength enforcing filler material).

In various embodiments, chemically inert layer 204 may be deposited adjacent to a liquid hydrogen carrier to reduce or prevent a risk of various layers of outlet line 113 reacting with liquid hydrogen carrier 111. In various illustrative embodiments, inner layer 204 may be formed from thermoplastic polyolefins such as polyethylene (PE), polypropylene (PP), or polybutene-1 (PB-1). In some embodiments, inner layer 204 may be formed from polyolefin elastomers (POE), polyisobutylene (PIB), ethylene propylene rubber (EPR), ethylene propylene diene monomer (M-class) or rubber (EPDM rubber). In some embodiments, inner layer 204 may be formed from fluoropolymers including, but not limited to, fluorinated ethylene propylene (FEP), polytetrafluoroethylene (PTFE), perfluoroalkoxy (PFA), a copolymer of ethylene and tetrafluoroethylene (ETFE) and/or the like.

In various embodiments, and similar to the structure shown in FIG. 2 for outlet line 113, spent liquid hydrogen carrier inlet line 115 (shown in FIG. 1) may also be constructed of several layers. Such layers may include an outer protective layer 201, insulation layer 202, structural layer 203 and chemically inert layer 204, as shown in FIG. 2. Additionally, or alternatively, chambers 101 and/or 102 of system 20 may be formed from several layers that may include outer protective layer 201, insulation layer 202, structural layer 203 and chemically inert layer 204 as described above. In various embodiments, the composition of inert layer 204 for inlet line 115 may be different from the composition of inert layer 204 for outlet line 113, in order to account for different chemical compounds of spent liquid hydrogen carrier 112 as compared to chemical compound forming a liquid hydrogen carrier.

In various embodiments, described layers forming walls of spent liquid hydrogen carrier inlet line 115 are only illustrative, and various other suitable layers may be present, or some of the layers described above may be omitted. In some embodiments, a portion of inlet line 115 may contain a first set of layers forming a first portion of line 115 and another portion of inlet line 115 may contain a second set of layers forming a second portion of line 115 with the first portion and the second portion connected at a junction. In various embodiments, line 115 may contain one or more, portions.

FIG. 3B shows an exemplary embodiment of filter 146. Filter 146 may include at least one of a nickel mesh 146A removably attachable to reactor covering 147, a membrane 146B and/or a membrane holder 146C to secure membrane 146B and/or nickel mesh 146a to reactor covering 147. Membrane 146B may be made of highly hydrophobic material and/or may have a predetermined pore size (e.g., 0.2 μm). The material and/or the pore size of membrane 146B may be determined to effectively filter the gas-mist mixture thereof from the hydrogen.

Figure 4:
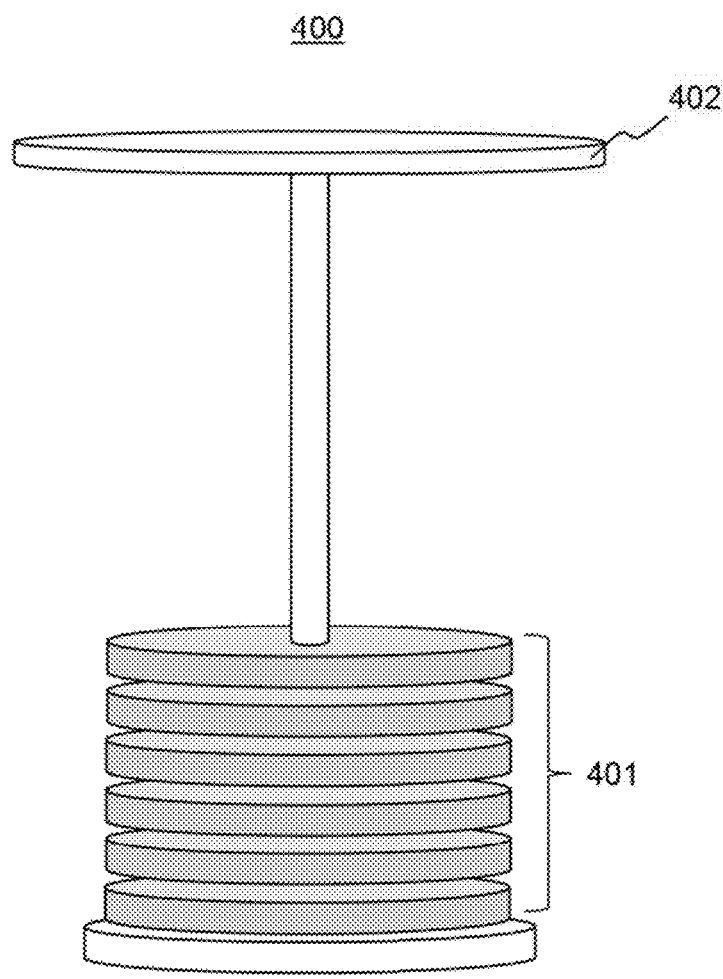
FIG. 4 is a schematic illustration of a catalyst subunit for a system for hydrogen extraction consistent with disclosed embodiments.

In some embodiments, shown in FIG. 4, hydrogen gas reactor 120 may include a catalyst subunit 400. Catalyst subunit 400 may include a plurality of nickel mesh sheets 401 that are dispersed with a catalytic metal compound, as shown in FIG. 4. In some embodiments, each of the plurality of nickel sheets 401 may produce about 0.5 liter/min of hydrogen upon contact with a room temperature liquid hydrogen carrier. Catalyst subunit 400 may further include a base 402. Base 402 may accommodate a plurality of nickel mesh sheets 401. Base 402 may be used to locate nickel mesh sheets 401 at a desired predetermined location within hydrogen gas reactor 120. Catalyst subunit 400 may have various shapes. In some embodiments, catalyst subunit 400 may have a conical shape.

The mesh structure of nickel sheets 401 may increase a surface and/or contact area of the catalytic metal compound with liquid hydrogen carrier 111. Nickel may provide sheets 401 with a desired conductivity of current (synthesizing) and beat (reaction). Nickel may further provide sheets 401 with desired electrochemical properties (synthesizing) and a desired resistance to extreme alkaline conditions of liquid hydrogen carrier 111 (reaction).

Figure 5:
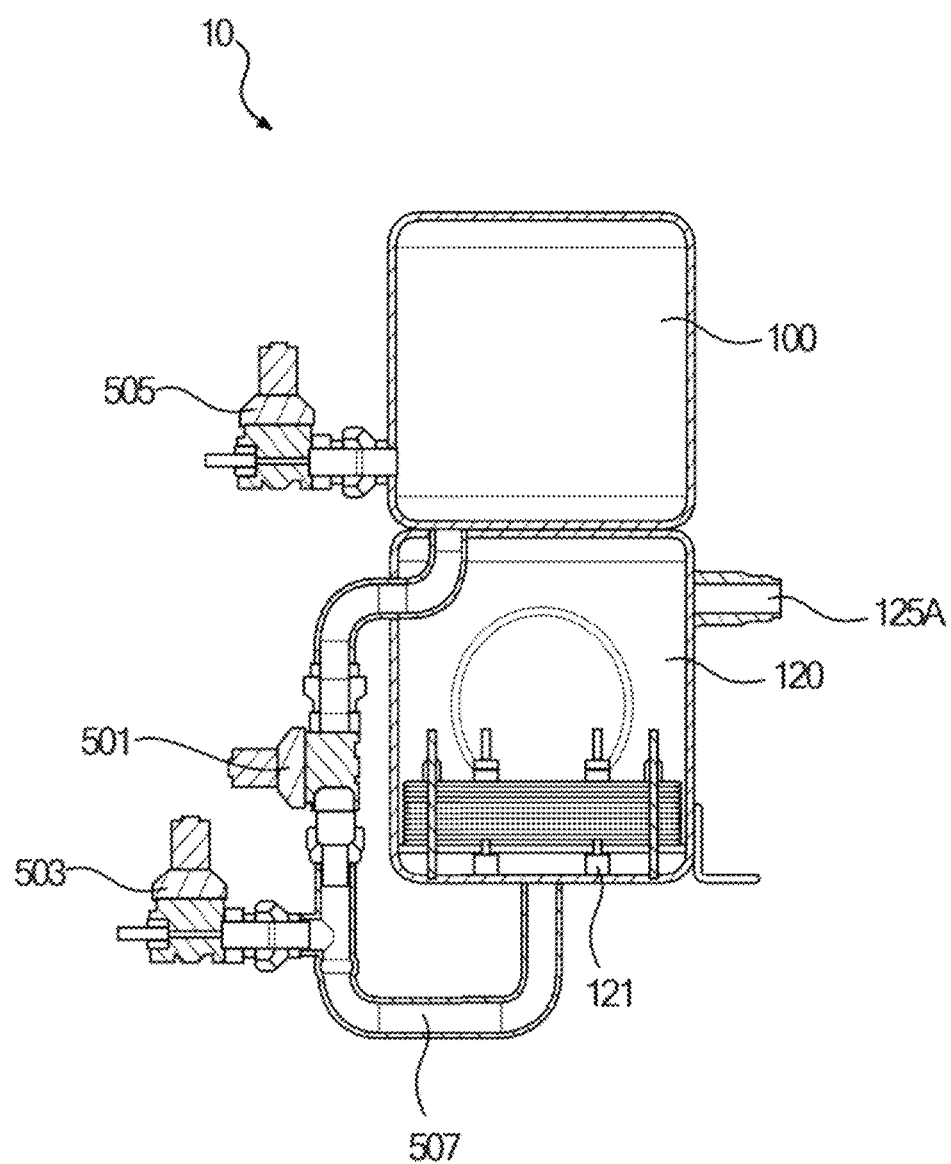
FIG. 5 shows an exemplary embodiment of a system for hydrogen extraction consistent with disclosed embodiments.

FIG. 5 shows an illustrative embodiment of system 10 including liquid hydrogen carrier tank 100, hydrogen gas reactor 120, hydrogen supply outlet 125A, catalyst 121, as well as a reactor stop valve 501, a main carrier rail 507, a drain valve 503, and a carrier supply valve 505. In various embodiments, carrier supply valve 505 may supply a liquid hydrogen carrier from the external source to liquid hydrogen carrier tank 100, a drain valve 503 may drain spent liquid hydrogen carrier 112 from reactor 120, and reactor stop valve 501 may control the flow of a liquid hydrogen carrier from liquid hydrogen carrier tank 100 to reactor 120. In an illustrative embodiment, system 10 depicted in FIG. 5 may produce hydrogen from a liquid hydrogen carrier in discontinuous, periodic cycles. In such an embodiment, main carrier rail 507 may be used for supplying a liquid hydrogen carrier from liquid hydrogen carrier tank 100 to hydrogen gas reactor 120 as well as for discharging spent liquid hydrogen carrier 112 from hydrogen gas reactor 120 via drain valve 503. In an example embodiment, system 10 may operate by first flowing liquid hydrogen carrier 111 via rail 507 from carrier reservoir 100 to hydrogen gas reactor 120. There, liquid hydrogen carrier 111 may react with catalyst 121 to release hydrogen, which may be carried from hydrogen gas reactor 120 by hydrogen supply outlet 125A. After completion of a hydrogen production cycle, or at any other suitable time, spent liquid hydrogen carrier 112 may be collected from hydrogen gas reactor 120, flowed through carrier rail 507, and may exit from system 10 via drain valve 503.

Figure 6:
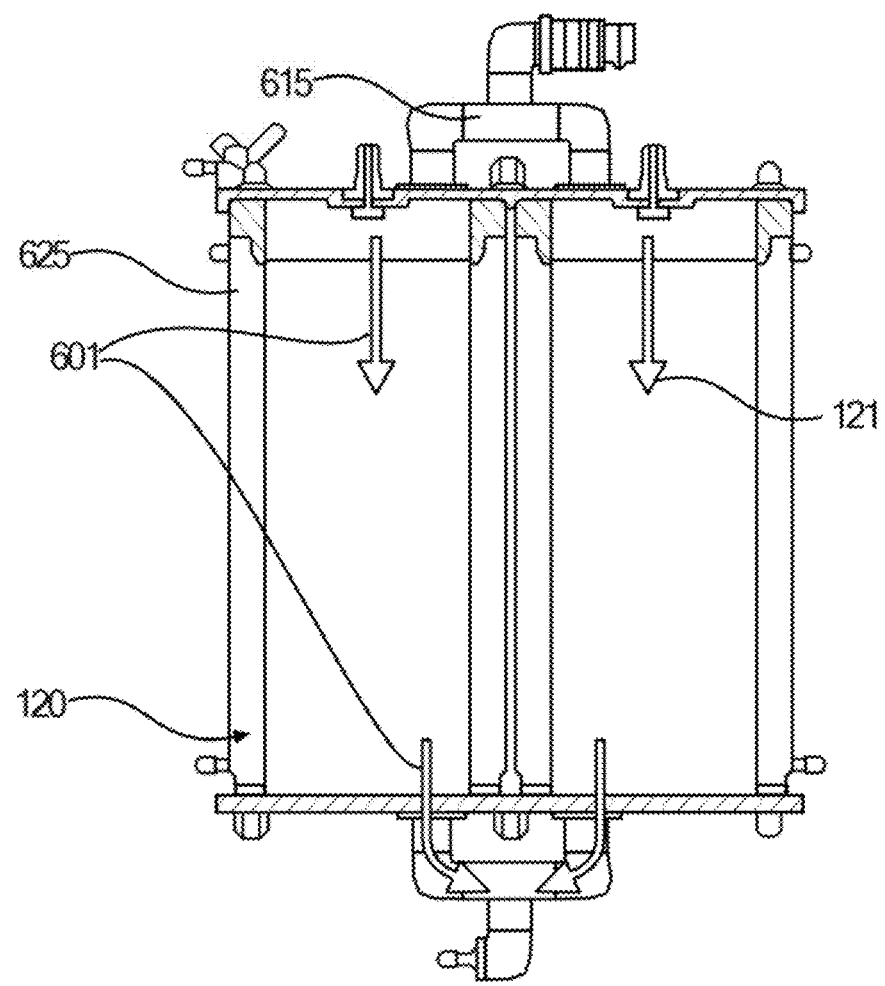
FIG. 6 shows an exemplary embodiment of a system for hydrogen extraction consistent with disclosed embodiments.

In contrast to the cyclical hydrogen generating system 10 of FIG. 5, the embodiment shown in FIG. 6 may operate to generate hydrogen in a more continuous manner. For example, a liquid hydrogen carrier may be flowed from an upper cylinder head as shown for example by arrows 601 and collected at the bottom of chamber 120 as spent liquid hydrogen carrier 112. In various embodiments, catalyst 121 may be deposited on walls of hydrogen gas reactor 120 and may facilitate hydrogen release from liquid hydrogen carrier 111 as the carrier passes in the proximity of the walls. In various embodiments, hydrogen may be collected at the top of hydrogen gas reactor 120 for example at hydrogen manifold 615 for flowing to hydrogen storage chamber 126, or for flowing to a fuel cell 130 (or to any other hydrogen storage or consumption unit).

In various embodiments, hydrogen gas reactor 120 may include a liquid cooling system, such as, for example, a cooling water jacket 625 as shown in FIG. 6. Jacket 625 may be configured to cool the walls of hydrogen gas reactor 120. The cooling jackets may include a liquid disposed within the jackets. In some embodiments, the cooling jackets may contain a cooling fluid to promote thermal management. The cooling fluid may include water, glycol, or some other gas or liquid coolant or combination thereof. The cooling jacket may contain a number of fins or baffles inside the jacket to promote heat transfer. Alternatively, the cooling jackets may include a shell and tube heat exchanger or other known heat transfer device. The cooling jackets may be included within the walls of hydrogen gas reactor 120 by various alternative structures.

Various embodiments described below relate to a batch system for generating on-demand hydrogen gas. Such embodiments may include a reservoir, as described above, for storing a liquid hydrogen carrier and may also include a hydrogen gas reactor including a catalyst. Flowing the liquid hydrogen carrier into the hydrogen gas reactor may induce hydrogen gas generation upon contact of the liquid hydrogen carrier with the catalyst. The batch aspect of the system may refer to the characteristic that the system may be supplied with a batch of liquid hydrogen carrier (e.g., a finite amount of liquid hydrogen carrier) from which a certain volume of hydrogen gas may be released. When the total volume of hydrogen gas has been released from a batch of liquid hydrogen carrier, the spent liquid hydrogen carrier may be removed from the batch system, and another batch of liquid hydrogen carrier may be supplied to the system as part of a refueling process. Of course, the batch concept is illustrative of just one example for how the disclosed systems may be employed to generate hydrogen gas. Any of the described embodiments may also be combined with or modified to include certain structures and controls enabling more continuous supply of liquid hydrogen carrier that may eliminate a need for refueling the system with liquid hydrogen carrier, at least on a local system level.

Figure 7A:
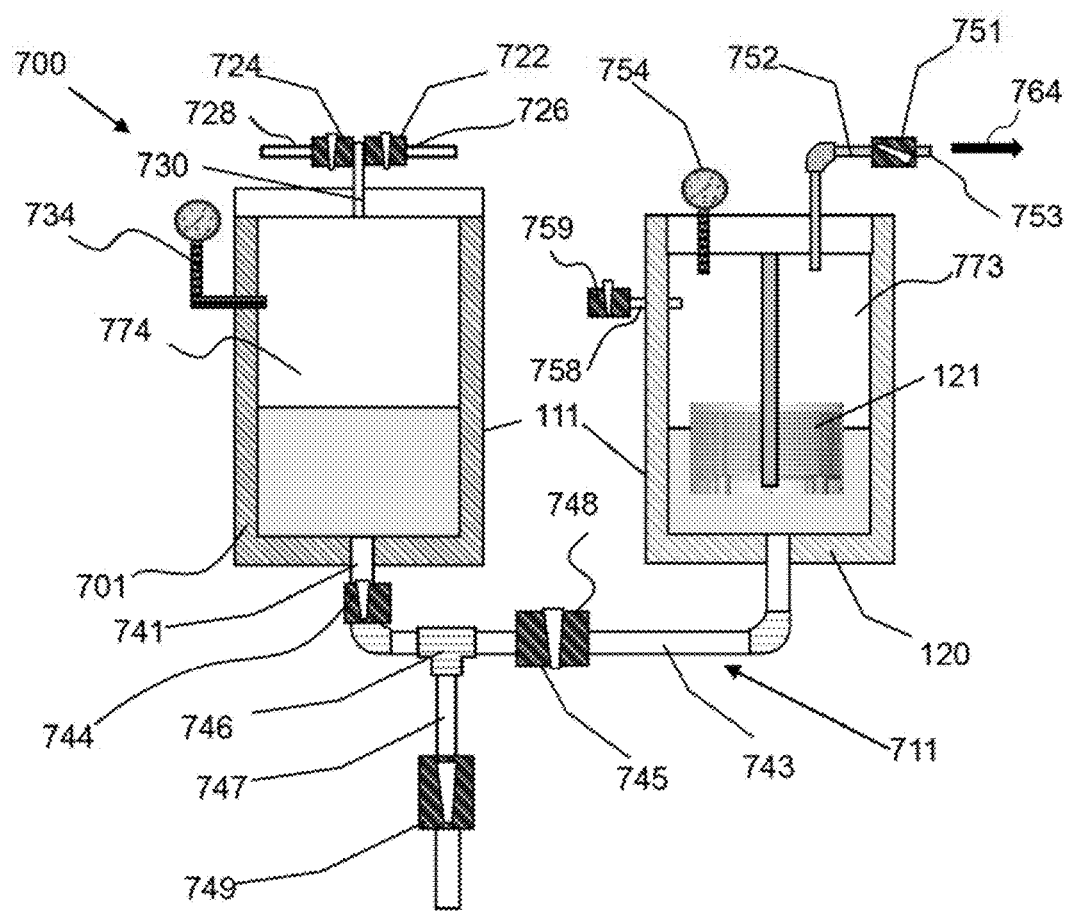
FIGS. 7A and 7B show exemplary embodiments of a system for hydrogen extraction including a hydrogen gas reactor and a liquid hydrogen carrier reservoir consistent with disclosed embodiments.
Figure 7B:
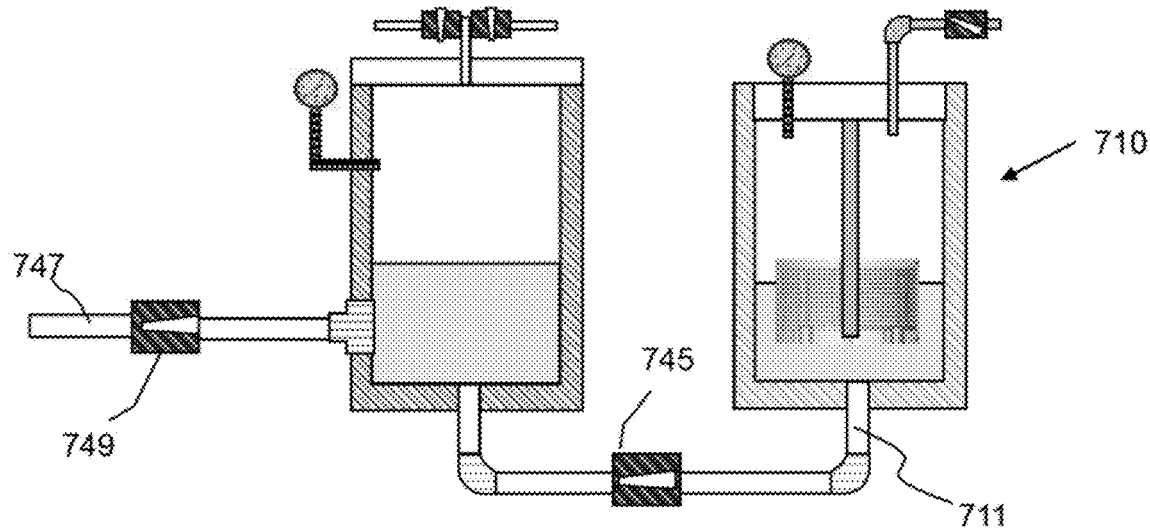

FIGS. 7A and 7B show an example embodiment of hydrogen gas reactor 120 and a liquid hydrogen carrier reservoir 701 connected to each other via a liquid hydrogen carrier channel 711. Liquid hydrogen carrier reservoir 701 and connected hydrogen gas reactor 120 may be referred to as system 700 as shown in FIG. 7A and system 710 as shown in FIG. 7B. Liquid hydrogen carrier channel 711 may be formed from several segments, such as a reservoir branch 741 between liquid hydrogen carrier reservoir 701 and a branch connector 744, and a reactor branch 743 connecting branch connector 746 with hydrogen gas reactor 120. In various embodiments, liquid hydrogen carrier channel 711 may be configured to flow liquid hydrogen carrier 111 between hydrogen gas reactor 120 and liquid hydrogen carrier reservoir 701. In some embodiments, reservoir branch 741 and reactor branch 743 may include a corresponding reservoir branch valve 744 and a reactor branch valve 745. Valves 744 and 745 may be open/closed to permit/terminate the flow of liquid hydrogen carrier 111 between liquid hydrogen carrier reservoir 701 and hydrogen gas reactor 120. In some embodiments, at least one valve (either valve 744 or valve 745) may be closed to prevent a flow of liquid hydrogen carrier 111 between liquid hydrogen carrier reservoir 701 and hydrogen gas reactor 120. Valves 744 and 745 may be configured to be operated by user 11 (e.g., by user 11 turning one of the valves 744 or 745) by a controller (e.g., a mechanical device receiving instructions, such as electrical signals from a computing system 15), or combination of thereof. In an example embodiment, computing system 15 may allow user 11 to control valves 744 and 745 via interface system 16. Herein, unless otherwise noted, the term "control" as relating to a valve refers to any manipulations with the valve (such as opening the valve, closing the valve, partially opening the valve or partially closing the valve).

In various embodiments, liquid hydrogen carrier 111 may be delivered into liquid hydrogen carrier reservoir 701 via an inflow liquid hydrogen carrier channel 747. In an example embodiment, shown in FIG. 7A, channel 747 may include valve 749 allowing a flow of liquid hydrogen carrier 111 into liquid hydrogen carrier channel 711 as shown in FIG. 7A, In an example embodiment, valve 745 may be closed preventing liquid hydrogen carrier 111 to entering hydrogen gas reactor 120 as shown in FIG. 7A, by a handle element 748 that is positioned (e.g., directed perpendicular to a flow direction in reactor branch 743) to close valve 745. In an example embodiment, valve 744, may be open resulting in liquid hydrogen carrier 111 flowing via channel 747 and branch 741 into liquid hydrogen carrier reservoir 701. FIG. 7B illustrates system 710, where inflow liquid hydrogen carrier channel 747 is directly connected to liquid hydrogen carrier reservoir 701. Such a configuration may not require the presence of valve 744, as valve 745 (shown in FIG. 7B) may control the flow between liquid hydrogen carrier reservoir 701 and hydrogen gas reactor 120. In an example embodiment, channel 747 and valve 749 may be configured to deliver liquid hydrogen carrier 111 from a liquid hydrogen carrier tank 100.

In an example embodiment, valves 749 and 745 may be open simultaneously or closed simultaneously. Additionally, valve 749 may be open while valve 745 is closed or valve 749 may be closed while valve 745 is open. In some embodiments, one of valves 749 and 745 may be partially open, or both valves 749 and 745 may be partially open. In various embodiments, similar to valves 744 and 745, valve 749 may be configured to be operated by user 11, by a controller (e.g., a mechanical device receiving instructions, such as electrical signals from a computing system 15), or by a combination of thereof. In an example embodiment, computing system 15 may allow user 11 to control valves 749, 744 and 745 via interface system 16.

In various embodiments, liquid hydrogen carrier reservoir 701 includes, an enclosure configured to contain liquid hydrogen carrier III. In some embodiments, liquid hydrogen carrier 111 may occupy an entire volume of the liquid hydrogen carrier reservoir 701 enclosure, and in some embodiments, liquid hydrogen carrier 111 may partially occupy the liquid hydrogen carrier reservoir 701 enclosure. When liquid hydrogen carrier 111 occupies only a portion of liquid hydrogen carrier reservoir 701 enclosure, another portion of liquid hydrogen carrier reservoir 701 enclosure may be occupied by gas 774. In an example embodiment, gas 774 may be hydrogen, or inert gas such as helium, neon, argon, krypton, xenon, a combination of thereof or any other gases that do not react with hydrogen gas.

In various embodiments, hydrogen gas reactor 120 includes an enclosure containing catalyst 121 that may be immersed into liquid hydrogen carrier 111 located within hydrogen gas reactor 120. For example, catalyst 121 includes a surface that may be wetted by liquid hydrogen carrier 111. In various embodiments, liquid hydrogen carrier 111 may occupy a portion of the hydrogen gas reactor 120 enclosure, and another portion of hydrogen gas reactor 120 enclosure may be occupied by hydrogen gas 773. When catalyst 121 interacts with liquid hydrogen carrier 111, hydrogen gas 773 is extracted from liquid hydrogen carrier 111 inside hydrogen gas reactor 120, resulting in a pressure increase within hydrogen gas reactor 120. In an example embodiment shown in FIG. 7A, when valves 741 and 745 are open, liquid hydrogen carrier 111 may be allowed to flow between liquid hydrogen carrier reservoir 701 and hydrogen gas reactor 120 in response to a pressure difference between the pressure in liquid hydrogen carrier reservoir 701 and pressure in hydrogen gas reactor 120. For example, if the pressure in hydrogen gas reactor 120 is higher than the pressure in liquid hydrogen carrier reservoir 701, liquid hydrogen carrier 111 may flow via channel 711 from hydrogen gas reactor 120 to liquid hydrogen carrier reservoir 701. Alternatively, when the pressure in hydrogen gas reactor 120 is lower than the pressure in liquid hydrogen carrier reservoir 701, liquid hydrogen carrier 111 may flow via channel 711 from liquid hydrogen carrier reservoir 701 to hydrogen gas reactor 120. In various embodiments, a rate at which liquid hydrogen carrier 111 flows between liquid hydrogen carrier reservoir 701 and hydrogen gas reactor 120 via liquid hydrogen carrier channel 711 may be responsive to the pressure difference between the pressure of liquid hydrogen carrier reservoir 701 and the pressure of hydrogen gas reactor 120. For example, the rate of flow of liquid hydrogen carrier 111 as a function of the pressure difference may be described by the Bernoulli equation. In an example embodiment a positive pressure difference (e.g., the pressure of liquid hydrogen carrier reservoir 701 is larger than the pressure of hydrogen gas reactor 120) may lead to a positive flow rate of liquid hydrogen carrier 111 (i.e., liquid hydrogen carrier 111 flowing into hydrogen gas reactor 120), while a negative pressure difference may lead to a negative flow rate of liquid hydrogen carrier 111 (i.e., liquid hydrogen carrier 111 flowing out of hydrogen gas reactor 120).

As described above, the term "self-regulating system" may be used herein to describe various disclosed embodiments. In some cases, for example, the term "self-regulating system" is used, to describe a system of liquid hydrogen carrier reservoir 701 and hydrogen gas reactor 120 connected by liquid hydrogen carrier channel 711 (shown in FIG. 7A or 7B). As described in more detail below, such a self-regulating system may automatically operate, for example, in response to pressure differentials in some cases, to ensure that an appropriate amount of liquid hydrogen carrier is made to contact an appropriate surface area of the catalyst such that hydrogen gas is generated at a rate to meet a certain demand. In some cases, as will be discussed below, as hydrogen demand increases and hydrogen gas flows from reactor 120, there may be an increase in the liquid hydrogen carrier (e.g., flow rate, total volume, etc.) into the reactor in order to increase (or at least maintain) a surface area contact level between the liquid hydrogen carrier and the catalyst in order to meet changing hydrogen gas demands. As demand for hydrogen gas from the reactor decreases, there may be a decrease in the liquid hydrogen carrier (e.g., flow rate, total volume, etc.) such that a surface area contact level between the liquid hydrogen carrier and the catalyst is reduced. Such a reduction may cause a corresponding reduction in hydrogen gas production in response to the reduced demand for hydrogen gas.

In certain embodiments of the self-regulating system, the rate of hydrogen gas 773 extraction in hydrogen gas reactor 120 may depend on the pressure of hydrogen gas 773 located in hydrogen gas reactor 120 relative to the pressure of the gas in liquid hydrogen carrier reservoir 701, as well as a volume of liquid hydrogen carrier 111 in hydrogen gas reactor 120 during hydrogen gas 773 extraction. For example, when the pressure difference between liquid hydrogen carrier reservoir 701 and hydrogen gas reactor 120 is positive (i.e., the pressure in liquid hydrogen carrier reservoir 701 is higher than the pressure in hydrogen gas reactor 120), liquid hydrogen carrier 111 flows from liquid hydrogen carrier reservoir 701 into hydrogen gas reactor 120 resulting in the larger volume of liquid hydrogen carrier 111 inside hydrogen gas reactor 120. The larger volume of liquid hydrogen carrier 111 in hydrogen gas reactor 120 may lead to an increase in a hydrogen gas extraction rate due to a larger area of catalyst 121 being wetted by liquid hydrogen carrier 111 (e.g., resulting in an increase in exposure of catalyst 121 to liquid hydrogen carrier 111). As the pressure of hydrogen gas 773 increases in hydrogen gas reactor 120 relative to the pressure in liquid hydrogen carrier reservoir 701, liquid hydrogen carrier 111 may flow from hydrogen gas reactor 120 into liquid hydrogen carrier reservoir 701, thus reducing a volume of liquid hydrogen carrier 111 available for hydrogen extraction. Reduction in the volume of liquid hydrogen carrier 111 may lead to a reduction in the area of catalyst being wetted by liquid hydrogen carrier 111 (e.g., leading to a decrease in the exposure of catalyst 121 to liquid hydrogen carrier 111), thus, in turn, leading to a reduction in the hydrogen gas extraction rate. As liquid hydrogen carrier 111 flows from hydrogen gas reactor 120, the pressure in hydrogen gas reactor 120 may decrease due to the expansion of hydrogen gas 773 (the expansion of hydrogen gas 773 is due to an increase in available space for gas 773 as the volume of liquid hydrogen carrier 111 is reduced in hydrogen gas reactor 120). As liquid hydrogen carrier 111 flows from hydrogen gas reactor 120 to liquid hydrogen carrier reservoir 701, the pressure in liquid hydrogen carrier reservoir 701 may increase (due to gas located in liquid hydrogen carrier reservoir 701 experiencing compression when liquid hydrogen carrier 111 flows into liquid hydrogen carrier reservoir 701) resulting in equilibration of the pressure in liquid hydrogen carrier reservoir 701 and hydrogen gas reactor 120.

In various embodiments, the described operation of system 700 is "self-regulating" due to its self-terminating property. For example, if the process is not controlled (e.g., by removing some of the extracted hydrogen gas 773 from hydrogen gas reactor 120), the extraction rate will continue to decrease asymptotically to zero by driving liquid hydrogen carrier 111 out of hydrogen gas reactor 120 (e.g., in response to a rising pressure in hydrogen gas reactor 120). In an example embodiment, system 700 may be configured to drive liquid hydrogen carrier 111 from hydrogen gas reactor 120 such that liquid hydrogen carrier 111 does not wet a surface of catalyst 121 when the pressure of hydrogen gas 773 in hydrogen gas reactor 120 is lower than a maximum pressure tolerance (i.e., maximum pressure that hydrogen gas reactor 120 may withstand before rupture) for hydrogen gas reactor 120.

In various embodiments, system 700 is used to extract hydrogen gas 773 from liquid hydrogen carrier 111 and utilize gas 773 as a fuel for an external load (e.g., fuel cell, combustion engine, etc.). Thus, in various embodiments, hydrogen gas reactor 120 may include a hydrogen gas outlet 752 through which the extracted hydrogen gas 773 flows from hydrogen gas reactor 120. In various embodiments, hydrogen gas outlet 752 may include a hydrogen gas outlet valve 751 that may control the flow of hydrogen gas 773 from hydrogen gas reactor 120 via hydrogen gas outlet 752. In some embodiments, a minimum pressure is needed for a successful operation of an exemplary external load such as a fuel cell. For example, a fuel cell may require a pressure of several bars. In order to obtain such minimum pressure, valve 751 may be maintained in a closed position to build the pressure in hydrogen gas reactor 120 and may be opened to flow hydrogen gas 773 out of hydrogen gas reactor 120 when the pressure in hydrogen gas reactor 120 exceeds a minimum pressure required by the external load or when the pressure in hydrogen gas reactor 120 exceeds a required pressure value that may be any suitable pressure value.

Similar to other valves (e.g., valves 744, 745, and 747) valve 751 may be configured to be operated by user 11, by a controller (e.g., a mechanical device receiving instructions, such as electrical signals from a computing system 15), or a combination of thereof. In an example embodiment, computing system 15 may allow user 11 to control aspects of the operation of valve 751 via interface system 16.

In various embodiments, the pressure 753 at the outflow of hydrogen gas outlet 752, the pressure of hydrogen gas 773 in hydrogen gas reactor 120, as well as a position of valve 751 may be used to determine a hydrogen gas flow rate 764 out of hydrogen gas reactor 120 via hydrogen gas outlet 752. Pressure 753 may be controlled by a pump, or it may correspond to ambient pressure (i.e., the pressure in an environment, or pressure within an exemplary external load). In various embodiments, in response to an increase in hydrogen gas flow rate 764 through hydrogen gas outlet 752, the pressure within hydrogen gas reactor 120 may decrease relative to the pressure of liquid hydrogen carrier reservoir 701, leading to flow of liquid hydrogen carrier 111 from liquid hydrogen carrier reservoir 701 into hydrogen gas reactor 120, thus resulting in an increase in volume of liquid hydrogen carrier 111 within hydrogen gas reactor 120. Similarly, in response to a decrease in hydrogen gas flow rate 764 through hydrogen gas outlet 752, the pressure within hydrogen gas reactor 120 may increase relative to the pressure of liquid hydrogen carrier reservoir 701, leading to flow of liquid hydrogen carrier 111 from hydrogen gas reactor 120 into liquid hydrogen carrier reservoir 701, thus resulting in a decrease in volume of liquid hydrogen carrier 111 within hydrogen gas reactor 120.

It should be noted, that while changes in the pressure of liquid hydrogen carrier reservoir 701 may be one way to cause a flow of liquid hydrogen carrier 111 in/out of the hydrogen gas reactor 120, other approaches may be used. For example, liquid hydrogen carrier 111 may be flowed from/to liquid hydrogen carrier tank 100 using a pump in response to the increase/decrease in hydrogen gas flow rate 764 through hydrogen gas outlet 752. In various embodiments, the pump may be controlled by computing system 15, and in general, a combination of liquid hydrogen carrier tank 100, the pump and the computing system 15 may allow for similar functionality as liquid hydrogen carrier reservoir 701 for flowing liquid hydrogen carrier 111 to/from hydrogen gas reactor 120.

FIG. 7A shows that liquid hydrogen carrier reservoir 701 may have a pressure sensor 734 and hydrogen gas reactor 120 may have a pressure sensor 754. Pressure data measured by these pressure sensors may be transmitted to computing system 15 for processing. In an example embodiment, the pressure data obtained by the sensors may be displayed for user 11 via user interface 16. In some cases, hydrogen gas 773 may be released from hydrogen gas reactor 120 via a safety hydrogen gas conduit 758 using a safety valve 759. For example, hydrogen gas 773 may be released when the pressure within hydrogen gas reactor 120 is above the threshold value such as the maximum tolerance pressure level. In various embodiments, computing system 15 may evaluate the pressure in hydrogen gas reactor 120 using data obtained from pressure sensor 754, and open, close or partially open valve 759 to release hydrogen gas 773 out of hydrogen gas reactor 120. In various embodiments computing system 15 may control valve 759 by means of a controller such as a mechanical actuator actuated by a motor. In various embodiments, system 700 may be configured to release hydrogen gas 773 out of hydrogen gas reactor 120 in a safe, controlled way (e.g., the hydrogen gas may be released to avoid a possibility of uncontrollable combustion when mixing with oxygen gas). For example, hydrogen gas may be stored in a hydrogen gas tank, or it may be controllably burned or consumed.

FIG. 7A shows that liquid hydrogen carrier reservoir 701 may include a reservoir gas conduit 730, a valve 724 and a branch 728 for releasing gas contained in liquid hydrogen carrier reservoir 701. In an example embodiment, when liquid hydrogen carrier reservoir 701 contains inert gas such as nitrogen, the gas may be released into the atmosphere or surrounding environment. In some embodiments, when liquid hydrogen carrier reservoir 701 contains hydrogen, system 700 may be configured to release hydrogen in a safe, controlled way similar to the hydrogen release as described for hydrogen gas reactor 120. In various embodiments, the release of gas from liquid hydrogen carrier reservoir 701 may be conducted to change the pressure within liquid hydrogen carrier reservoir 701. For example, lowering the pressure may lead to liquid hydrogen carrier 111 flowing into liquid hydrogen carrier reservoir 701 from hydrogen gas reactor 120 leading to a reduction in the pressure in hydrogen gas reactor 120. In some embodiments, when liquid hydrogen carrier reservoir 701 contains hydrogen gas, the gas may flow into a hydrogen gas storage tank. Additionally, or alternatively, hydrogen gas from liquid hydrogen carrier reservoir 701 may be used as a power source for an external load.

In some embodiments, a valve 722 and a branch 726 may be used to flow gas into liquid hydrogen carrier reservoir 701. For example, branch 726 may be used to flow inert gas into liquid hydrogen carrier reservoir 701 to increase pressure within liquid hydrogen carrier reservoir 701. Such pressure increase may lead to liquid hydrogen carrier 111 flowing from liquid hydrogen carrier reservoir 701 to hydrogen gas reactor 120 leading to an increase in the pressure in hydrogen gas reactor 120. Such pressure increase may help in controlling hydrogen gas flow rate 764 through hydrogen gas outlet 752 flowing from hydrogen gas reactor 120. It should be noted that while two gas valves 722 and 724 are shown in FIG. 7A, liquid hydrogen carrier reservoir 701 may have more gas valves, or it may have fewer gas valves.

For example, gas valve 724 may be absent and gas valve 722 may be used for flowing gas in and out of liquid hydrogen carrier reservoir 701 via corresponding branch 728.

In various embodiments shown in FIGS. 7A and 7B different type of valves may be used. For example, liquid hydrogen carrier valves 741, 745, and 749 as shown in FIG. 7A, may include a gate valve, a globe valve, a plug valve, a ball valve and the like, designed for stopping a flow, opening the flow or regulating the flow. In some embodiments, valves 741 and 745 may allow the flow of liquid hydrogen carrier 111 in both directions. In some embodiments, valve 749 may allow flow in one direction (e.g., in a direction towards liquid hydrogen carrier reservoir 701 and/or hydrogen gas reactor 120), and in some embodiments, valve 749 may allow flow in all directions. Gas valves, such as valves 722, 724, 751, and 759 are configured to control the flow of gases in and out of liquid hydrogen carrier reservoir 701 and hydrogen gas reactor 120. In an example embodiment, valves 724 and 759 may be safety valves such as pressure relief valves. Valve 751 may be a check valve configured to flow hydrogen gas 773 out of hydrogen gas reactor 120. In some embodiments, valve 722 may include a gate valve, a globe valve, a plug valve, a ball valve, or a check valve.

Figure 8:
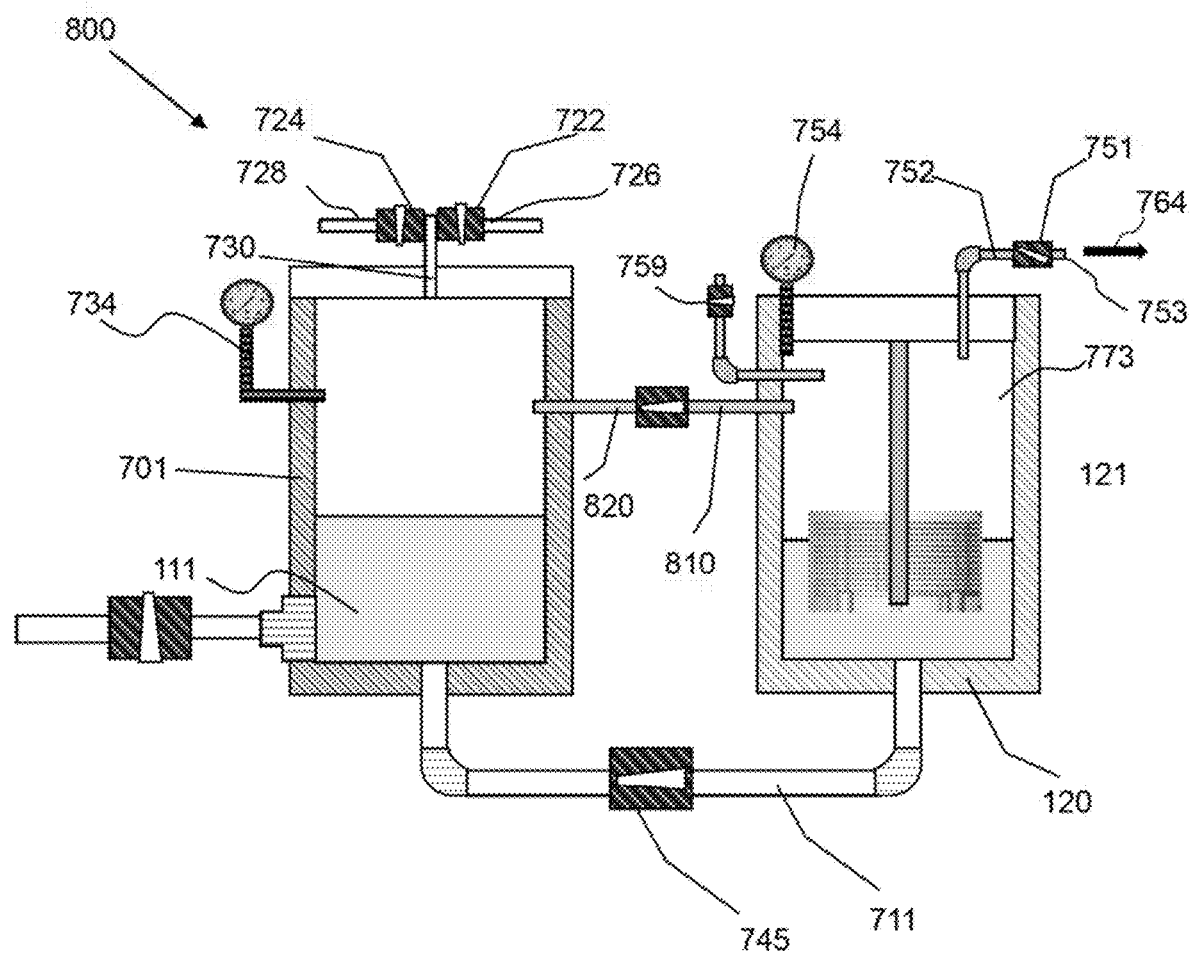
FIG. 8 shows an exemplary embodiment of a system for hydrogen extraction including a hydrogen gas reactor, a liquid hydrogen carrier reservoir, and a gas connecting channel consistent with disclosed embodiments.

FIG. 8 shows an illustrative system 800 including liquid hydrogen carrier reservoir 701 and hydrogen gas reactor 120 further including a gas connecting channel (gas connecting channel) 810 and a gas connecting channel valve 820. Gas connecting channel 810 may be used to equalize pressure between liquid hydrogen carrier reservoir 701 and hydrogen gas reactor 120. For example, when the pressure in hydrogen gas reactor 120 rises due to the release of hydrogen gas 773 by liquid hydrogen carrier 111, when liquid hydrogen carrier 111 is in contact with catalyst 121, gas connecting channel 810 may be configured to flow hydrogen gas 773 from hydrogen gas reactor 120 to liquid hydrogen carrier reservoir 701 to equalize the gas pressure in liquid hydrogen carrier reservoir 701 and hydrogen gas reactor 120. In various embodiments, gas connecting channel valve 820 may be open during a startup of system 700 (i.e., when system 800 starts a process of extracting hydrogen gas 773 from liquid hydrogen carrier 111), and once pressure in hydrogen gas reactor 120 and liquid hydrogen carrier reservoir 701 achieves the desired target value (also referred to as working pressure) gas connecting channel valve 820 may be closed. In various embodiments, gas connecting channel valve 820 may include a check valve allowing hydrogen gas flow from hydrogen gas reactor 120 to liquid hydrogen carrier reservoir 701. In various embodiments, both hydrogen gas reactor 120 and liquid hydrogen carrier reservoir 701 may be hermetically sealed to prevent environmental gases from interacting with hydrogen gas contained within hydrogen gas reactor 120 and liquid hydrogen carrier reservoir 701.

In various embodiments, computing system 15 may be configured to monitor pressure within liquid hydrogen carrier reservoir 701 and hydrogen gas reactor 120 (e.g., by monitoring pressure data obtained by sensors 734 and 754) and control opening and closing (or partially opening) of valves 820, 751, 722, 724, and 759 to control pressure within hydrogen gas reactor 120 and liquid hydrogen carrier reservoir 701. In an example embodiment, computing system 15 may receive instructions from user 11 via user interface 16 and adjust the pressure within hydrogen gas reactor 120 and liquid hydrogen carrier reservoir 701 by opening or closing one or more valves (e.g., valves 820, 751, 722, 724, and 759). System 800 may be configured to open and close the valves using a controller (e.g., a motor for opening and closing the valves). Additionally, or alternatively, computing system 15 may be configured to close and open the valves during various stages of hydrogen gas extraction from liquid hydrogen carrier 111 to match target pressures in hydrogen gas reactor 120 and liquid hydrogen carrier reservoir 701. For example, computing system 15 may be configured to open and close valve 820 to establish a working pressure in hydrogen gas reactor 120 and liquid hydrogen carrier reservoir 701 during a startup of system 800 as described above. As referenced herein, unless otherwise noted, the term "working, pressure" may refer to a starting pressure of system 700 (e.g., a pressure of system 700 at a certain point during a startup process). In some embodiments, computing system 15 may be configured to receive pressure data obtained by sensors 734 and 754, and open or close valve 820 in response to a pressure difference between hydrogen gas reactor 120 and liquid hydrogen carrier reservoir 701. For example, when computing system 15 determines that a difference in pressure between hydrogen gas reactor 120 and liquid hydrogen carrier reservoir 701 is above a threshold pressure difference value, system 15 may be configured to open valve 820 to reduce the pressure difference between hydrogen gas reactor 120 and liquid hydrogen carrier reservoir 701 or to equalize pressures between hydrogen gas reactor 120 and liquid hydrogen carrier reservoir 701.

While embodiments shown in FIG. 7A through FIG. 8 describe one hydrogen, gas, reactor 120 connected to one liquid hydrogen carrier reservoir 701, other configurations are possible. For example, several liquid hydrogen carrier reservoirs may be connected to one hydrogen gas reactor via corresponding liquid hydrogen carrier channels, or several hydrogen gas reactors may be connected to one liquid hydrogen carrier reservoir via corresponding liquid hydrogen carrier channel. In some embodiments, multiple hydrogen gas reactors and multiple liquid hydrogen carrier reservoirs may be connected through a network of corresponding liquid hydrogen carrier channels, and in some embodiments, multiple hydrogen gas reactors and multiple liquid hydrogen carrier reservoirs may be connected through a network of corresponding gas connecting channel channels configured to equate pressure between multiple liquid hydrogen carrier reservoirs and multiple hydrogen gas reactors. Additionally, or alternatively, multiple liquid hydrogen carrier reservoirs may be connected to each other via corresponding liquid hydrogen carrier channels, and in some cases, multiple liquid hydrogen carrier reservoirs may be connected to each other via gas connecting channels configured to flow gas between the liquid hydrogen carrier reservoirs. Additionally, or alternatively, multiple hydrogen gas reactors may be connected to each other via corresponding liquid hydrogen carrier channels, and in some cases, multiple hydrogen gas reactors may be connected with each other via corresponding gas connecting channels configured to flow gas between the connected hydrogen gas reactors.

Figure 9A:
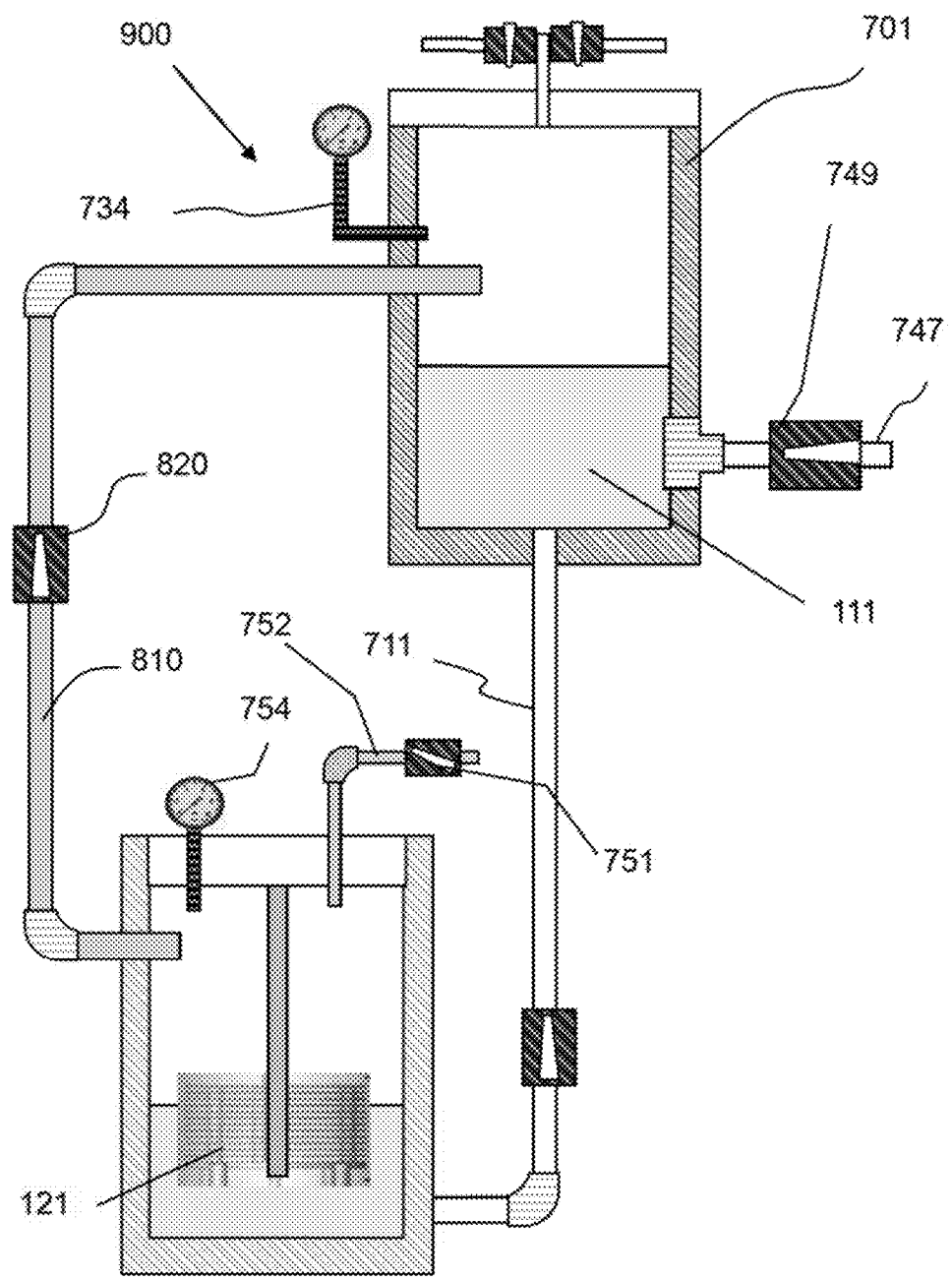
FIGS. 9A and 9B show exemplary embodiments of a system for hydrogen extraction including a hydrogen gas reactor, and a liquid hydrogen carrier reservoir consistent with disclosed embodiments.
Figure 9B:
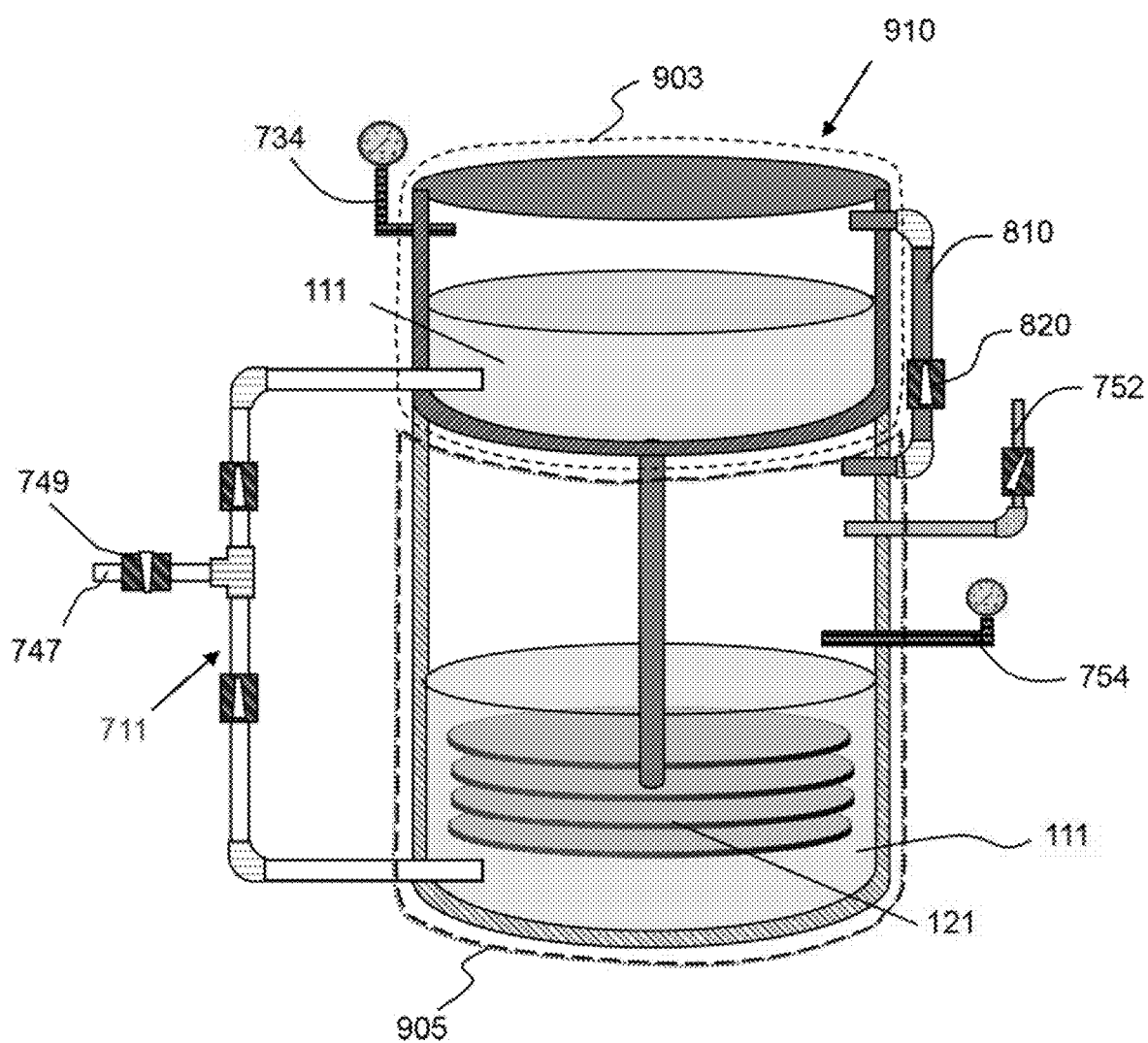

FIG. 9A shows an example embodiment of system 900, which varies in some respects relative to system 700. In an example embodiment of system 900, liquid hydrogen carrier reservoir 701 is positioned relative to hydrogen gas reactor 120 such that a flow of liquid hydrogen carrier 111 from liquid hydrogen carrier reservoir 701 to hydrogen gas reactor 120 is facilitated by gravity. For example, liquid hydrogen carrier reservoir 701 may be positioned above hydrogen gas reactor 120. In an example embodiment shown in FIG. 9A, liquid hydrogen carrier channel 711 may connect liquid hydrogen carrier reservoir 701 and hydrogen gas reactor 120 similar to the configuration shown in FIG. 7B, but may contain a vertical section. Similarly, gas connecting channel 810 may contain a vertical section, and as previously described, may be configured to control pressure between liquid hydrogen carrier reservoir 701 and hydrogen gas reactor 120. In some embodiments, during startup, system 700 may be configured to flow liquid hydrogen carrier 111 from liquid hydrogen carrier reservoir 701 to hydrogen gas reactor 120 at least partially due to elevation and the effects of gravity. In some embodiments, after a working pressure is established in liquid hydrogen carrier reservoir 701 and hydrogen gas reactor 120, a pressure head (e.g., the pressure difference between liquid hydrogen carrier reservoir 701 and hydrogen gas reactor 120 per weight of the unit volume of liquid hydrogen carrier 111) may be selected to balance the gravity effects caused by the elevation of liquid hydrogen carrier reservoir 701 positioned above hydrogen gas reactor 120. FIG. 9B shows a version of the design of the embodiment shown in FIG. 9A, where liquid hydrogen carrier reservoir 701 and hydrogen gas reactor 120 may be incorporated into a single structure system 910 being a variation of system 700. For example, a top section 903 may include a liquid hydrogen carrier reservoir (herein for this embodiment referred to as liquid hydrogen carrier reservoir 903), and a bottom section 905 may include a hydrogen gas reactor (herein for this embodiment referred to as hydrogen gas reactor 905). It should be noted that a single structure system 910 may include all the elements of system 700 such as liquid hydrogen carrier channel 711, various valves of system 700 as well as gas connecting channel 810, hydrogen gas outlet 752, catalyst 121, liquid hydrogen carrier 111 and pressure sensors 734 and 754.

Figure 10:
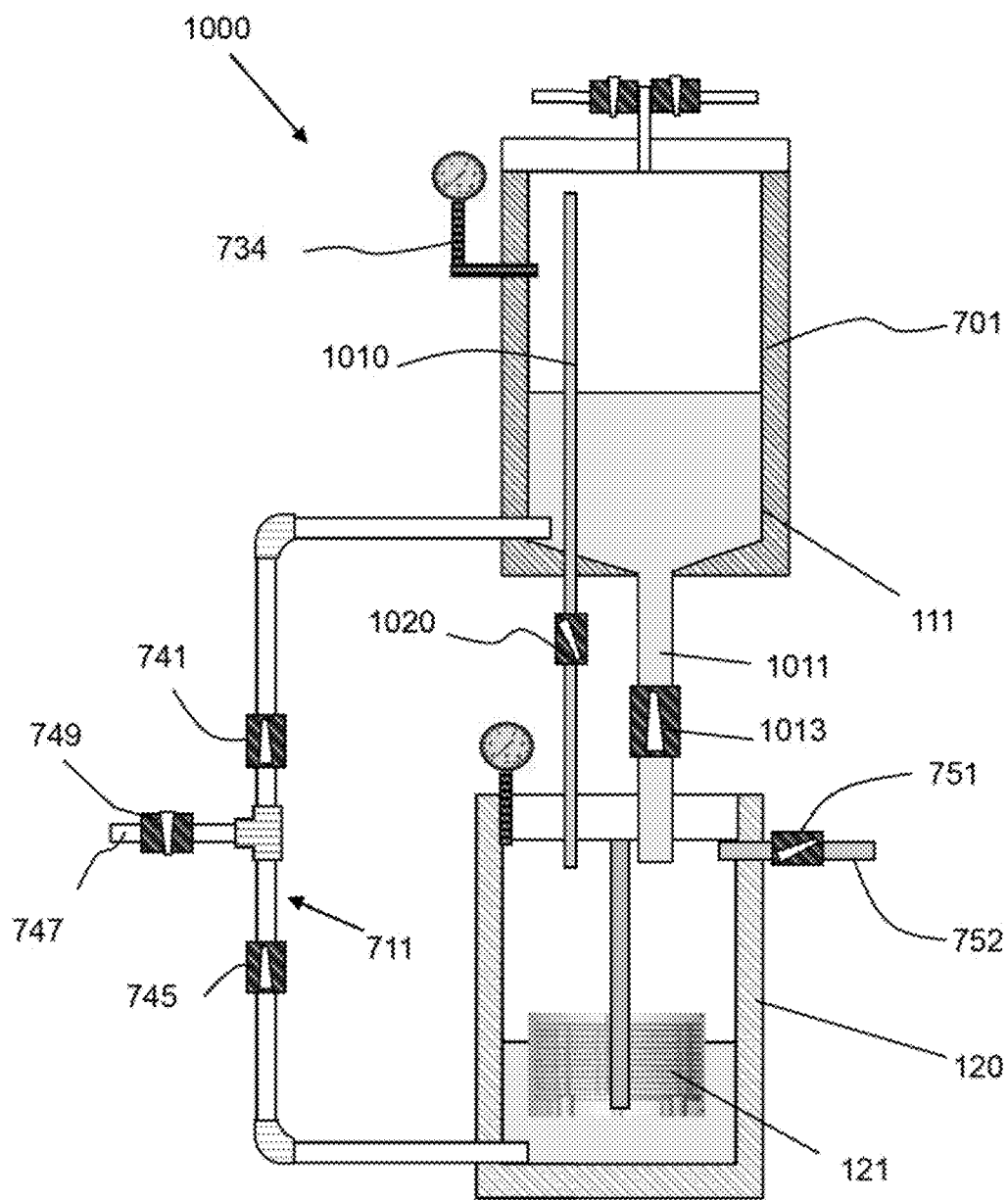
FIG. 10 shows an embodiment of a system for hydrogen extraction including a hydrogen gas reactor and a liquid hydrogen carrier reservoir consistent with disclosed embodiments.

FIG. 10, shows a system 1000 that varies in some respects relative to the design of system 700. As shown in FIG. 10, liquid hydrogen carrier reservoir 701 is connected to hydrogen gas reactor 120 via a first liquid hydrogen carrier channel 1011 and a second liquid hydrogen carrier channel 711, similar to the liquid hydrogen carrier channel shown in FIGS. 7A and 7B (thus referred to as a second liquid hydrogen carrier channel 711). In various embodiments, the first liquid hydrogen carrier channel 1011 may be configured to flow liquid hydrogen carrier 111 from liquid hydrogen carrier reservoir 701 due to the force of gravity. In various embodiments, an inflow of channel 1011 may be located inside liquid hydrogen carrier 111 in liquid hydrogen carrier reservoir 701, and outflow of channel 1011 may be placed within a region of hydrogen gas reactor 120 containing gas. In various embodiments, the flow of liquid hydrogen carrier 111 from liquid hydrogen carrier reservoir 701 to hydrogen gas reactor 120 may be controlled by valve 1013 such that, when opened, valve 1013 allows a flow of liquid hydrogen carrier 111 from liquid hydrogen carrier reservoir 701 to hydrogen gas reactor 120, and when closed, valve 1013 prevents such flow. In various embodiments, channel 1011 may be used during a startup of system 1000 to ensure that liquid hydrogen carrier 111 flows into hydrogen gas reactor 120 (in some cases, positioning outflow of channel 1011 within a region of hydrogen gas reactor 120 containing gas may ensure that all of liquid hydrogen carrier 111 flows from liquid hydrogen carrier reservoir 701 to hydrogen gas reactor 120).

Similar to gas connecting channel 810 of system 910 shown in FIG. 9B, system 1000 may include a gas connecting channel 1010 controlled by valve 1020. Routing gas connecting channel 1010 within enclosures forming hydrogen gas reactor 120 and liquid hydrogen carrier reservoir 701 may provide an additional measure for preventing gas leakage from system 1000. For example, if gas connecting channel 1010 is routed within hydrogen gas reactor 120 or liquid hydrogen carrier reservoir 701, leakage of gas connecting channel 1010 may result in gas leaking into sealed enclosures of hydrogen gas reactor 120 or liquid hydrogen carrier reservoir 701. Various other elements shown in system 1000 may be the same or similar to corresponding elements of system 700.

Figure 11:
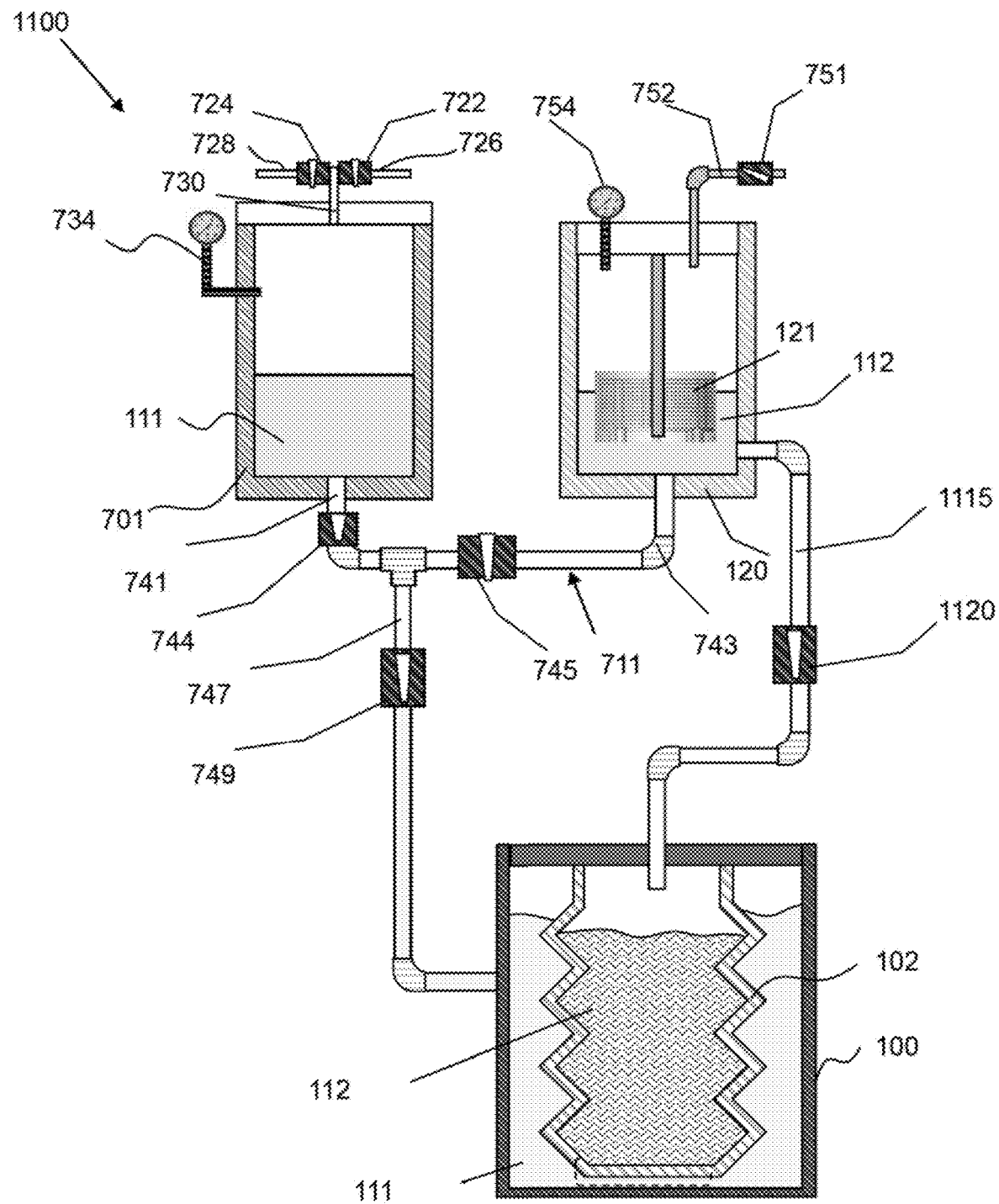
FIG. 11 show s an exemplary embodiment of a system for hydrogen extraction including a spent liquid hydrogen carrier conduit consistent with disclosed embodiments.

In various embodiments, system 700 (as well as related systems 710, 800, 900, 910, and 1000) may require disposal of spent liquid hydrogen carrier 112 (e.g., when most or all of hydrogen gas 773 has been extracted from liquid hydrogen carrier 111). FIG. 11 shows an illustrative embodiment of system 1100 similar to the system 700 shown in FIG. 7A. System 1100 may include liquid hydrogen carrier reservoir 701, connected to hydrogen gas reactor 120 via liquid hydrogen carrier channel 711. Further, system 1100 may include liquid hydrogen carrier tank 100 having chamber 101 for liquid hydrogen carrier 111 and chamber 102 for spent liquid hydrogen carrier 112. In an example embodiment, shown in FIG. 11 chamber 102 may be a contractible bladder, that may expand when spent liquid hydrogen carrier 112 flows into chamber 102. In various embodiments, liquid hydrogen carrier tank 100 may be connected to hydrogen gas reactor 120 via a spent liquid hydrogen carrier conduit 1115 configured to carry spent liquid hydrogen carrier 112 from hydrogen gas reactor 120 to chamber 102 of liquid hydrogen carrier tank 100. In various embodiments, spent liquid hydrogen carrier conduit 1115 includes spent liquid hydrogen carrier conduit valve 1120 configured to open and close a flow of spent liquid hydrogen carrier 112 between hydrogen gas reactor 120 and chamber 102. In various embodiments, system 1100 may be configured to flow spent liquid hydrogen carrier 112 from hydrogen gas reactor 120 into chamber 102 of liquid hydrogen carrier tank 100 when there is no significant change in observed pressure in hydrogen gas reactor 120 and when hydrogen gas outlet valve 751 is closed. For example, if there is no flow of hydrogen gas 773 from hydrogen gas reactor 120, then, if liquid hydrogen carrier 111 contains hydrogen gas that can be extracted in hydrogen gas reactor 120, the pressure in hydrogen gas reactor 120 may increase. Thus, if the pressure in hydrogen gas reactor 120 is not increasing (e.g., the rate of change of pressure in hydrogen gas reactor 120 is below a threshold value that can be any suitable value), liquid hydrogen carrier 111 and liquid hydrogen carrier 112 may be spent. In an example embodiment, during removal of spent liquid hydrogen carrier 112 from hydrogen gas reactor 120, valve 745 may be closed, and valve 1120 may be opened facilitating the flow of spent liquid hydrogen carrier 112 from hydrogen gas reactor 120 into chamber 102. In an example embodiment, valves 749 and 744 may be opened allowing liquid hydrogen carrier 111 to flow from chamber 101 of liquid hydrogen carrier tank 100 into liquid hydrogen carrier reservoir 701 via channel 747 and branch 741. It should be noted, that it may not be necessary to remove all of spent liquid hydrogen carrier 112 from hydrogen gas reactor 120. For example, by removing spent liquid hydrogen carrier 112 from hydrogen gas reactor 120, hydrogen gas in hydrogen gas reactor 120 may expand leading to a reduction in pressure in hydrogen gas reactor 120. Further, removing an entire volume of spent liquid hydrogen carrier 112 from hydrogen gas reactor 120 may lead to hydrogen gas flowing into chamber 102 via spent liquid hydrogen carrier, conduit 1115. In various embodiments, by maintaining some portion of spent liquid hydrogen carrier 112 within hydrogen gas reactor 120, hydrogen gas may be prevented from flowing into chamber 102, in order, for example, to avoid exposing hydrogen gas to oxygen gas that may be present in chamber 102.

When a sufficient amount of spent liquid hydrogen carrier 112 is removed from hydrogen gas reactor 120, valve 1120 and valve 749 may be closed, and valves 744 and 745 may be open resulting in a flow of liquid hydrogen carrier 111 from, liquid hydrogen carrier reservoir 701 into hydrogen gas reactor 120 lending to the generation of hydrogen gas in hydrogen gas reactor 120 due to liquid hydrogen carrier interacting with catalyst 121 (according to the processes described above, for example).

In various embodiments, thermal management of system 700 may include cooling hydrogen gas reactor 120 as well as liquid hydrogen carrier reservoir 701, among other components. In order to maintain target temperature values within hydrogen gas reactor 120 and liquid hydrogen carrier reservoir 701, hydrogen gas reactor and liquid hydrogen carrier reservoir temperature sensors may be used for measuring temperatures respectively in hydrogen gas reactor 120 and/or liquid hydrogen carrier reservoir 701. In various embodiments, data associated with measured temperatures may be transmitted to computing system 15, which may compare measured temperature values in hydrogen gas reactor 120 and/or liquid hydrogen carrier reservoir 701 with respective target temperature values. In various embodiments, if the observed temperature of hydrogen gas reactor 120 and/or liquid hydrogen carrier reservoir 701 (as reported by respective temperature sensors) is higher than a target temperature, computing system 15 may adjust a cooling rate for hydrogen gas reactor 120 and/or liquid hydrogen carrier reservoir 701 to reduce a difference between the observed temperature of hydrogen gas reactor 120 (or liquid hydrogen carrier reservoir 701) and the target temperature value for hydrogen gas reactor 120 (or liquid hydrogen carrier reservoir 701). In an example embodiment, computing system 15 may control a liquid cooling system designed to remove heat from hydrogen gas reactor 120 and liquid hydrogen carrier reservoir 701. In an example embodiment, computing system 15 may adjust a flow rate of liquid circulating in the liquid cooling system (e.g., cooling water jacket 625 as shown in FIG. 6) using a pump for controlling the liquid flow. In various embodiments, computing system 15 may be configured to maintain the temperature in hydrogen gas reactor 120 in the range of 40 to 110 degrees Celsius. It should be noted, however, that depending on a working pressure of system 700, external loads, a type of liquid hydrogen carrier used, the range of target temperatures for hydrogen gas reactor 120 may be different. Furthermore, while the liquid cooling system may be effective at cooling hydrogen gas reactor 120 and liquid hydrogen carrier reservoir 701 other cooling systems may be used such as forced air cooling, conductive cooling or thermoelectric cooling.

In various embodiments, system 700 may be operated differently during a startup process, during the main working cycle for extracting hydrogen from liquid hydrogen carrier 111 and during a replenishing process, when spent liquid hydrogen carrier 112 is extracted from hydrogen gas reactor 120. Various embodiments of the startup process are described first, followed by a description of the main working cycle, further followed by a description of the replenishing process. As defined herein, unless otherwise noted, the terms "main working cycle", "main cycle" or "main process" refer to a process of extraction of hydrogen gas from liquid hydrogen carrier 111. Duration of the main cycle may depend on an average rate of flow of hydrogen gas 773 out of hydrogen gas reactor 120, which, in turn, may depend on hydrogen gas consumption requirements of various external loads.

Figure 12C:
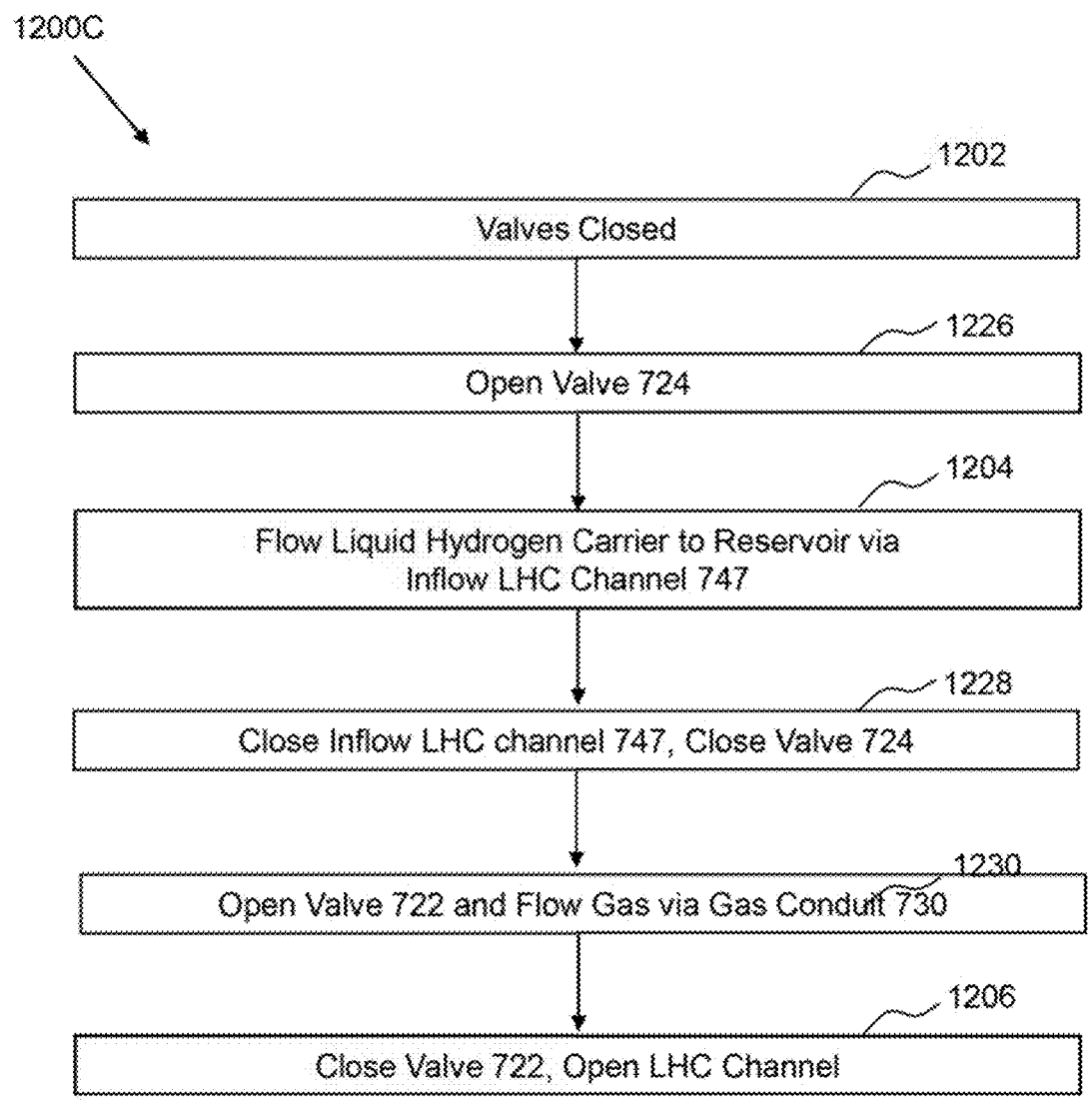

FIGS. 12A-12E describe various embodiments for starting up a cycle of generating hydrogen gas in hydrogen gas reactor 120 using liquid hydrogen carrier 111 interacting with catalyst 121. FIG. 12A shows a process 1200A for starting system 700. At step 1202 of process 1200A, all valves of system 700 (e.g., liquid hydrogen carrier valves 749,744,745, and gas valves 722,724, 751,759, 820) may be closed, and system 700 may be pressurized. For example, hydrogen gas reactor 120, liquid hydrogen carrier reservoir 701 and various conduits and channels of system 700 may be pressurized (i.e., the pressure in hydrogen gas reactor 120, liquid hydrogen carrier reservoir 701 and various channels may be higher than the ambient pressure making certain that environmental gases do not enter any of the elements of system 700). In various embodiments, due to the absence of liquid hydrogen carrier 111 and/or spent liquid hydrogen carrier 112 in hydrogen gas reactor 120 and liquid hydrogen carrier reservoir 701 pressure within system 700 may be lower than when liquid hydrogen carrier 111 and/or spent liquid hydrogen carrier 112 is present in the system. Nevertheless, the pressure within the system may be higher than ambient pressure. In various embodiments, the pressure within system 700 may be determined by (e.g., established in view of) a pressure requirement for hydrogen gas exiting system 700 through hydrogen gas outlet 752 for various external loads (e.g., fuel cells). In some embodiments, the pressure within system 700 may be in the range of one to a few hundred psi.

At step 1204 of process 1200A as applied to system 700 shown in FIG. 7A, valve 749 and valve 744 may be opened, while valve 745 may be closed. At step 1204 system 700 is configured to flow liquid hydrogen carrier 111 from liquid hydrogen carrier tank 100 to liquid hydrogen carrier reservoir 701 via channel 747 and branch 741 of liquid hydrogen carrier channel 711. When step 1204 is applied to system 710 shown in FIG. 7B, valve 749 may be opened, and valve 745 may be closed. For this embodiment, at step 1204, system 700 may flow liquid hydrogen carrier 111 from liquid hydrogen carrier tank 100 to liquid hydrogen carrier reservoir 701 via channel 747 directly into liquid hydrogen carrier reservoir 701 as shown in FIG. 7B.

At step 1206 of process 1200A as shown in FIG. 12A, the system 700 may stop supplying liquid hydrogen carrier 111 from liquid hydrogen carrier tank 100 to liquid hydrogen carrier reservoir 701. For example, at step 1206 valve 749 may be closed, terminating the flow of liquid hydrogen carrier 111. This step may be combined with a step of opening liquid hydrogen carrier channel 711 for flowing liquid hydrogen carrier 111 between hydrogen gas reactor 120 and liquid hydrogen carrier reservoir 701. Liquid hydrogen carrier channel 711 may be opened by opening valves 744 and 745 for system 700 shown in FIG. 7A, or opening valve 745 for system 710 shown in FIG. 7B. Liquid hydrogen carrier 111 may flow from liquid hydrogen carrier reservoir 701 to hydrogen gas reactor 120 if the pressure in liquid hydrogen carrier reservoir 701 is higher than the pressure of hydrogen gas reactor 120. To ensure that the pressure of liquid hydrogen carrier reservoir 701 is higher than hydrogen gas reactor 120, liquid hydrogen carrier reservoir 701 may be pressurized prior to opening liquid hydrogen carrier channel 711 for flowing liquid hydrogen carrier 111 as described in a process 1200B shown in FIG. 12B.

Process 1200B is similar to process 1200A with an additional step 1216 of pressurizing liquid hydrogen carrier reservoir 701 prior to step 1206, as shown in FIG. 12B. Steps 1202, 1204, and 1206 of process 1200B may be the same as the corresponding steps of process 1200A. At step 1216, valve 740 is closed thus preventing inflow/outflow of liquid hydrogen carrier 111 from liquid hydrogen carrier reservoir 701. Valve 722 as shown in FIG. 7A may be opened to flow a gas (e.g., hydrogen gas or inert gas) into liquid hydrogen carrier reservoir 701 to increase pressure in liquid hydrogen carrier reservoir 701. In an example embodiment, gas may flow into liquid hydrogen carrier reservoir 701 via valve 722 to ensure that a pressure difference between liquid hydrogen carrier reservoir 701 and hydrogen gas reactor 120 is sufficient to flow liquid hydrogen carrier 111 into hydrogen gas reactor 120. Additionally, the pressure within liquid hydrogen carrier reservoir 701 may control the volume of liquid hydrogen carrier 111 flowing into hydrogen gas reactor 120, thus controlling a rate of hydrogen extraction or supply from hydrogen gas reactor 120 as well as the pressure of hydrogen gas in hydrogen gas reactor 120.

FIG. 12C shows an example embodiment of a startup process 1200C that may be similar to process 1200A and process 1200B. In an example embodiment, steps 1202, 1204, and 1206 of process 1200C may be the same or similar to corresponding steps of process 1200A. After completion of step 1202, at step 1226, valve 724 may be opened to allow some of the gas contained in liquid hydrogen carrier reservoir 701 to be removed from liquid hydrogen carrier reservoir 701, thus venting liquid hydrogen carrier reservoir 701. In various embodiments, the gas may be directed to a gas storage tank, or, in case liquid hydrogen carrier reservoir 701 contains hydrogen gas, hydrogen gas can be used to power an external load. By venting system 700, less force (from a pump, for example) may be required to flow liquid hydrogen carrier 111 from liquid hydrogen carrier tank 100 into liquid hydrogen carrier reservoir 701.

At step 1228, when a sufficient amount of liquid hydrogen carrier 111 flows in liquid hydrogen carrier reservoir 701, the flow of liquid hydrogen carrier 111 may be stopped by closing valve 749 (and/or by stopping a pump responsible for pushing liquid hydrogen carrier 111 into liquid hydrogen carrier reservoir 701). During step 1228, valve 724 may be closed to prevent further venting of liquid hydrogen carrier reservoir 701. Step 1230 of process 1200C may be similar to step 1216 of process 1200B. For example, at step 1230, valve 722 as shown in FIG. 7A may be opened to flow a gas (e.g., hydrogen gas or inert gas into liquid hydrogen carrier reservoir 701 to increase pressure in liquid hydrogen carrier reservoir 701.

Figure 12D:
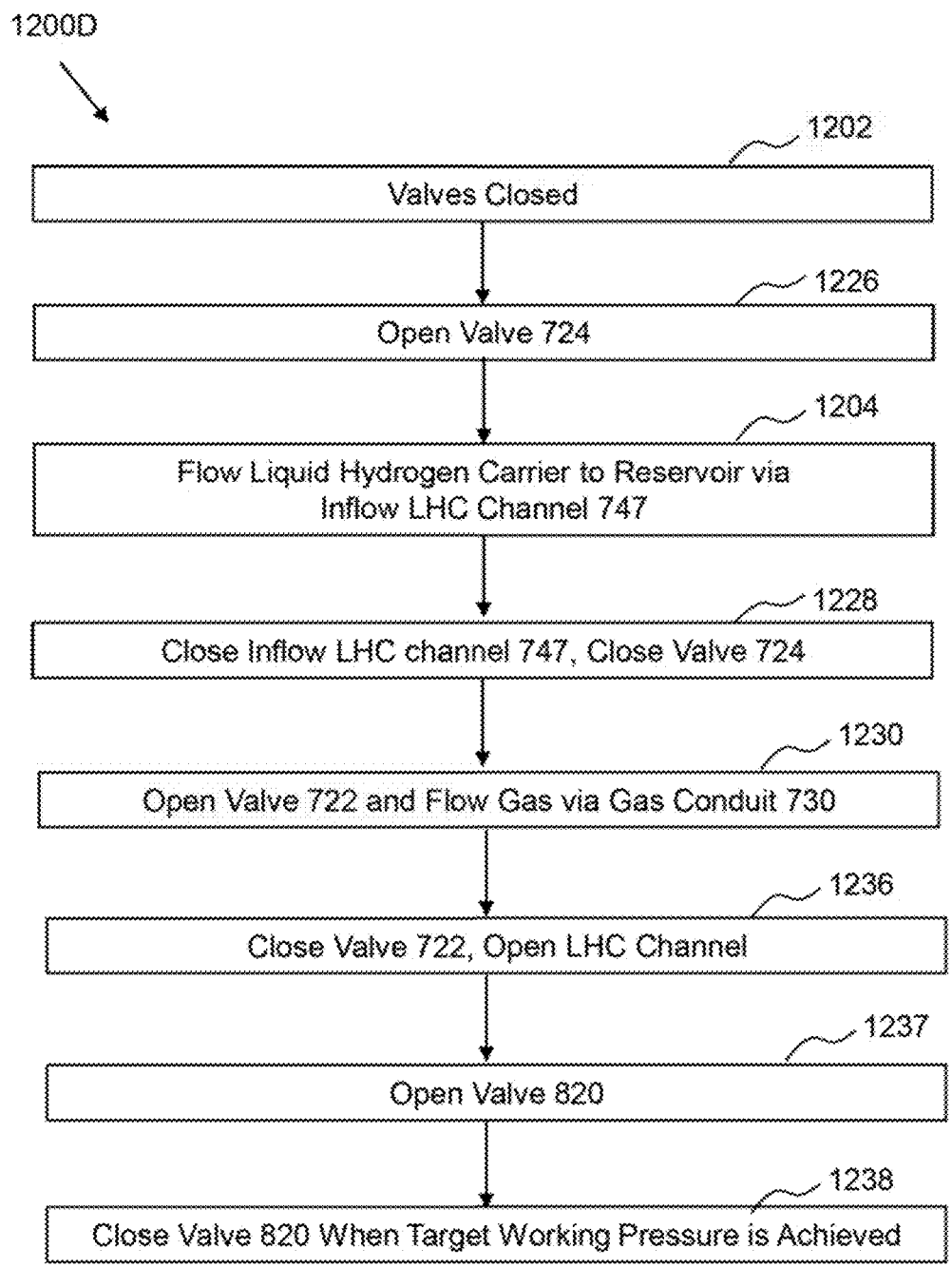
Figure 12E:
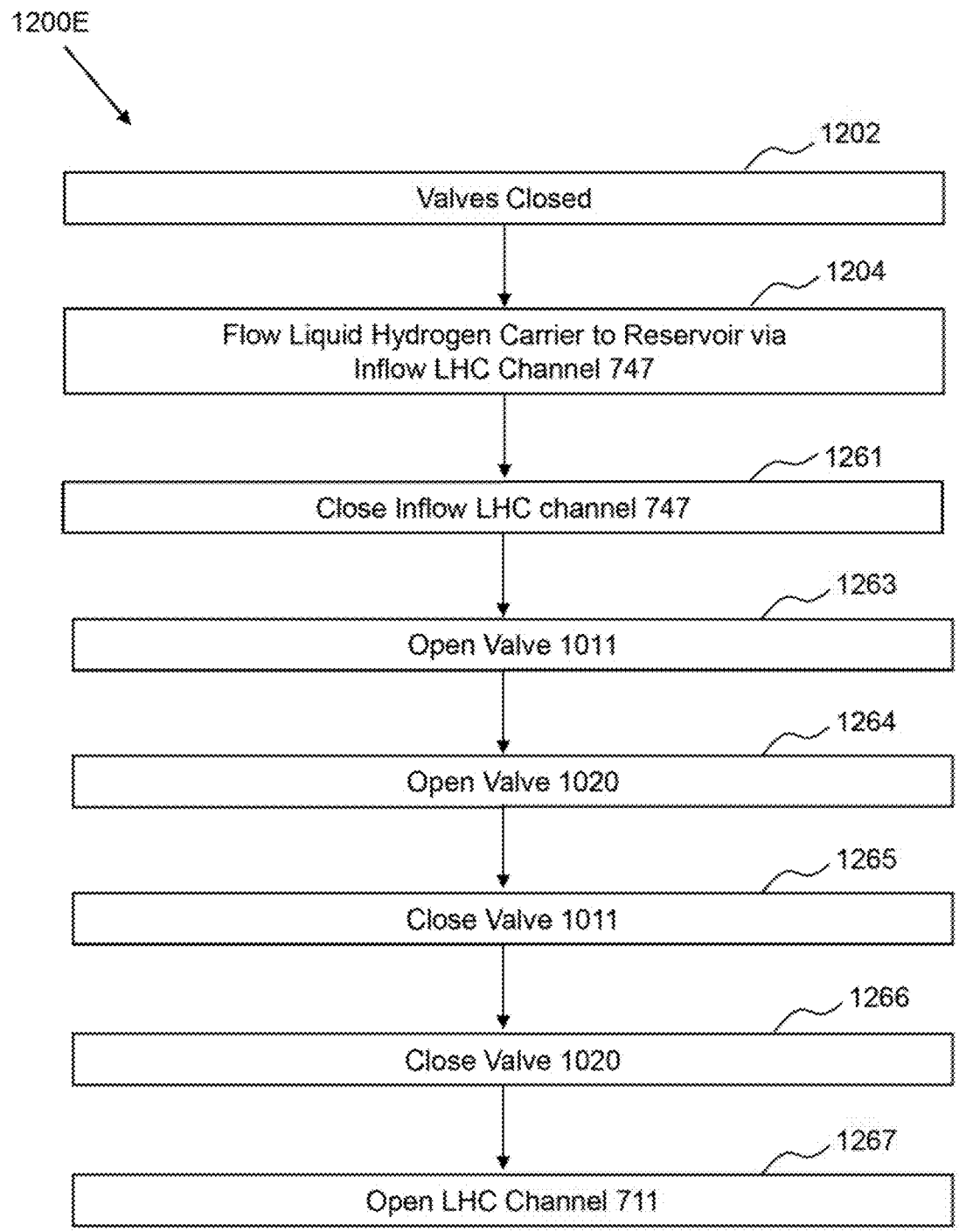

A process 1200D shown in FIG. 12D may be similar to process 1200C shown in FIG. 12C. For example, steps 1202, 1226, 1204, 1228, and 130 of process 1200D may be the same or similar to the corresponding steps of process 1200C. Process 1200D may apply to a system, such as system 800 shown in FIG. 8. At step 1236 of process 1200D, valve 722 may be closed, and liquid hydrogen carrier channel 711 may be opened to start the flow of liquid hydrogen carrier 111 from liquid hydrogen carrier reservoir 701 to hydrogen gas reactor 120. In order to equalize pressure between hydrogen gas reactor 120 and liquid hydrogen carrier reservoir 701, valve 820 may be opened at step 1237. In an example embodiment, step 1237 may follow step 1236 with some delay. For example, step 1237 may follow step 1236 when the amount of liquid hydrogen carrier 111 within hydrogen gas reactor 120 is above a threshold value for liquid hydrogen carrier 111. The opening of valve 820 may allow the flow of extracted hydrogen gas from hydrogen gas reactor 120 to liquid hydrogen carrier reservoir 701, thus equalizing pressure within system 800. At step 1238, valve 820 may be closed when pressure with system 800 reaches a working pressure for system 800.

A process 1200E shown in FIG. 12D may be similar to process 1200A shown in FIG. 12A. Process 1200E may be directed to a system such as system 1000 shown in FIG. 10. Steps 1202 and 1204 may be the same as or similar to the corresponding steps of process 1200A. At step 1261 inflow liquid hydrogen carrier channel 747 may be closed (e.g., by closing valve 749). At step 1263 opening valve 1020 may lead to liquid hydrogen carrier 111 flowing from liquid hydrogen carrier reservoir 701 to hydrogen gas reactor 120 due to a force of gravity. In a step 1264, valve 1020 may be open to allow the flow of hydrogen gas from hydrogen gas reactor 120 into liquid hydrogen carrier reservoir 701 for pressure equalizing. In various embodiments, when a predetermined amount of liquid hydrogen carrier 111 flows into hydrogen gas reactor 120, valve 1020 may be closed at step 1265. At step 1266, when the pressure within system 1000 reached the working pressure, valve 1020 may be closed, and at step 1267, liquid hydrogen carrier channel 711 may be opened to allow liquid hydrogen carrier 111 to flow between hydrogen gas reactor 120 and liquid hydrogen carrier reservoir 701.

Figure 13:
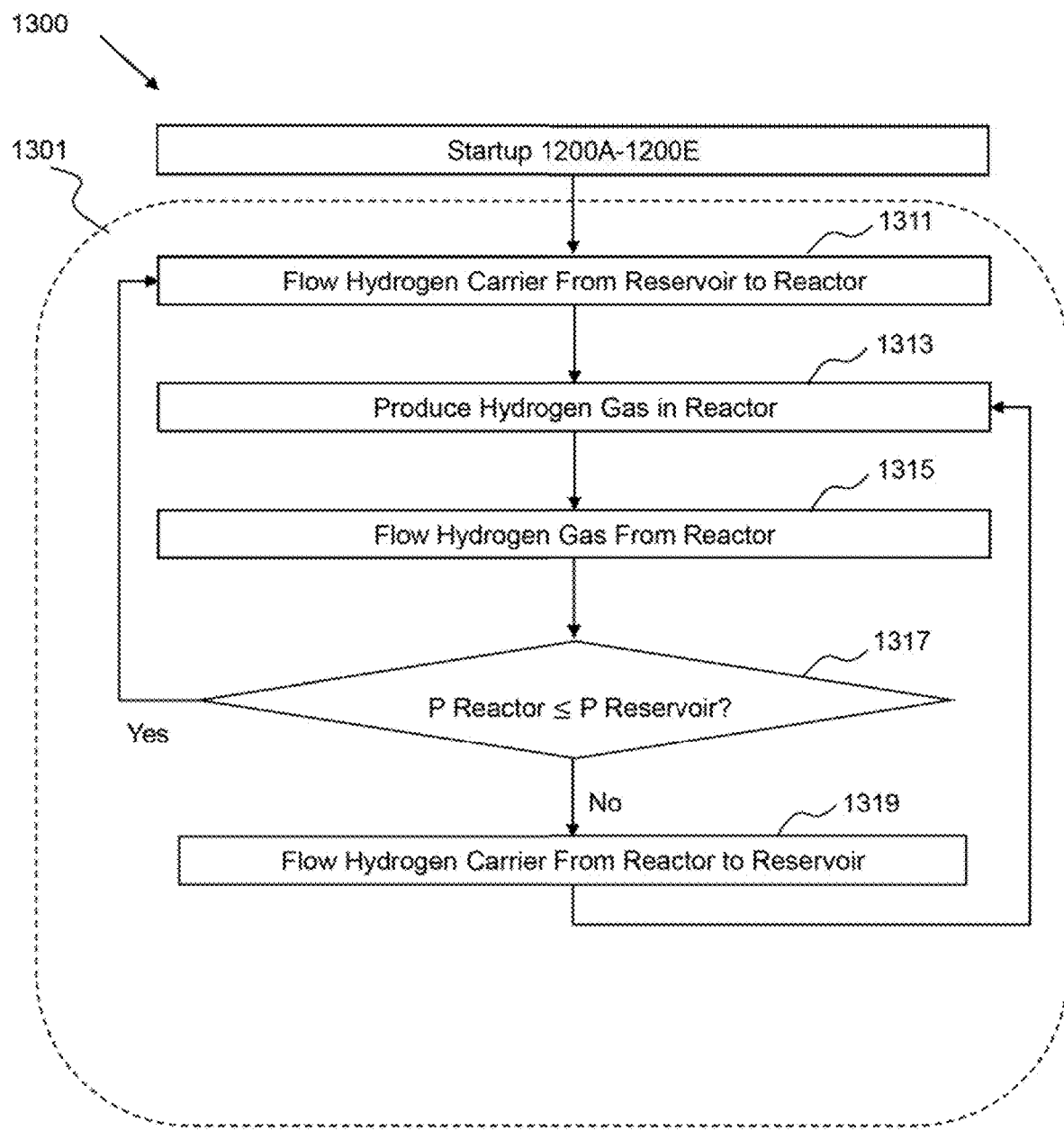
FIG. 13 shows an exemplary main cycle process for extracting hydrogen gas using a system for hydrogen extraction consistent with disclosed embodiments.

FIG. 13 shows process 1300 that includes startup process (1200A-1200E) and the main cycle 1301 for operating systems 700 through 1000. At a step 1311 of the main cycle 1301, process 1300 may include flowing liquid hydrogen carrier 111 from liquid hydrogen carrier reservoir 701 to hydrogen gas reactor 120. At step 1313 liquid hydrogen carrier 111 in hydrogen gas reactor 120 may interact with catalyst 121 resulting in the extraction of hydrogen gas from liquid hydrogen carrier 111. At step 1315 when the pressure of hydrogen gas in hydrogen gas reactor 120 reaches a target value, hydrogen gas may be released out of hydrogen gas reactor 120 via hydrogen gas outlet 752, thus reducing the pressure in hydrogen gas reactor 120. At step 1317 if the pressure in hydrogen gas reactor 120 is less than or equal to the pressure of liquid hydrogen carrier reservoir 701 (step 1317, Yes), process 1300 may return to step 1311. Alternatively, if the pressure in hydrogen gas reactor 120 is greater than the pressure of liquid hydrogen carrier reservoir 701 (step 1317, No), liquid hydrogen carrier 111 may flow from hydrogen gas reactor 120 into liquid hydrogen carrier reservoir 701 via liquid hydrogen carrier channel 711, as described in step 1319. After completion of step 1319 or while completing step 1319, process 1300 may return to step 1313.

Figure 14:
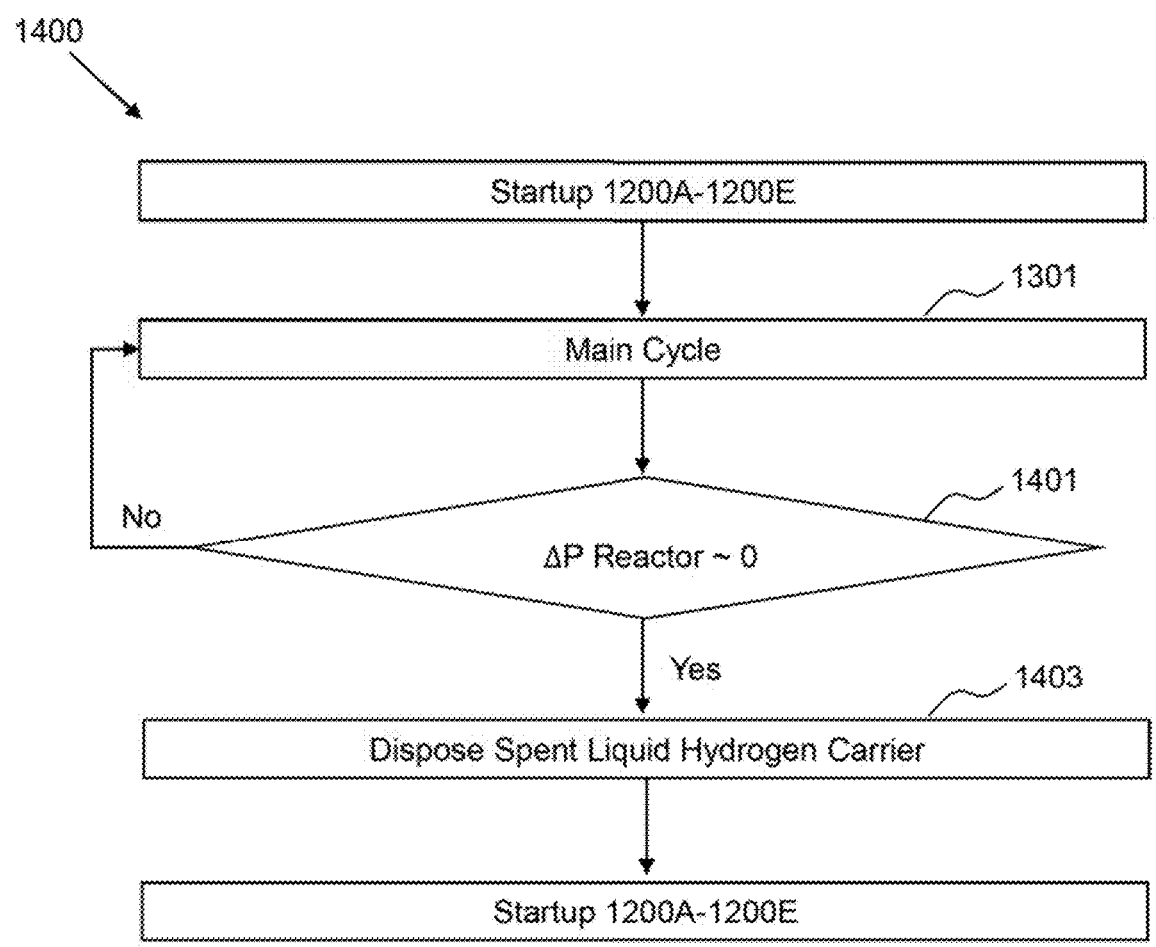
FIG. 14 shows an exemplary replenishing process for a system for hydrogen extraction consistent with disclosed embodiments.

In various embodiments, process 1400 of FIG. 14 may be used to start system 700, extract hydrogen from liquid hydrogen carrier 111 and dispos of spent liquid hydrogen carrier 112. At startup 1200A-1200E the system 700 starts extraction of hydrogen gas from liquid hydrogen carrier as discussed above. At step 1301 system 700 executes the main cycle as discussed above. Main cycle step 1301 may be terminated at step 1401 involving evaluating changes in pressure of hydrogen gas in hydrogen gas reactor 120 as a function of time. For example, if the pressure of hydrogen gas in hydrogen gas reactor 120 is not substantially changing (e.g., the change in pressure is less than five percent or less than ten percent when measured over a target time interval such as one minute, two minutes, etc.) (step 1401, Yes), process 1400 may move to step 1403 and spent liquid hydrogen carrier 112 may be disposed of or released using, for example, spent liquid hydrogen carrier conduit 1115. The release of spent liquid hydrogen carrier 112 via spent liquid hydrogen carrier conduit 1115 may be facilitated by opening spent liquid hydrogen carrier conduit valve 1120. At step 1401, if the pressure of hydrogen gas in hydrogen gas reactor 120 is determined to be changing (e.g., the change in pressure is greater than five percent when measured over the target time interval) (step 1401, No), process 1400 may move to step 1301 and continue the main cycle.

It should be noted that processes 1200A through 1400 described above are only illustrative and variation of these processes is possible. For example, in process 1200E step 1266 may be removed, and in the process 1200E step 1230 may be removed, and step 1236 may be modified and include only opening liquid hydrogen carrier channel. In various cases, a combination of steps of different processes may yield a viable process for controlling various aspects of hydrogen extraction from liquid hydrogen carrier 111.

Figure 15:
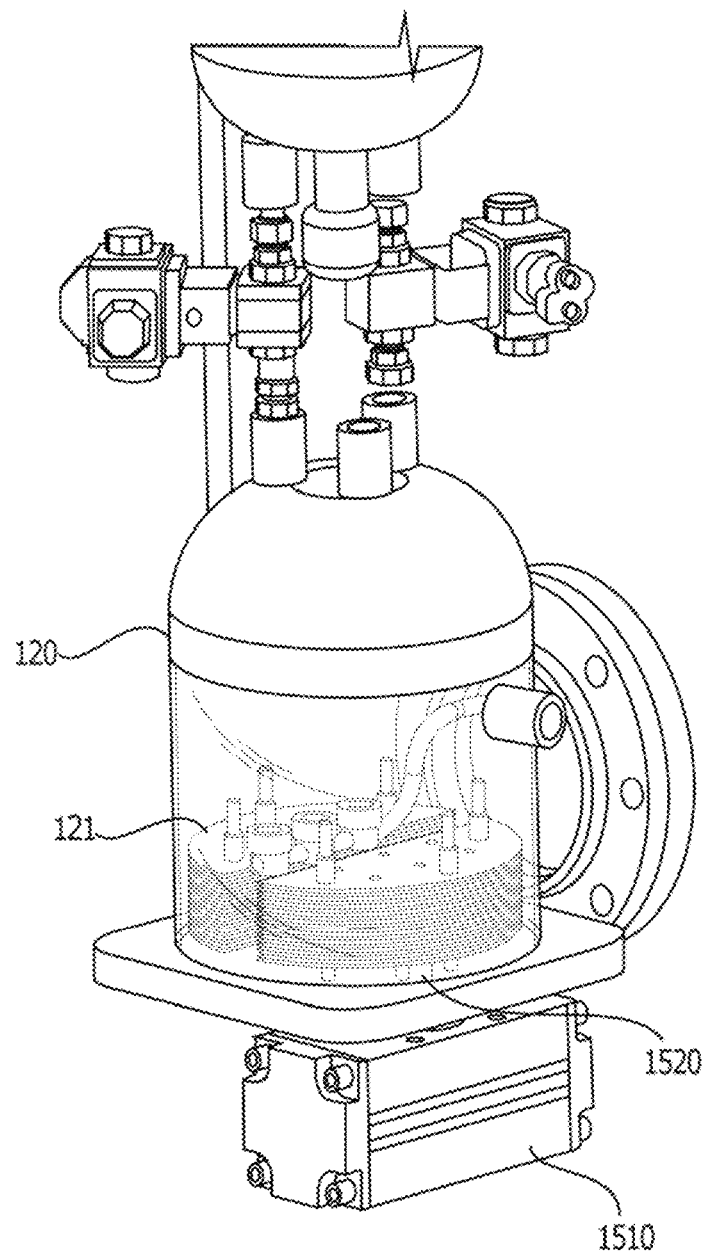
FIG. 15 shows an exemplary hydrogen gas reactor with a movable catalyst consistent with disclosed embodiments.

In some embodiments, as described above, the hydrogen generation system may include a catalyst that is fixed relative to the hydrogen gas reactor. In such embodiments, hydrogen generation may be controlled by changing an amount of liquid hydrogen carrier allowed to contact the catalyst (e.g., by flowing liquid hydrogen carrier into or out of the hydrogen gas reactor to change a level of the liquid hydrogen carrier relative to a fixed catalyst). In other embodiments, however, the catalyst may be movable within the hydrogen gas reactor. For example, in some embodiments, as discussed in more detail below, the catalyst may be configured to move within the hydrogen gas reactor in order to control an amount of surface area of the catalyst allowed to contact the liquid hydrogen carrier. This movement may be electronically controlled (e.g., based on sensor output(s) and a feedback loop) in order to control an amount of hydrogen gas produced and/or a rate of hydrogen gas production. Alternatively or additionally, one or more other movable components may be included in the hydrogen gas reactor in order to cause relative motion between the catalyst and the liquid hydrogen carrier. Hydrogen gas reactor 120 may include an actuator device to move the catalyst 121 and/or the liquid hydrogen carrier 111 relative to each other to regulate hydrogen extraction. FIG. 15 shows an exemplary embodiment of hydrogen gas reactor 120 with moveable components. As shown in FIG. 15, hydrogen gas reactor 120 may include an actuation device 1510 connected to catalysts 121 by one or more rods 1520. Actuation device 1510 may be configured to cause motion of catalysts 121 through rods 1520, or via any other suitable mechanical linkages. The actuation device may also be configured to move other components within the reactor 120, such as pistons, paddles, walls, rotors, etc. in order to cause relative motion between catalyst 121 and a liquid hydrogen carrier. Actuation device 1510 may include, for example, a motor configured to move the catalyst 121 and/or the liquid hydrogen carrier 111 within hydrogen gas reactor 120. Actuation device 1510 may further include mechanisms such as gears, levers, cams, drive screws, chains, belts, pulleys, racks and pinions, or the like, to translate rotational or another type of movement into a desired movement of the catalyst or other components associated with hydrogen gas reactor 120 in order to cause relative motion between catalyst 121 and the liquid hydrogen carrier. Alternatively or additionally, actuation device 1510 may include pneumatic actuators, hydraulic actuators, electronic actuators, solenoids, springs, magnetic drives, or the like.

Figure 16:
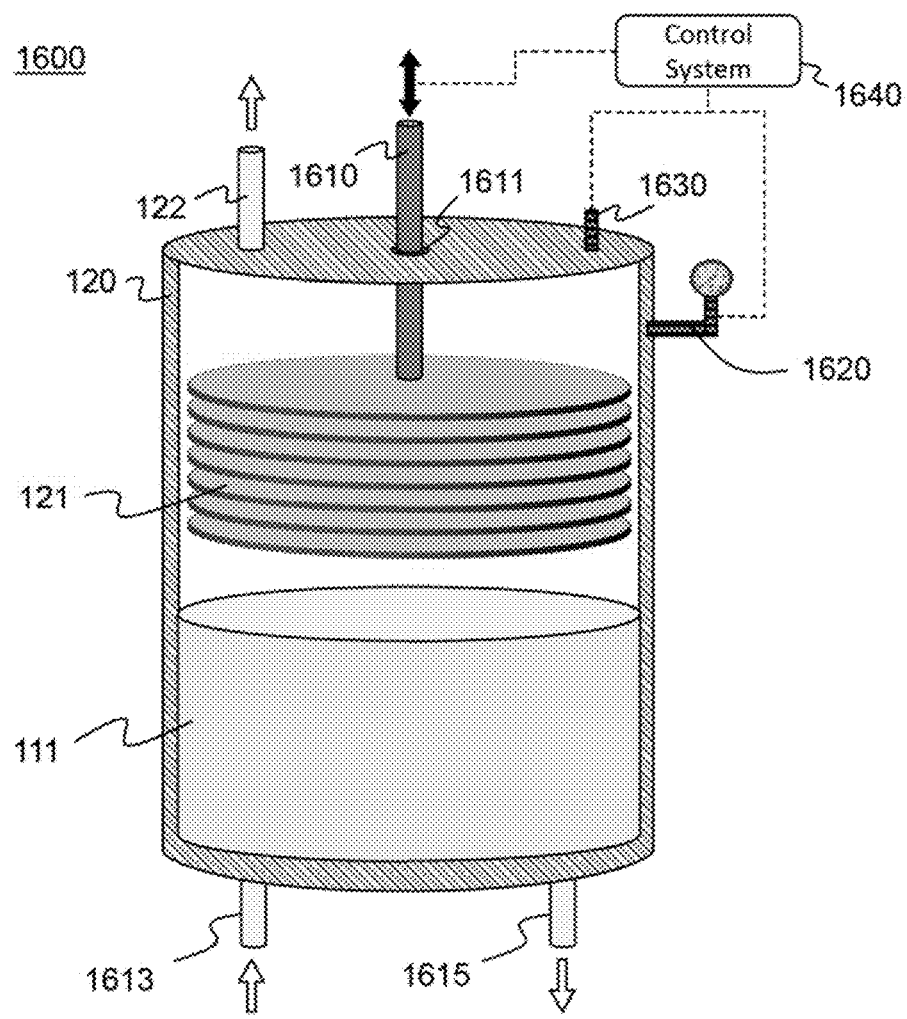
FIG. 16 shows another exemplary hydrogen gas reactor with a movable catalyst consistent with disclosed embodiments.

In some exemplary embodiments, the hydrogen gas reactor 120 may comprise an enclosure configured to hold the liquid hydrogen carrier 111 and catalyst 121. When liquid hydrogen carrier 111 is present in hydrogen gas reactor 120, catalyst 121 may be selectively moved into and out of the liquid hydrogen carrier 111 to generate hydrogen gas. For example, as the catalyst moves in and out of the liquid carrier 111, the contact surface area between the catalyst 121 and the liquid hydrogen carrier 111 may increase or decrease. Accordingly, the rate of extraction of the hydrogen gas from the liquid hydrogen carrier may increase or decrease in response to the changing contact surface area between the catalyst 121 and the liquid hydrogen carrier 111. In some embodiments, the catalyst may be configured to move linearly in and out of the liquid carrier when the carrier is present in the hydrogen gas reactor. For example, the catalyst may move vertically and may be submerged in the liquid carrier when lowered within the hydrogen gas reactor. FIG. 16 shows an exemplary system 1600 including a hydrogen gas reactor 120 with a catalyst 121 configured to selectively move into and out of the liquid hydrogen carrier. Hydrogen gas reactor 120 may include a conduit for delivering the liquid hydrogen carrier into and out of the hydrogen gas reactor and a conduit for flowing the hydrogen gas out of the hydrogen gas reactor. For example, as shown in FIG. 16, hydrogen gas reactor 120 may include an inlet 1613 to receive liquid hydrogen carrier 111 and an outlet 1615 to expel spent liquid hydrogen carrier. Hydrogen gas reactor 120 may further include a hydrogen gas outlet 122 to expel hydrogen gas extracted from the liquid hydrogen carrier. Inlet 1613, outlets 1615 and 122 are shown in an exemplary configuration only in FIG. 16, and it is understood that various other configurations and/or locations may be used.

In some embodiments, as noted above, a rod or other form of mechanical linkage may be attached to catalyst 121 to facilitate the movement of catalyst 121. The system may also include a motor or other device configured to control a motion of a catalyst via the mechanical linkage. For example, actuator device 1510, described above, may connect to the mechanical linkage to control the motion of the catalysts. FIG. 16 shows an exemplary linkage 1610 connecting to catalysts 121. Linkage 1610 may be configured to move catalysts 121 in and out of contact with liquid hydrogen carrier 111. While FIG. 16 shows linkage 1610 as a rod extending vertically through the top of hydrogen gas reactor 120, various other configurations may be used. For example, a mechanical linkage may be configured to connect to catalyst 121 through the bottom or side of hydrogen gas reactor 120. Linkage 1610 may also include a variety of other mechanisms, such as a lever arm, a cable, a chain, a roller, or any other device suitable for causing motion of the catalyst 121. In some embodiments, hydrogen gas reactor 120 may further include a seal 1611, or other means for maintaining a pressure within the reactor in conjunction with the linkage 1610.

Hydrogen gas reactor 120 may further comprise one or more sensors to facilitate monitoring and/or control of the hydrogen extraction process. In some embodiments, for example, hydrogen gas reactor 120 may include a pressure sensor configured to generate an output indicative of a pressure associated with hydrogen gas reactor 120. As shown in FIG. 16, for example, pressure sensor 1620 may be configured to detect or measure an internal pressure of hydrogen gas reactor 120. Pressure sensor 1620 may be the same as or similar to pressure regulator 144, described above. The location and configuration of pressure sensor 1620 shown in FIG. 16 is provided by way of example only, and various other configurations and locations may be used. The hydrogen extraction system may further comprise a control system configured to cause movement of the catalyst based on the output of the pressure sensor 1620. For example, as shown in FIG. 16, control system 1640 may be in electronic communication with pressure sensor 1620. Pressure sensor 1620 may be configured to transmit a signal indicative of a measured pressure value to control system 1640. Such communication may occur through a wired connection or may be transmitted via a wireless communication method (e.g., WiFi, Bluetooth®, RFID, NFC, RF, infrared, etc.). Accordingly, pressure sensor 1620 may further be equipped with a communication module or other device to transmit the signal. Pressure sensor 1620 may also include a local display, such as an analog or digital display of the measured pressure value, as shown in FIG. 16.

The control system 1640 may further be configured to control the motion of the catalysts 121. For example, the control system 1640 may be configured to communicate or control a motor or actuator, such as actuator device 1510, and may send one or more control signals for causing a desired motion of catalysts 121 (or any other movable component of hydrogen gas reactor 120). The actuator device may then cause a motion of the catalyst 121, for example, through mechanical linkage 1610. The control system may be configured to communicate with the actuator device through a wired or wireless communication method (e.g., WiFi, Bluetooth®, RFID, NFC, RF, infrared, etc.). Accordingly, control system 1640 may also include a communication component or other device enabling communication with various devices. Control system 1640 may be associated with computing system 15, as shown in FIG. 1.

In some embodiments, the control system 1640 may be configured to control the movement of the catalyst (e.g., in a feedback loop arrangement) based on a difference between a target pressure value and the pressure associated with the hydrogen gas reactor, as indicated by the output of the pressure sensor. For example, when the catalysts 121 are placed into the liquid hydrogen carrier 111, the extracted hydrogen gas may result in an increase in pressure within hydrogen gas reactor 120. The control system 1640 may receive a signal from pressure sensor 1620 indicating the internal pressure of hydrogen gas reactor 120. The control system may then determine that the measured internal pressure is different from a predetermined target pressure value. In response, the control system may operate to reduce and/or eliminate this difference between the target pressure value and the observe pressure value by changing an amount or rate of hydrogen gas production. For example, the control system may transmit a control signal, for example to actuator device 1510, in order to cause motion of catalysis 121 either further into or out of the liquid hydrogen carrier in order to increase or decrease the rate of hydrogen extraction and thereby the pressure within the hydrogen gas reactor 120.

The predetermined target pressure may be established in a variety of ways. For example, a user or operator of the system may set the pressure, for example using interface system 16, as shown in FIG. 1. The target pressure may also include a calculated value based on other variables, for example, based on a measured temperature within hydrogen gas reactor 120 or a set demand for hydrogen. In some exemplary embodiments, the control system 1640 may be configured to control the motion of the catalysts in relation to a value calculated based on a received signal, for example, based on a rate of change of pressure or other values. In some cases, the target pressure may be established to correspond with the specifications of a particular type or size of a hydrogen consumer (e.g., a fuel cell, etc.).

Alternatively or additionally, the hydrogen extraction system may include a temperature sensor configured to generate an output indicative of a temperature associated with the hydrogen gas reactor. As shown in FIG. 16, for example, temperature sensor 1630 may be configured to detect or measure an internal temperature of hydrogen gas reactor 120. Temperature sensor 1630 may be similar to or the same as thermocouple sensor 145, described above. For example, temperature sensor 1630 may include a thermowell, a thermistor, a resistance temperature detector (RTD), a thermocouple, a semiconductor-based temperature sensor, or various other devices. Further, the location and configuration of temperature sensor 1630 shown in FIG. 16 is provided by way of example only, and various other configurations and/or locations may be used. The hydrogen extraction system may further include a control system configured to cause cooling of the hydrogen gas reactor in response to an output of the temperature sensor. For example, as shown in FIG. 16, control system 1640 may be configured to communicate electronically with temperature sensor 1630. Alternatively, a separate control system may be used to communicate with temperature sensor 1630 (e.g., the same as or different from the control system used to communicate with pressure sensor 1620). Control system 1640 may cause cooling of the hydrogen gas reactor 120 based on the output of temperature sensor 1630 in a variety of ways. In some embodiments, control system 1640 may cool the hydrogen gas reactor 120 through cooling jacket 625, for example, by controlling a flow rate of water, glycol, or some other gas or liquid coolant through the cooling jacket. Various other means for generating a cooling effect associated with the hydrogen gas reactor 120 may be used.

In some embodiments, control system 1640 may be configured to cause cooling of the hydrogen gas reactor in response to a sensed difference between a target temperature value and the temperature associated with the hydrogen gas reactor indicated by the output of the temperature sensor. For example, the hydrogen extraction process within hydrogen gas reactor 120 may generate heat, increasing the temperature within the hydrogen gas reactor 120. The control system 1640 may receive a signal from temperature sensor 1630 indicative of the internal temperature of hydrogen gas reactor 120. The control system may then determine that the measured internal temperature value exceeds a predetermined target temperature value. In response, the control system may transmit a control signal to one or more electronically controlled components configured for cooling the reactor. The electronically controlled components may respond to the control signal or signals by increasing a flow rate of water, glycol, or some other gas or liquid coolant through the cooling jacket described above, for example. Of course, any other suitable controllable cooling system or cooling component may also be used in conjunction with the disclosed embodiments. The predetermined target temperature may be established in a variety of ways. For example, a user or operator of the system may set the temperature, for example using interface system 16, as shown in FIG. 1. The target temperature may also be set automatically, or calculated based on other variables, for example, based on a measured pressure within hydrogen gas reactor 120.

Figure 17:
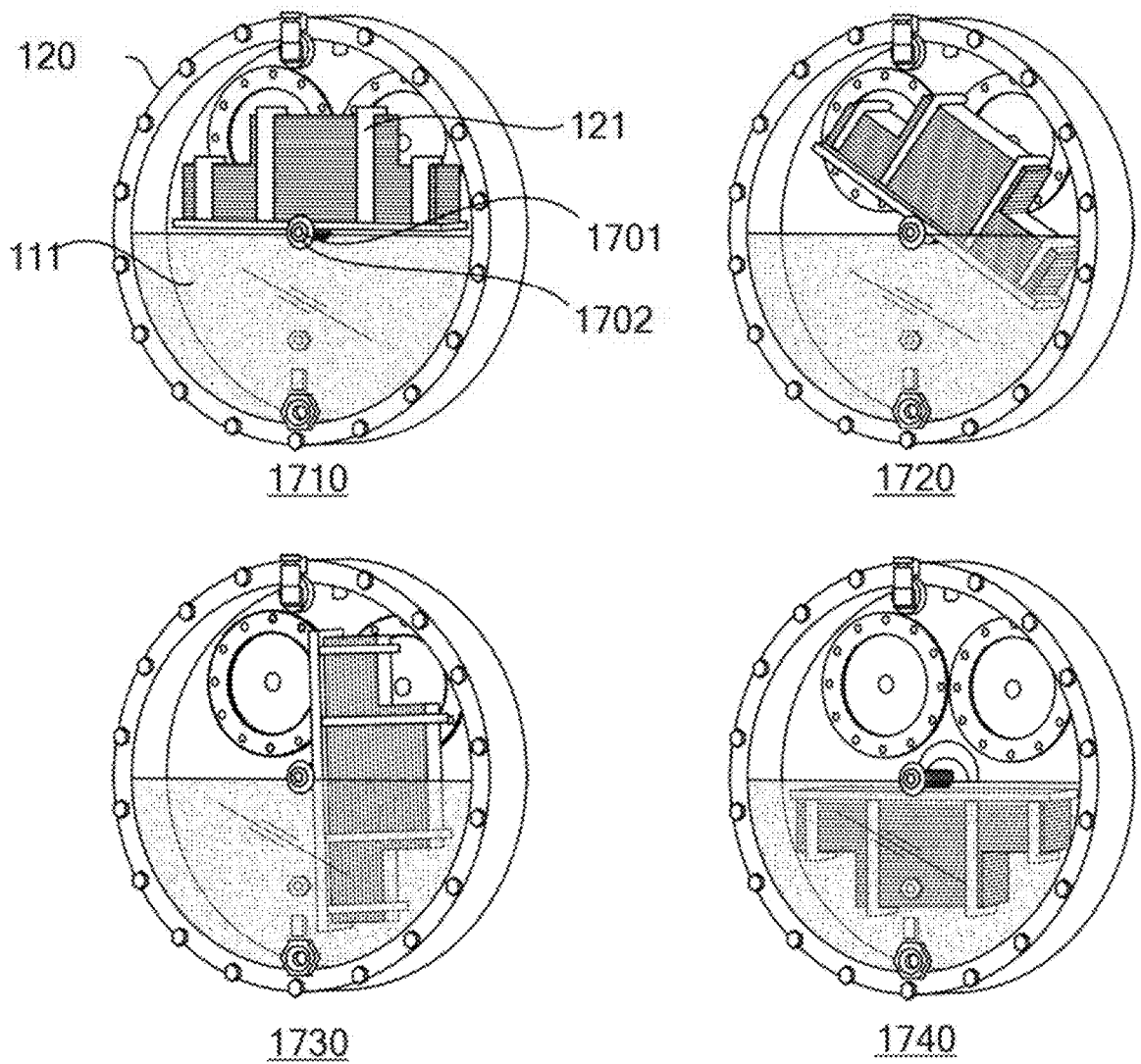
FIG. 17 shows an exemplary hydrogen gas reactor with a rotatable catalyst consistent with disclosed embodiments.

In some exemplary embodiments, the catalyst may be configured to rotate about an axis. In such embodiments, the rotation of the catalyst about the axis may be configured to increase or decrease an amount of surface area of the catalyst exposed to the liquid hydrogen carrier. FIG. 17 shows an exemplary hydrogen gas reactor 120 including a catalyst 121 configured to rotate about an axis. The axis may correspond to a shaft 1701 that extends through hydrogen gas reactor 120. The catalyst 121 may be coupled to the shaft, such that rotation of the shaft 1701 causes rotation of the catalyst 121 within the reactor and movement of live catalyst 121 relative to the liquid hydrogen carrier 111. The system may include one or more mechanical devices to facilitate rotation of the catalysts. For example, hydrogen gas reactor 120 may further include one or more bearings 1702 rotatably coupled to shaft 1701. In some embodiments, the catalysts 121 may be in a fixed position relative to the hydrogen gas reactor 120, and both the reactor and the catalysts may rotate to cause contact between the catalysts 121 and the liquid hydrogen carrier 111. Shaft 1701 may further be coupled to a motor or actuator (e.g., actuator device 1510, as shown in FIG. 15). The motor may cause rotation of shaft 1701 (or catalysts 121) directly, or indirectly through various other components (e.g., gears, drive shafts, belts, cables, chains, pulleys, etc.).

FIG. 17 shows various stages of operation 1710, 1720, 1730, and 1740 of the rotational catalyst embodiment. In an initial stage 1710, catalysts 121 may be in a position such that no surface of catalysts 121 is in contact with liquid hydrogen carrier 111. This may correspond to a state of the system in which hydrogen gas extraction is not required, or when a reduction of pressure within hydrogen gas reactor 120 is desired. In stage 1720, a portion of the catalysts 121 may be rotated into contact with liquid hydrogen carrier 111. This may cause increased hydrogen gas production/extraction from the liquid hydrogen carrier 111. In stage 1730, the catalysts may further rotate, increasing the surface area of the catalysts 121 that is in contact with liquid hydrogen carrier 111. This may result in a further increase in production of hydrogen gas within hydrogen gas reactor 120. Stage 1740 represents a fully submerged position of the catalysts and may correspond to the highest extraction rate of hydrogen for the system. It is understood that stages 1710, 1720, 1730 and 1740 are provided by way of example only, and various intermediate or alternate stages may be used.

In various disclosed embodiments, the system may rotate catalyst 121 to control or regulate one or more variables associated with the system. For example, catalysts 121 may be rotated to regulate the extraction rate of hydrogen gas within hydrogen gas reactor 120. In such embodiments, the catalysts 121 may be rotated to increase or decrease the surface area in contact with liquid hydrogen carrier 111, thereby increasing, or decreasing the extraction rate of the hydrogen. Rotation of the catalysts 121 may also be controlled based on other values, such as an internal pressure of hydrogen gas reactor 120. For example, control system 1640 may send a signal to a motor or actuator to cause catalysts 121 to be rotated in and out of contact with liquid hydrogen carrier 111 based on a signal indicative of a measured pressure associated with hydrogen gas reactor 120 received from 1620, as described above.

In some embodiments, a hydrogen extraction system according to the present disclosure may be configured to move the liquid hydrogen carrier relative to the catalyst. For example, the system may comprise a hydrogen gas reactor including an enclosure, a catalyst disposed within the enclosure, and at least one movable element configured to selectively move the liquid hydrogen carrier relative to the catalyst in order to change a surface area of the catalyst exposed to the liquid hydrogen carrier. As noted above, to control or regulate the extraction of hydrogen, the system may be configured to move one or both of the liquid hydrogen carrier or the catalyst.

Figure 18:
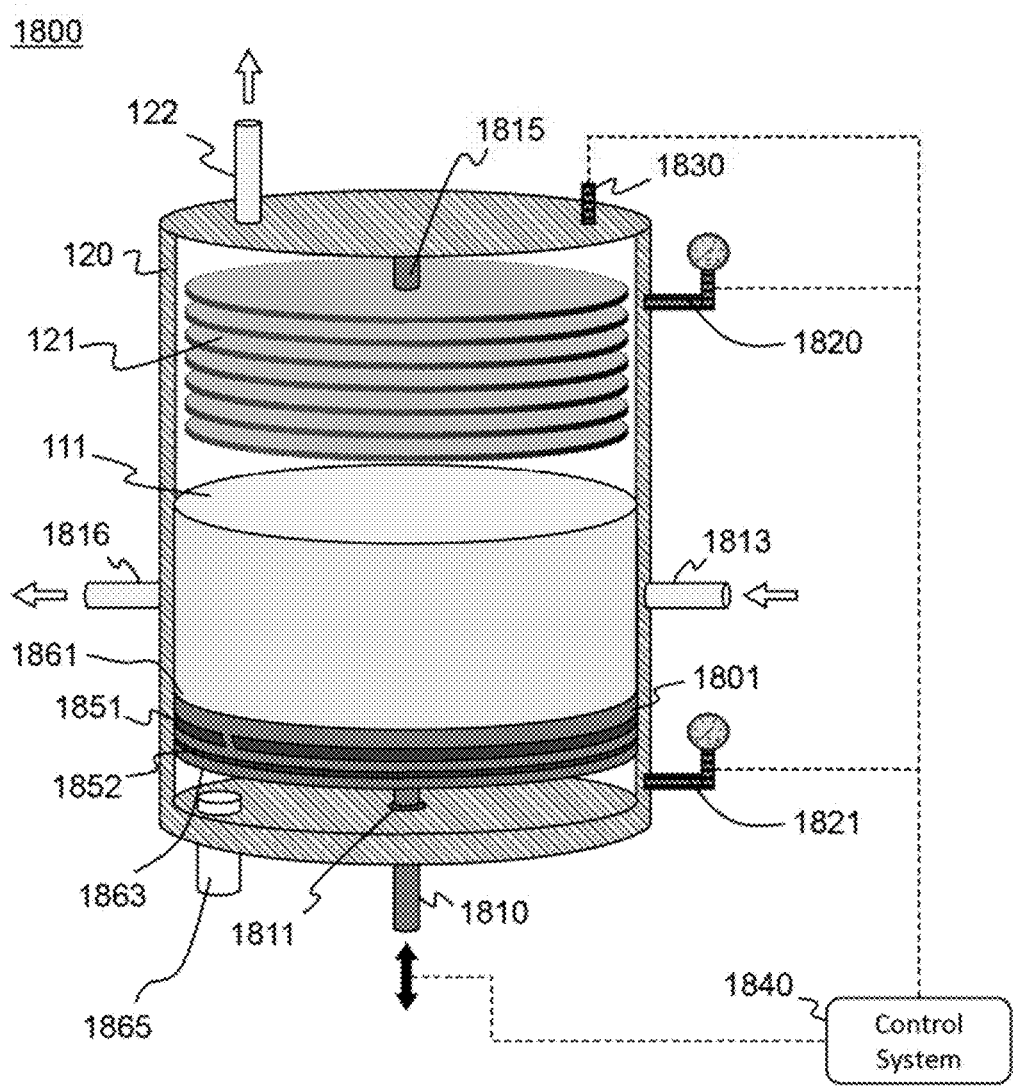
FIG. 18 shows an exemplary hydrogen gas reactor with a movable piston for moving liquid hydrogen carrier consistent with disclosed embodiments.

FIG. 18 shows an exemplary system 1800 with a moveable element for moving the liquid hydrogen carrier 111 relative to catalyst 121. As shown in FIG. 18, the moveable element may include a piston 1801 adjacent to or in contact with liquid hydrogen carrier 111 on one side. Piston 1801 may be configured such that movement of the piston 1801 moves the liquid hydrogen carrier 111 within hydrogen gas reactor 120. For example, movement of piston 1801 may reduce the volume in a portion of hydrogen gas reactor 120 containing the liquid hydrogen carrier 111, causing the catalyst 121 to contact the liquid hydrogen carrier 111. System 1800 may further include a piston shaft 1810 affixed to the piston 1801 to translate a driving force, causing piston 1801 to move. System 1800 may further comprise a motor or actuator for moving piston 1801. For example, piston shaft 1810 may be connected to an actuator device (e.g., actuator device 1510), which is configured to provide linear motion of the piston 1801 within the reactor. The motion of the piston 1801 may be provided by various methods, including but not limited to motors, pneumatic actuators, hydraulic actuators, electronic actuators, solenoids, springs, magnetic drives, or the like. System 1800 may further include a mechanical linkage 1815 to hold the catalysts in a fixed location relative to the hydrogen gas reactor 120. As with system 1600, or the various other embodiments described above, hydrogen gas reactor 120 may include a liquid carrier inlet 1813, a spent carrier outlet 1816 and a hydrogen gas outlet 122.

While FIG. 18 shows piston 1801 moving in a vertical direction, it is understood that various other configurations may be provided to move the liquid carrier. For example, piston 1801 could move in a horizontal direction, reducing the volume in hydrogen gas reactor 120 causing the liquid level of the liquid carrier to rise to contact the catalysts 121. Further, while piston 1801 is shown as a cylindrical piston in FIG. 18, the moveable element may also be a square, a rectangle, or various other shapes based on the configuration of the reactor. The moveable element may also be configured to move rotationally in a curved path or another non-linear path, etc. For example, the moveable element may include a rotatable paddle, an inflatable or collapsible bladder, or any other device capable of causing motion of the liquid hydrogen carrier relative to the catalyst.

In some embodiments, system 1800 may include various other components to facilitate the operation of piston 1801. For example, as shown in FIG. 18, system 1800 may include a piston seal 1852 and a piston guide seal (or wear/guide ring) 1851. Piston seal 1852 may be configured to maintain sealing contact with the internal surface of hydrogen gas reactor 120. Piston seal 1852 may minimize or eliminate the amount of liquid hydrogen carrier 111 that seeps between the piston 1801 and the internal surface of the reactor. Piston seal 1852 may comprise various components, such as an energizer, a slide ring, or the like to maintain sealing contact with the internal cylinder surface. Piston guide ring 1851 may be configured to guide the piston 1801 within hydrogen gas reactor 120 and may prevent direct contact between the piston 1801 and the interior surface of the hydrogen gas reactor 120. Piston guide ring 1851 is shown with an angled cut in FIG. 18, though various other designs or configurations may be used. In some embodiments, the piston guide ring 1851 and the piston seal 1852 may be integrated into a single component. System 1800 may further include a piston shaft seal 1811 to maintain a sealed contact between the piston shaft 1810 and the exterior of hydrogen gas reactor 120.

System 1800 may be configured to move piston 1801 to control or regulate the extraction of hydrogen within hydrogen gas reactor 120. As piston 1801 moves vertically in an upward direction (based on the embodiment shown in FIG. 18), liquid hydrogen carrier 111 may move to contact catalysts 121. Thus, the surface area between the catalysts and the liquid carrier 111 may be increased, thereby increasing the extraction rate of hydrogen within the reactor. Movement of the liquid hydrogen carrier 111 may be controlled by various means. For example, in some embodiments, the motion of the movable element (e.g., the piston) may be activated by a pressure difference between the pressure on a side 1861, as shown in FIG. 18 (also referred to as a first side) of the moveable element and on a side 1863 (also referred to as a second side) of the moveable element. In example embodiments, the first side of the movable element may be the side adjacent to liquid hydrogen carrier 111, as shown in FIG. 18. In various embodiments, the liquid hydrogen carrier 111 may enter the hydrogen gas reactor 120 and interact with catalyst 121. As hydrogen gas is produced, the pressure within the reactor may increase, causing the piston 1801 to lower. Thus, the surface area of the catalysts 121 in contact with the liquid hydrogen carrier 111 may decrease, causing the gas extraction rate to decrease. As the hydrogen gas is released from the reactor, the pressure may decrease, causing the piston to rise and the surface area of the catalysts 121 in contact with the liquid hydrogen carrier 111 to increase, starting the cycle over.

In some embodiments, the pressure difference between the first side of the piston and the second side of the piston alone may be sufficient to cause the piston to move. For example, the piston 1801 may be free to move within the reactor 120, and a pressure differential across the piston may cause piston 1801 to move up or down. In some embodiments, the pressure differential across the piston may be controlled by flowing the gas to/from side 1863 via a conduit 1865. In other embodiments, the movable element may be configured to move under the influence of a mechanical control. For example, a motor or actuator may be used to drive the moveable device as described above. In some cases, the mechanical control may comprise a motor-driven mechanical linkage, such as piston shaft 1810. In such embodiments, system 1800 may further comprise one or more pressure sensors 1820 and 1821 to facilitate control of the moveable element. For example, system 1800 may include pressure sensor 1820, configured to measure and/or detect pressure in hydrogen gas reactor 120. Pressure sensor 1820 may be configured to communicate with a control system 1840, as described above with reference to pressure sensor 1620 and control system 1640. Control system 1840 may also be configured to provide a signal indicative of a control action to cause movement of the piston, as described above. In certain embodiments, system 1800 may further include pressure sensor 1821, positioned on the opposite side of the piston from pressure sensor 1820. Control system 1840 thus may also control the movement of piston 1801 based on a detected pressure difference between the first and second sides of piston 1801.

Figure 19:
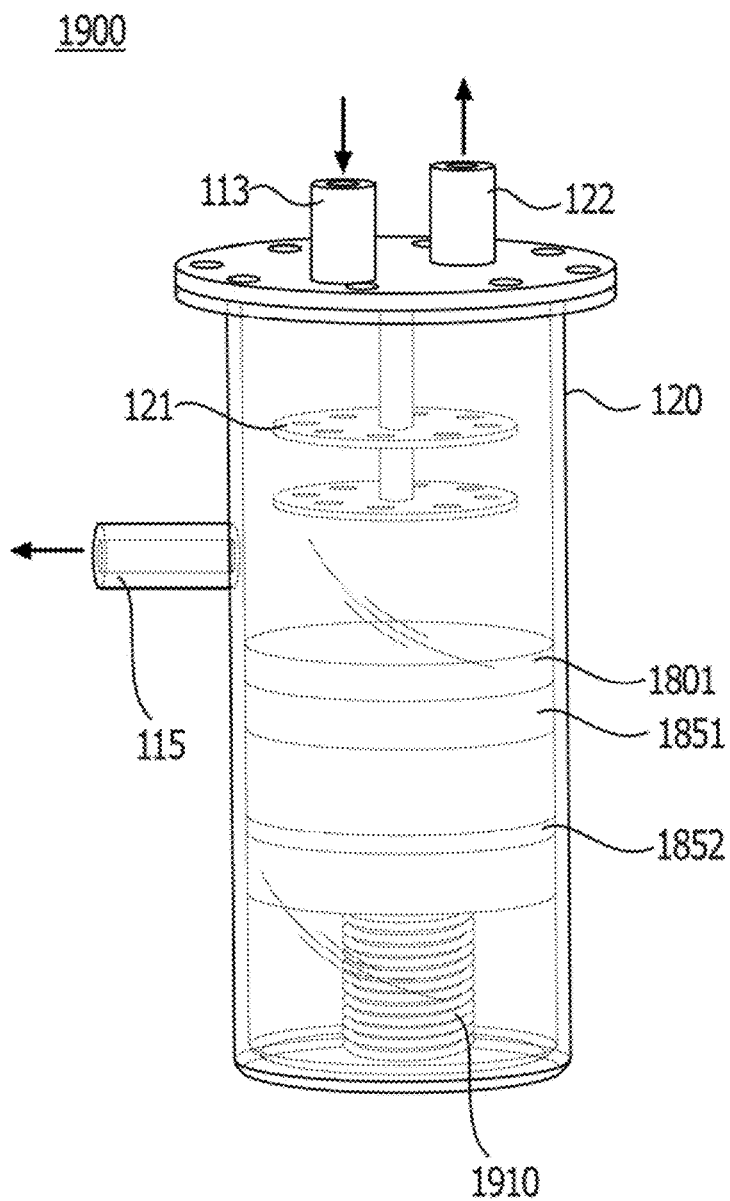
FIG. 19 shows another exemplary hydrogen gas reactor with a movable piston for moving liquid hydrogen carrier consistent with disclosed embodiments.

In other embodiments, as shown in FIG. 19, the movable element may be configured to move under the influence of a spring. For example, as described above, as catalysts 121 interact with the liquid hydrogen carrier 111, the pressure within hydrogen gas reactor 120 may increase (or decrease and thus the force acting on the piston 1801 may also increase (or decrease). The force acting on the piston may cause a spring to contract or expand, allowing the piston to lower or raise. As the hydrogen gas is released from the reactor, and the pressure decreases, the spring may push the piston back upwards, causing the surface area of the catalysts in contact with the liquid hydrogen carrier to increase. FIG. 19 shows an exemplary system 1900 comprising a spring 1910. While spring 1910 is shown as a compression spring, various other forms of springs may be used, such as extension springs, torsion springs, constant force springs, or the like, depending on the configuration of the piston. Springs of any suitable spring constant, k, may be selected in view of the requirements of a particular application. Various other components may be used to provide a force on the piston, such as a pneumatic piston, a hydraulic piston, magnets, a compressible or stretchable material (e.g., rubber, etc.), or the like.

Figure 20:
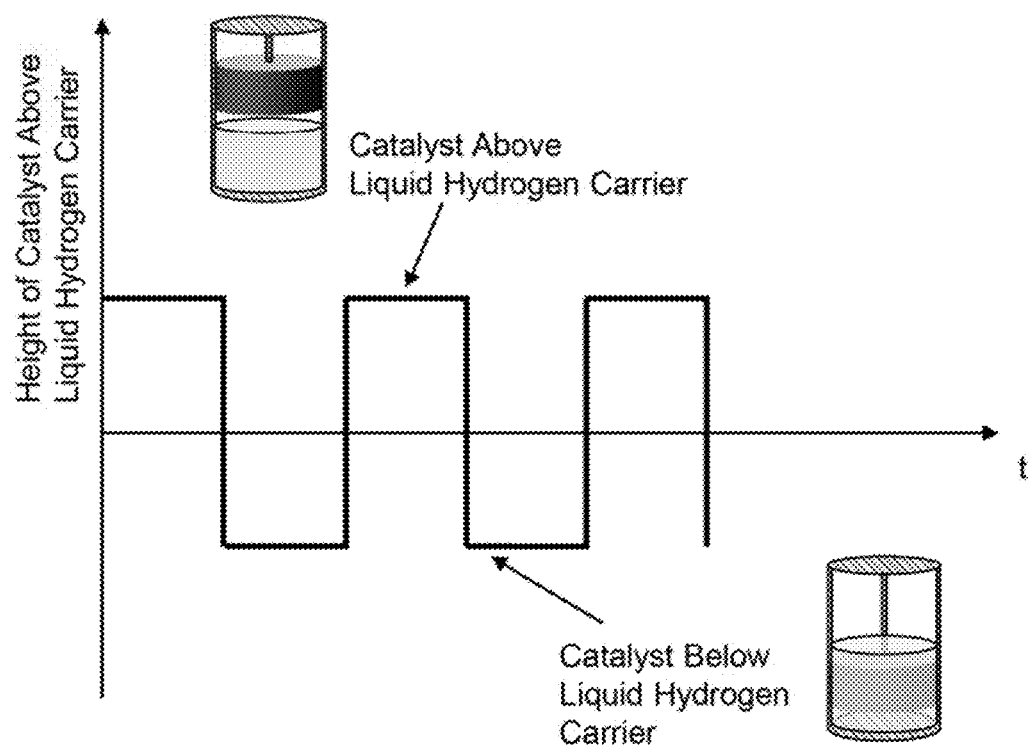
FIG. 20 shows an exemplary graph of a position of a catalyst relative to liquid hydrogen carrier surface consistent with disclosed embodiments.

In some embodiments, a motion of catalyst 121 relative to the liquid hydrogen carrier may be controlled by computing system 15. The motion of catalyst 121 relative to the liquid hydrogen carrier may be described by any appropriate function. In an example embodiment, catalyst 121 may execute a periodic motion relative to the liquid hydrogen carrier. FIG. 20 shows, for example, catalyst 121 periodically contacting the liquid hydrogen carrier (i.e., at least a portion of a surface of catalyst 121 is being wetted by the liquid hydrogen carrier).

In various embodiments, there may be a latency time associated with an increase in extraction of hydrogen gas from liquid hydrogen carrier subsequent to an increase in a contact area between catalyst 121 and liquid hydrogen carrier. As defined herein, the term "latency time" may refer to a time interval required to obtain maximum hydrogen gas extraction rate (for a given wetted area) when liquid hydrogen carrier is placed in contact with the surface of catalyst 121. For example, when catalyst 121 is immersed into the liquid hydrogen carrier, the hydrogen gas extraction rate may increase with time until a maximum extract rate value (for a particular wetted area of the catalyst) is reached. The latency time is the time that it takes to reach such a maximum rate value.

Figure 21A:
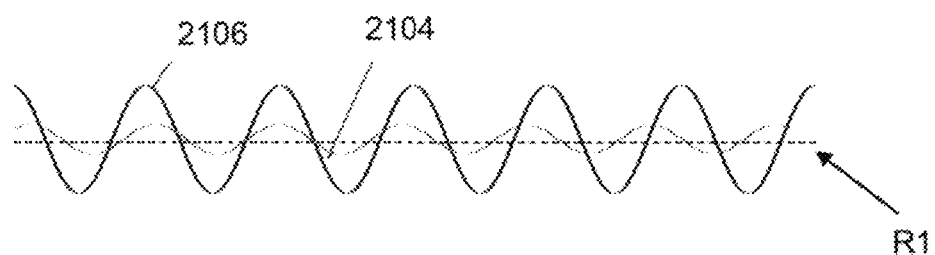
FIGS. 21A and 21B show exemplary graphs of a position of a catalyst relative to liquid hydrogen carrier surface as well as graphs of hydrogen gas pressure fluctuations in a hydrogen gas reactor consistent with disclosed embodiments.
Figure 21B:
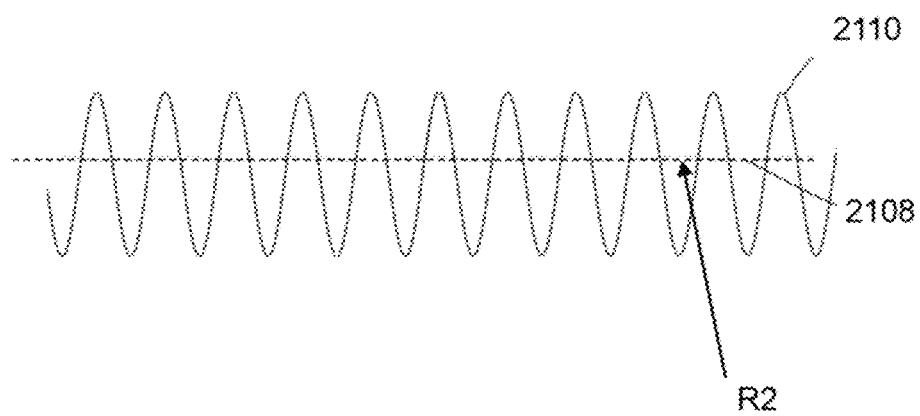

The latency time may be associated with a characteristic time length scale that may be used to determine the rate of motion of catalyst 121 relative to the liquid hydrogen carrier. For example, if catalyst 121 is quickly immersed and withdrawn from liquid hydrogen carrier (herein quickly implies that the duration of the motion is smaller than the latency time), there may not be a substantial extraction of hydrogen gas. In an example embodiment, a periodic immersion of catalyst 121 into the liquid hydrogen carrier followed by withdrawal of catalyst 121 from the liquid hydrogen carrier may determine the extraction rate of hydrogen gas based on a duration of such periodic motion. For example, FIG. 21A shows an exemplary plot 2106 of a time-dependent periodic function for a catalyst moving relative to the liquid hydrogen carrier. A corresponding extraction rate of hydrogen gas is shown by an exemplary plot 2104 with an average extraction rate R1 indicated by a dashed line. FIG. 21B shows an exemplary plot 2110 of a time-dependent periodic function for a catalyst moving relative to the liquid hydrogen carrier. A corresponding extraction rate of hydrogen gas is shown by an exemplary plot 2108 with an average extraction rate R2 indicated by a dashed line. In an example embodiment, a frequency of a periodic motion described by plot 2110 may be higher than the frequency of a periodic motion described by plot 2106 resulting in rate R2 being smaller than rate R1. It should be noted, that periodic motion is only illustrative, and any other suitable motion of catalyst as a function of time may be used. Additionally, or alternatively, both catalyst 121 and liquid hydrogen carrier 111 may be moved (e.g., liquid hydrogen carrier may be moved using piston 1801).

Figure 22:
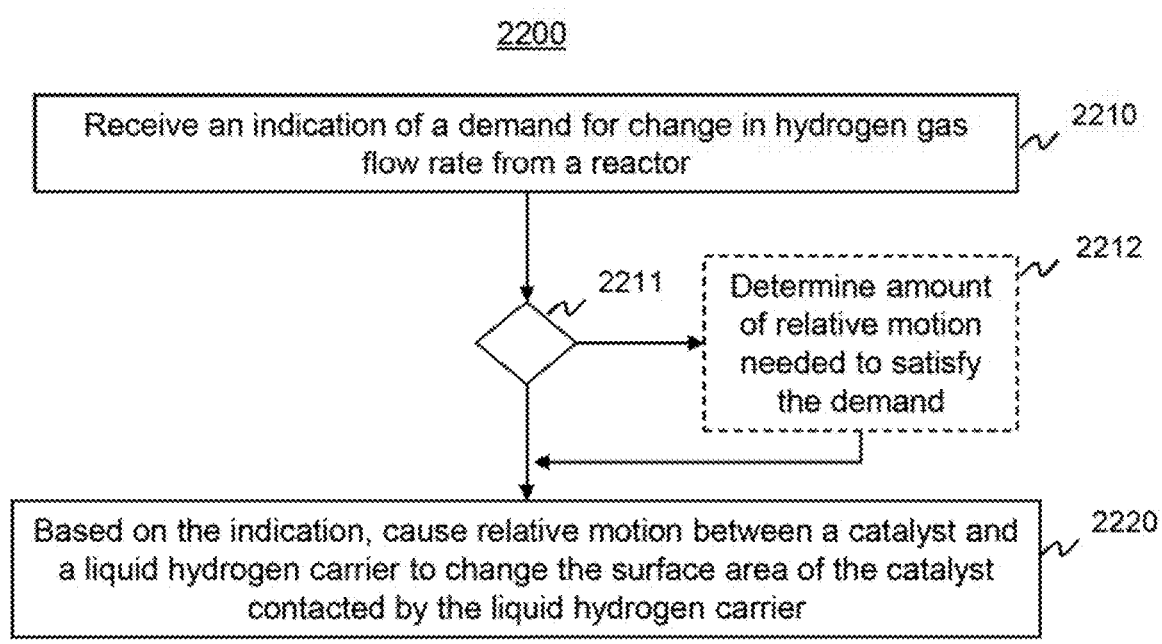
FIG. 22 shows an exemplary process of regulating a motion of a catalyst relative to a liquid hydrogen carrier consistent with disclosed embodiments.

FIG. 22 shows an exemplary process 2200 for extracting hydrogen gas in a hydrogen gas reactor using a liquid hydrogen carrier. Process 2200 may be performed, for example, using systems 1600 or 1800, described above. At step 2210, process 2200 may include receiving an indication of a demand for a change in hydrogen gas flow rate from a reactor. In some embodiments, the indication may be received as an electronic indicator received by the system. For example, a user of the system, or a user of a device powered by the system (e.g., a device powered by fuel cell 130), may transmit an indicator based on a need for increased or decreased flow rate of hydrogen gas. For example, user 11 (FIG. 1) may provide an indicator through user interface 16, a user interface associated with the device powered by the system, a mobile phone or another portable device, or the like. In some embodiments, the indicator may be transmitted automatically, for example, from the device powered by the system. For example, the indicator may be transmitted based on increased demand for power of the device and thus may indicate an increased demand in the flow rate of hydrogen. In other embodiments, the indication may be based on other variables, such as a pressure or rate of change in pressure in the hydrogen gas reactor 120 or in any other relevant component or system (e.g., a fuel cell powered by the hydrogen generation system, one or more hydrogen conduits, etc.).

At step 2220 of process 2200, based on the indication of a demand for a change in hydrogen gas flow rate, relative motion between a catalyst and a liquid hydrogen carrier may be caused to change the surface area of the catalyst contacted by the liquid hydrogen carrier. In some embodiments, step 2220 may include moving a catalyst linearly into and/or out of the liquid, hydrogen carrier. For example, as in system 1600, catalysts 121 may be raised or lowered within the hydrogen gas reactor 120 to change the surface area of catalysts 121 contacted by liquid hydrogen carrier 111. The catalysts may also be rotated into or out of contact with liquid hydrogen carrier 111, for example, as shown in FIG. 17. The liquid hydrogen carrier 111 may also be moved based on the indication of a demand for a change in hydrogen gas flow rate. Thus, in step 2220, causing the relative motion may include moving at least one wall or another movable element of an enclosure of the hydrogen gas reactor in order to move the liquid hydrogen carrier relative to the catalyst. For example, using system 1800 (FIG. 18), step 2220 may include raising or lowering piston 1801. In some embodiments, more than one element may be moved based on the indication, for example, by moving both the catalysts and the liquid hydrogen carrier 111.

Process 2200 may also include additional steps or substeps for extracting hydrogen gas. For example, process 2200 may include step 2212 of determining, based on the received indication of a demand for a change in flow rate of the hydrogen gas, an amount of relative motion between the catalyst and the liquid hydrogen carrier needed to provide a level of surface area contact between the catalyst and the liquid hydrogen carrier to satisfy the demand for the change in the flow rate of the hydrogen gas. Accordingly, process 2211 may include, an additional substep of determining whether to include step 2212, for example, based on settings or capabilities of the system. The amount of relative motion needed may be determined based on data, settings, or other information available to the system performing process 2200. For example, a system may include preprogrammed algorithms or data correlating a position of the catalyst or another movable element to a resulting flow rate. In some embodiments, the relative motion may be determined by the system based on historical data associated with the system. For example, the system may use a linear regression algorithm, machine learning or deep learning techniques, or other methods to develop a model to correlate the relative movement to a resulting flow rate. The system may also take other variables into account, such as a pressure value, a temperature value, the amount of hydrogen gas that has already been extracted from the liquid hydrogen carrier in the reactor, the time the liquid hydrogen carrier has been in the reactor, the lifecycle of the catalysts, etc. The determination of step 2212 may then be used in performing process 2220. For example, step 2220 may include causing the determined amount, of relative motion between the catalyst and the liquid hydrogen carrier.

Figure 23A:
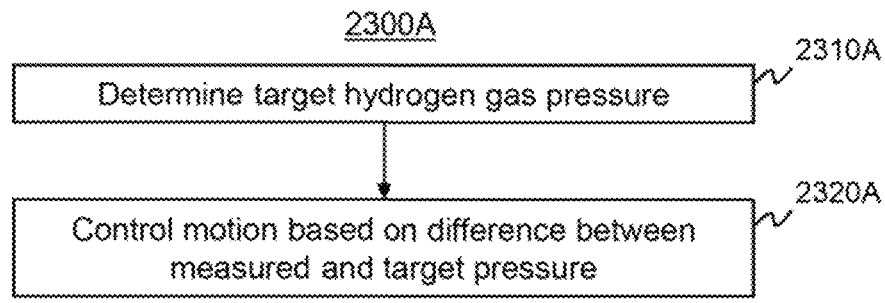
FIGS. 23A-23B show exemplary processes of regulating a motion of a catalyst relative to a liquid hydrogen carrier consistent with disclosed embodiments.
Figure 23B:
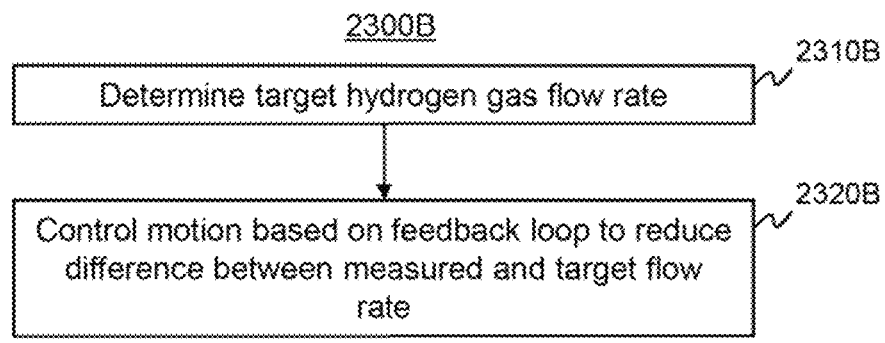
Figure 23C:
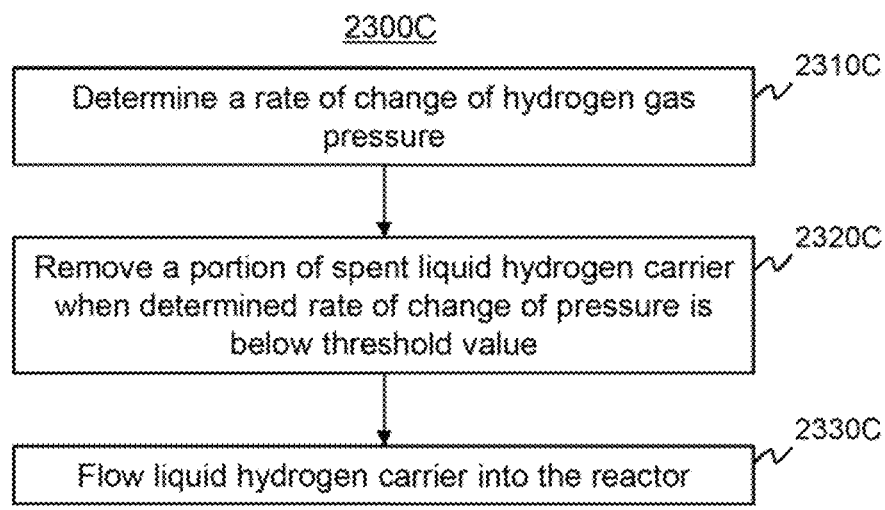
FIG. 23C shows an exemplary process of replenishing hydrogen gas reactor consistent with disclosed embodiments.

FIGS. 23A, 23B, and 23C show various other processes 2300A, 2300B, and 2300C associated with extracting hydrogen gas in a hydrogen gas reactor using a liquid hydrogen carrier. These processes may be performed separately, in various combinations with each other, or in combination with other processes of the disclosed embodiments. For example, processes 2300A, 2300B, and 2300C, or steps thereof, may be performed as part of process 2200 described above as additional steps, substeps or subprocesses.

FIG. 23A shows a process 2300A for controlling motion based on a target hydrogen gas pressure. In step 2310A, process 2300A may include determining a target hydrogen gas pressure. The target pressure may be determined based on data or settings associated with system 10. For example, the target pressure may be a fixed setpoint within system 10 or may be a calculated value based on other variables, such as a temperature or flow rate associated with the hydrogen gas reactor 120. In some embodiments, the target pressure may be determined based on a demand for a change in a flow rate of hydrogen gas, as indicated in process 2200.

At step 2320A, process 2300A may include controlling the motion of the catalyst relative to the liquid hydrogen carrier based on a difference between an observed pressure of the hydrogen gas in the hydrogen gas reactor and a target pressure value. Accordingly, the system performing process 2300A may detect or access an observed hydrogen gas pressure within the system. For example, the observed pressure may be obtained or determined based on one or more signals received from pressure sensors 1620, 1820 or 1821, as described above. This observed pressure may be compared to the target pressure determined in step 2310A. The system may then control a motion of the catalyst relative to the liquid hydrogen carrier based on the difference between the pressures by moving an element in hydrogen gas reactor 120 (e.g., a catalyst, the liquid hydrogen carrier, or both). For example, if the observed pressure in reactor 120 is greater than a target pressure, step 2310A may include moving the catalyst or another element in a manner to decrease the surface area of the catalyst in contact with the liquid hydrogen carrier. Such control may continue in a feedback loop arrangement to reduce, minimize, or eliminate a difference between the observed hydrogen gas pressure (or gas flow rate, or temperature, demand indicator, or any other quantity associated with operation of the hydrogen gas reactor) and a target hydrogen gas pressure (or gas flow rate, or temperature, demand indicator, or any other quantity associated with operation of the hydrogen gas reactor).

FIG. 23B shows a process 2300B for controlling motion based on a target hydrogen gas flow rate. In step 2310B, process 2300E may include determining a target flow rate of the hydrogen gas. Similar to the target pressure of process

2300A, the target flow rate may be determined based on data or settings associated with the system. For example, the target flow rate may include a fixed setpoint within system 10 or may include a calculated value based on other variables, such as temperature or pressure of the hydrogen gas reactor 120. In some embodiments, the target flow rate may be determined based on the demand for hydrogen flow of a fuel cell (such a fuel cell 130) or a device powered by the system (e.g., by a fuel cell).

In step 2320B, process 2300B may include controlling the motion of a catalyst relative to a liquid hydrogen carrier based on a feedback loop configured to reduce a difference between an observed hydrogen gas flow rate and the target flow rate of the hydrogen gas. Thus, the system performing process 2300B may determine or have access to an observed flow rate. This observed flow rate may be measured, for example, by a sensor in hydrogen gas reactor 120 or elsewhere in the system. In some embodiments, the flow rate may be calculated or estimated based on other variables, such as one or more measured pressure and/or temperature values in the system (in combination, for example, with known geometries of relevant conduits and/or other reactor components). Step 2320B may include moving a catalyst or other component to increase or decrease the surface area of the catalyst in contact with the liquid hydrogen carrier to decrease the difference between the observed and target flow rates. For example, the system may include a feedback loop or other various control loops or systems to reduce the difference between the observed and target flow rates. Such a feedback loop may be similar to the feedback loop described above in relative to FIG. 21, and such feedback-based control may be used to control the operation of the hydrogen gas reactor based on any observable quantity.

FIG. 23C shows a process 2300C for replacing spent liquid hydrogen carrier formed during an extraction process in a hydrogen gas reactor based on a rate of change of pressure in the reactor. Process 2300C may be used, for example, in conjunction with process 2200 to improve the hydrogen gas extraction. In step 2310C, process 2300C may include determining a rate of change of hydrogen gas pressure in the system using a pressure sensor. For example, signals received from pressure sensors 1620, 1820 and/or 1821 of hydrogen gas reactor 120 may be tracked over a time interval to determine a rate of change of pressure in the reactor. The system may also have access to a threshold pressure rate of change value, which may be a fixed value (e.g., based on a control setting of the system), or may be variable (e.g., based on a demand for hydrogen flow, concentration of metal borohydrides in liquid solution forming liquid hydrogen carrier, etc.). A rate of change in pressure below this threshold value may indicate that the reactor is extracting hydrogen at lower efficiency, for example, due to depletion of the liquid carrier in the reactor.

In step 2320C, the system may remove a portion of spent liquid hydrogen carrier when the determined rate of change of pressure is below the threshold value. In step 2330C, process 2300C may include flowing liquid hydrogen carrier into the hydrogen gas reactor. Using this process, spent or depleted liquid hydrogen carrier may be replaced to increase the hydrogen gas extraction rate. Therefore, the methods and systems described above, such as process 2200, may operate more efficiently.

In some embodiments, more than one hydrogen gas reactor may be arranged such that a continuous outflow of hydrogen gas to an external load may be provided. Such continuous outflow may be provided, for example, while spent liquid hydrogen carrier is replaced in one or more of the available hydrogen gas reactors. Such continuous outflow may be important to external loads to enable uninterrupted operation of the external systems supplied with hydrogen gas. To provide a continuous outflow of the hydrogen gas, the system may be configured to switch or alternate between reactors for supplying hydrogen gas to a shared output or outflow. As used herein, a continuous supply of hydrogen gas may refer to any supply of hydrogen gas in which the hydrogen gas flow rate may remain continuous, or substantially continuous, during a transition from receiving hydrogen gas primarily from a first hydrogen gas reactor to receiving hydrogen gas primarily from a second hydrogen gas reactor. In some cases, the continuous or substantially continuous gas flow rate during a transition from gas flow from a first hydrogen gas reactor to gas flow from a second hydrogen gas reactor may be constant or substantially constant during the transition. In other cases, the continuous supply of hydrogen gas may include hydrogen gas flow rate changes, but the overall hydrogen gas flow rate from a system of hydrogen gas reactors may be maintained above a threshold level (e.g., zero flow rate, 25% of a maximum output capability, 50% of a maximum output capability, etc.). In various embodiments, the system may be configured to supply hydrogen gas at a hydrogen gas flow rate according to the demand of an external load. In various embodiments, the hydrogen gas flow may depend on a pressure difference between the pressure in reactor 120 and the pressure required for the external load. In order to supply hydrogen gas at a hydrogen gas flow rate according to the demand of an external load, the pressure within reactor 120 may be maintained at a predetermined controlled value resulting in the demanded hydrogen gas flow rate.

Figure 24:
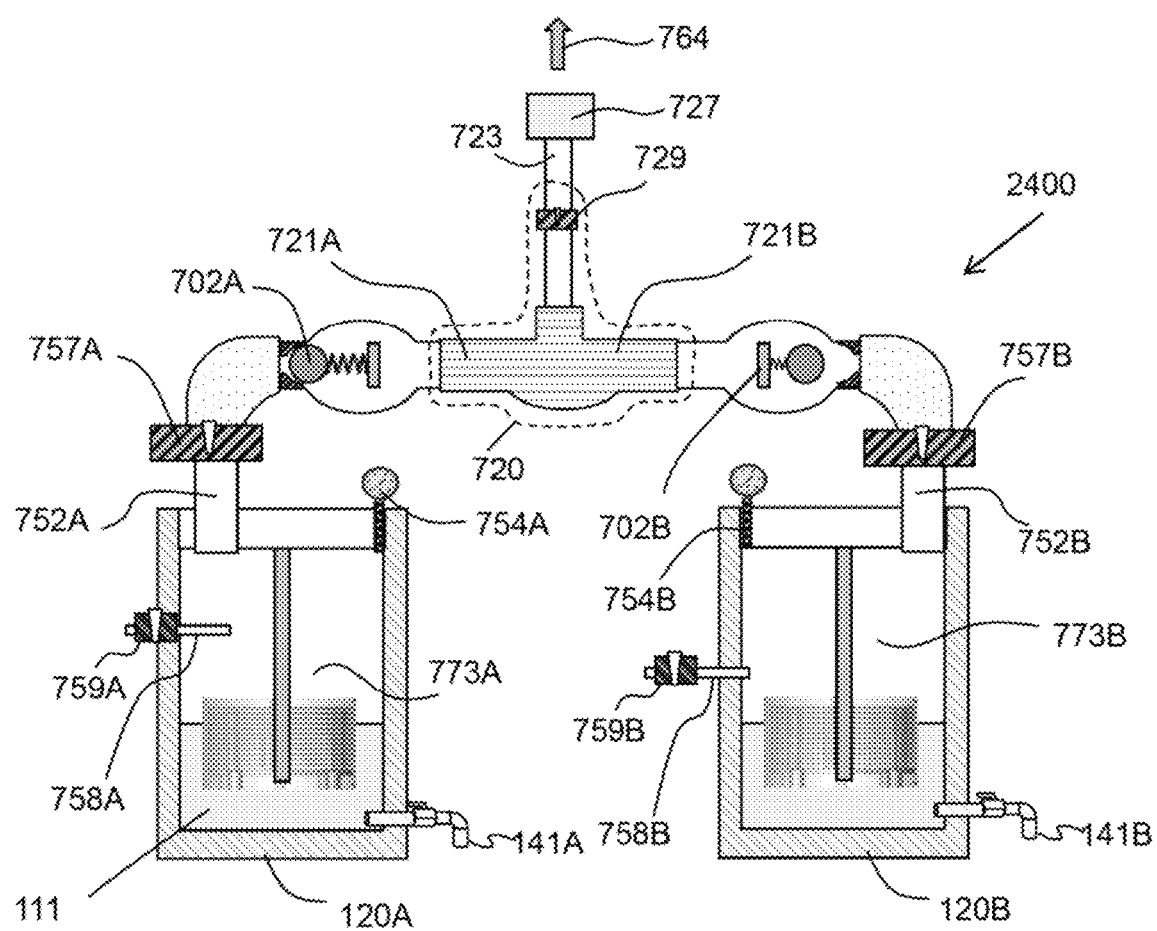
FIG. 24 shows an exemplary system of two hydrogen gas reactors consistent with disclosed embodiments.

In various embodiments, a system for extracting hydrogen gas using a liquid hydrogen carrier may include a first hydrogen gas reactor and a second hydrogen gas reactor. For example, FIG. 24 illustrates a system 2400 including a hydrogen gas reactor 120A and a hydrogen gas reactor 120B. In various embodiments, hydrogen gas reactor 120A may have a gas outlet 752A that may include a check valve 702A. The check valve may be configured to allow hydrogen gas to flow from hydrogen gas reactor 120A while preventing the flow of the hydrogen gas in the opposite direction. When describing check valve 702A, the hydrogen gas reactor 120A side of check valve 702A is referred to as an inflow side of check valve 702A, and the other side of check valve 702A is referred to as an outflow side. Similarly, hydrogen gas reactor 120B may be configured to have a gas outlet 752B that may include a check valve 702B having a corresponding inflow side (i.e., the side that is close to hydrogen gas reactor 120B) and an outflow side.

In various embodiments, gas outlets 752A and 752B may be connected to a hydrogen gas flow conduit 720 that is configured to receive hydrogen gas from hydrogen gas reactor 120A via a branch 721A, and receive hydrogen gas from hydrogen gas reactor 120B via branch 721B. Hydrogen gas flow conduit 720 may be configured to flow hydrogen gas to an outflow end 723, as shown in FIG. 24. In some embodiments, hydrogen gas flow conduit 720 may include a valve 729 in the proximity of outflow end 723 allowing for additional control of a hydrogen gas flow rate through hydrogen gas flow conduit 720. In some embodiments, a pump 727 (or any other type of pressure regulating component or system such as a compressor) may be used at the outflow end 723 to control the pressure at outflow end 723. Additionally, or alternatively, a flow rate of hydrogen gas at outflow end 723 may be controlled independently or concurrently with controlling the pressure at outflow end 723 (e.g., using valve 729).

In various embodiments, hydrogen gas reactor 120A and 120B may be configured to extract hydrogen gas by exposing the liquid hydrogen carrier 111 to catalyst 121, as discussed above. In various embodiments, hydrogen was reactor 120A and 120B may be similar to or the same as any of the hydrogen gas reactors described herein, including the hydrogen gas reactor shown in FIG. 7A. For example, hydrogen gas reactor 120A (120B) may include catalyst 121A (121B) with at least some surface area that may be wetted by liquid hydrogen carrier 111. Further, during operation hydrogen gas reactor 120A (120B) may include hydrogen gas 773A (773B) occupying a portion of hydrogen gas reactor 120. Hydrogen gas reactor 120A (120B) may also include various other components similar to components of hydrogen gas reactor 120 shown, in FIG. 7A. Similar to the embodiments discussed above, liquid hydrogen carrier 111 may flow in and out of hydrogen gas reactor 120A (120B). When liquid hydrogen carrier 111 flows into hydrogen gas reactor 120A (120B) the pressure in hydrogen gas reactor 120A (120B) may increase due to a reduction of the volume occupied by hydrogen gas 773A (773B). When liquid hydrogen carrier 111 flows from hydrogen gas reactor 120A (120B), the pressure in hydrogen gas reactor 120A (120B) may decrease due to an expansion of the volume occupied by hydrogen gas 773A (773B). In other cases, liquid hydrogen carrier 111 may flow into or out of hydrogen gas reactor 120A (120B) in response to a pressure differential between a liquid hydrogen carrier reservoir and a respective hydrogen gas reactor 120A (120B). When pressure drops in a hydrogen gas reactor, additional liquid hydrogen carrier may flow into that hydrogen gas reactor to equalize the pressure. In other cases, when pressure rises in a hydrogen gas reactor, liquid hydrogen carrier may flow out of that hydrogen gas reactor to equalize the pressure.

In various embodiments, system 2400 is used to extract hydrogen gas (e.g., hydrogen gas 773A) from liquid hydrogen carrier 111 and utilize gas 773A as a fuel for an external load (e.g., fuel cell, combustion engine, etc.). Thus, in various embodiments, hydrogen gas reactor 120A may include gas outlet 752A as shown in FIG. 7A configured to flow hydrogen gas 773 from hydrogen gas reactor 120 to various external loads. In various embodiments, a minimum pressure may be established or maintained for compatibility with a particular external load system. For example, certain fuel cell applications may require a minimum hydrogen gas pressure for operation. In order to obtain such minimum pressure, or any other desired pressure level, check valve 702A (702B) may allow the flow of hydrogen gas 773A (773B) out of hydrogen gas reactor 120A (120B) when the pressure in hydrogen gas reactor 120A (120B) exceeds the minimum pressure required by the external load (or when the pressure in hydrogen gas reactor 120A or 120B exceeds a minimum operational pressure associated with the hydrogen gas production system).

Gas outlet 752A may have an additional valve 757A that may be operated by user 11, by a controller (e.g., a mechanical device receiving instructions, such as electrical signals from a computing system 15), or by a combination of thereof. In an example embodiment, computing system 15 may allow user 11 to control operational aspects of valve 757 via interface system 16.

In various embodiments, the pressure at the outflow end 723 of hydrogen gas flow conduit 720, as well as the pressure of hydrogen gas 773A in hydrogen gas reactor 120A, may be used to determine a hydrogen gas flow rate 764 out of hydrogen gas reactor 120A via gas outlet 752A. Additionally, a position of valve 757A may control/affect overall hydrogen gas flow rate 764. Pressure 723 may be controlled by a pump, or it may correspond to ambient pressure (i.e., the pressure in an environment), or a pressure within or associated with an exemplary external load (or one or more components associated with an external load). In various embodiments, in response to an increase in hydrogen gas flow rate 764 through gas outlet 752, the pressure within hydrogen gas reactor 120A (or 120B) may decrease. Similarly, in response to a decrease in hydrogen gas flow rate 764 through gas outlet 752, the pressure within hydrogen gas reactor 120A (or 120B) may increase.

In various embodiments, as shown, for example, in FIG. 7A, hydrogen gas reactor 120A (120B) may include a pressure sensor 754A (754B). Pressure data measured by pressure sensor 754A (754B) may be transmitted to computing system 15 for processing. In an example embodiment, the pressure data obtained by sensor 754A (754B) may be displayed for user 11 via user interface 16. In some cases, hydrogen gas 773A (773B) may be released from hydrogen gas reactor 120A (120B) via a safety hydrogen gas conduit 758A (758B) using a safety valve 759A (759B). For example, hydrogen gas 773A (773B) may be released when the pressure within hydrogen gas reactor 120A (120B) is above the threshold value such as the maximum tolerance pressure level. Hydrogen gas reactors 120A and 120B may also include purge outlets 141A and 141B for expelling liquid hydrogen carrier 111 (or spent liquid hydrogen carrier 112) from the corresponding reactor 120A (120B). In an example embodiment, partial or complete removal of liquid hydrogen carrier 111, via purge outlet 141A (141B) from reactor 120A (120B) may lead to decrease or termination of hydrogen extraction from liquid hydrogen carrier 111.

In various embodiments, computing system 15 may evaluate the pressure in hydrogen gas reactor 120A/120B using data obtained from pressure sensor 754A (754B), and open, close or partially open valve 759A (759B) to release hydrogen gas 773A (773B) out of hydrogen gas reactor 120. In various embodiments computing system 15 may control valve 759A (759B) by means of a controller such as a mechanical actuator actuated by a motor.

In various embodiments shown in FIG. 24 as well as FIG. 7A, different types of valves may be used. For example, valve 702A and 702B may constitute check valves, valve 759A (759B) may include a safety valve such as a pressure relief valve. In some embodiments, valve 757A (757B) may include a gate valve, a globe valve, a plug valve, a ball valve, or a check valve, etc.

In various embodiments, computing system 15 may be configured to monitor pressure within hydrogen gas reactor 120A (120B) (e.g., by monitoring pressure data obtained by sensor 754A or 754B) and control opening and closing (or partially opening) of valves 757A (757B) to control pressure within hydrogen gas reactor 120A (120B). In various embodiments, because valve 702A (702B) may include a check valve, such valves may be controlled by a pressure difference between the inflow and the outflow side of the check valve. Computing system 15 may indirectly control the operation of valves 702A (702B), for example, by controlling pressures upstream of the valves that control the opening and closing of the check valves. It should be noted, however, that valve 702A (702B) may include some parameters that may be more directly controlled by computing system 15. For example, valve 702A (702B) may have an adjustable parameter controlling a pressure threshold value.

Figure 26:
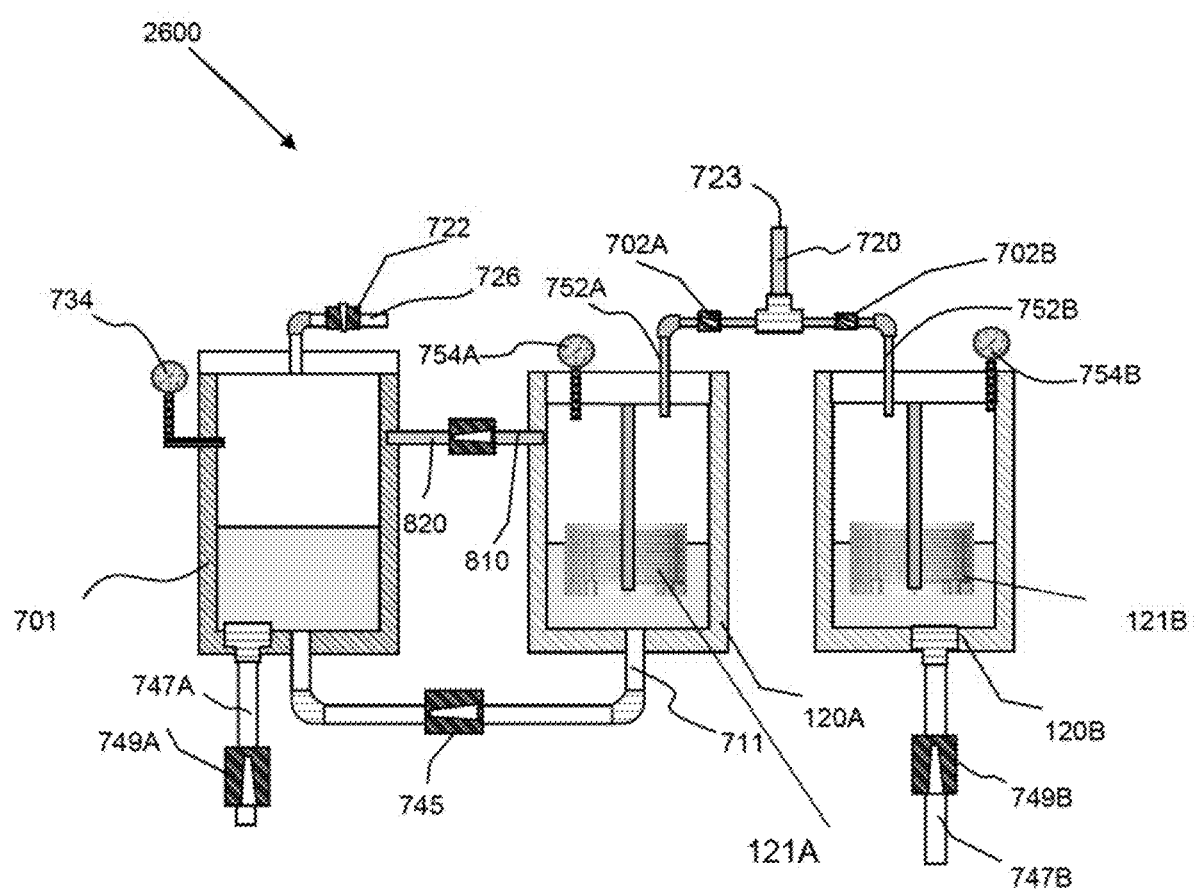
FIG. 26 shows an exemplary system of two hydrogen gas reactors and a liquid hydrogen carrier reservoir connected to one of the reactors consistent with disclosed embodiments.

As referenced herein, unless otherwise noted, the term "pressure threshold value" refers to a minimum pressure difference across an exemplary check valve (e.g., tire pressure difference between the inflow side and the outflow side for valve 702A or 702B) that is needed for the check valve to open. In an example embodiment, when valve 702A (702B) is configured to have an adjustable parameter controlling the pressure threshold value, computer system 15 may be configured to adjust this parameter. In some embodiments, valve 702A (702B) may have other parameters that may be adjusted by computing system 15. For example, the cross-sectional area available for hydrogen gas flowing within valve 702A (702B) may be adjusted. In various embodiments, check valves 702A and 702B may include swing check valves, lift check valves, ball check valves (e.g., ball check valves 702A and 702B as shown in FIG. 26) and the like.

In various embodiments, computing system 15 may receive instructions from user 11 via user interface 16 and adjust pressure within hydrogen gas reactor 120A (120B) by opening or closing one or more valves (e.g., valves 757A, and 759A for hydrogen gas reactor 120A). Additionally, or alternatively, computing system 15 may open/close one or more valves of hydrogen gas reactor 120A to control the pressure within hydrogen gas reactor 120A within a range of target pressure values or to control the pressure to match target pressure in hydrogen gas reactor 120A. Additionally or alternatively, system 15 may adjust parameters of check valve 702A as described above. Computing system 15 may be configured to open and close the valves using a controller (e.g., a motor for opening and closing the valves). For example, computing system 15 may be configured to open and close valve 759A to match the target pressure in hydrogen gas reactor 120A. In some embodiments, computing system 15 may be configured to receive pressure data obtained by sensor 754A, and open or close valve 759A and/or 757A in response to the received pressure.

While embodiments shown in FIG. 24 describe a hydrogen gas production system including two hydrogen gas reactors 120A and 120B, other configurations are possible. For example, several hydrogen gas reactors may be included in an overall hydrogen gas production system. In such cases, any number of hydrogen gas reactors may share a common hydrogen gas flow conduit 720 via corresponding gas outlets. Alternatively, more than one hydrogen gas flow conduit may be present with each hydrogen gas flow conduit connected to gas outlets of several hydrogen gas reactors. For example, when multiple external loads are present, a hydrogen gas flow conduit may be selected for a given external load. The selected hydrogen gas flow conduit may be configured to direct hydrogen gas from multiple hydrogen gas reactors to the given external load.

In the embodiment of FIG. 24, system 2400 may include synchronized reactors wherein the term "synchronized" may refer to an operational characteristic in which hydrogen gas is continuously provided from a hydrogen gas production system including two or more hydrogen gas reactors. For example, the gas flow outputs from more than one hydrogen gas reactor may be synchronized to provide a continuous or substantially continuous hydrogen gas flow rate from the hydrogen production system (e.g., through outflow 723). Such synchronization may be achieved by supplying a desired hydrogen gas flow rate primarily or exclusively from one hydrogen gas reactor (e.g., 120A) and subsequently supplying the desired hydrogen gas flow rate primarily or exclusively from another available hydrogen gas reactor (e.g., 120B) when one or more hydrogen gas reactors are no longer able to maintain the desired hydrogen gas flow rate (or when such an inability to supply the desired hydrogen gas flow rate is determined to be imminent).

In an example embodiment, system 2400 may be configured to alternate between using reactor 120A and reactor 120B. For example, system 2400 may use reactor 120A to supply hydrogen gas to an external load, while preventing reactor 120B from supplying hydrogen gas (i.e., blocking reactor 120B). As defined herein unless otherwise noted, a reactor is "engaged" when it is used to supply hydrogen gas to an external load, and the reactor is "disengaged" when it is not used to supply hydrogen gas to an external load. Additionally, the reactor is said to be "re-engaged" if it is engaged after a former transition from engaged to disengaged. For example, reactor 120B may be disengaged by closing valve 757B. Reactor 120A (120B) may be disengaged either due to closing check valve 702A (702B), due to closing valve 757A (757B) or due to closing both of the valves. Reactor 120A (120B) may be engaged due to opening both valve 702A (702B) and valve 757A (757B).

Reactor 120A may supply hydrogen gas to an external load via branch 721A while there is a sufficient pressure difference across check valve 702A (i.e., the pressure difference across check valve 702A is larger than a pressure threshold value). In an embodiment, reactor 120B may be disengaged by closing valve 757B. When the pressure difference across check valve 702A is about (or approaching) the pressure threshold value for check valve 702A (e.g., the pressure difference across check valve 702A may be higher than the pressure threshold value, by five, ten, twenty percent or any other suitable value), valve 757B of reactor 120B may be opened prior to check valve 702A closing (e.g., due to pressure difference across check valve 702A falling below the pressure threshold value). By opening valve 757B, reactor 120B may be engaged in supplying hydrogen gas to the external load via branch 721B. In an example embodiment, after check valve 702A closes, valve 757A may be closed resulting in reactor 120A being disengaged.

In various embodiments, while reactor 120B is engaged, hydrogen gas pressure in reactor 120A may increase to a sufficiently high level that may allow re-engaging reactor 120A. For example, the hydrogen gas pressure in reactor 120A may increase such that, when valve 757A is opened, the pressure difference across check valve 702A is above the pressure threshold value. In an example embodiment, the pressure difference across check valve 702A may be higher than the pressure threshold value, by five, ten, twenty percent or any other suitable value. If hydrogen gas pressure in reactor 120A is sufficiently high (as described above), reactor 120A may be re-engaged, and reactor 120B may be disengaged by closing valve 757B. In various cases engaging reactor 120A by opening valve 757A may lead to disengaging reactor 120B by closing valve 757B and vice versa, engaging reactor 120B by opening valve 757B may lead to disengaging reactor 120A by closing valve 757A.

In an alternative embodiment, both valves 757A and 757B may be both opened resulting in check valves 702A and 702B determining which reactor 120A or 120B is being engaged. In an example embodiment, reactor 120A may be disengaged and reactor 120B may be engaged when hydrogen gas pressure associated with gas outlet 752A is lower by a predetermined pressure value than a hydrogen gas pressure associated with gas outlet 752B. In some embodiments, reactor 120A and 120B may both be engaged to supply hydrogen gas to an external load. In various embodiments, the selected pressure value may be a few psi to a few bars, and in some embodiments, the predetermined pressure value may be a parameter that may be controlled by computing system 15. In some embodiments, the pressure threshold value for check valves 702A and 702B may be selected to control the engagement/disengagement of reactor 120A and reactor 120B as well as a pressure value at the outflow side of check valve 702A and 702B.

System 2400 may alternate between engaging reactors 120A and 120B until one of the reactors (e.g., 120A) does not contain enough liquid hydrogen carrier 111 to allow hydrogen extraction of a desired level (e.g., when the liquid hydrogen carrier releases hydrogen and becomes a spent liquid hydrogen carrier). In an example embodiment, reactor 120A does not contain enough liquid hydrogen carrier 111 if hydrogen gas pressure in reactor 120A cannot increase to a sufficiently high level, when reactor 120 is not releasing hydrogen gas to the external load, to overcome a check valve minimum operating pressure, to meet a hydrogen gas demand, to exceed a pressure associated with another hydrogen gas reactor, etc. For example, the pressure in reactor 120A may be sufficiently low to cause a pressure difference across check valve 702A to be below the pressure threshold value. Alternatively, reactor 120A may be considered not to contain enough liquid hydrogen carrier 111 when the pressure in reactor 120A may be just high enough to cause a pressure difference across check valve 702A to be slightly above the pressure threshold value (e.g., when pressure difference across check valve is five, ten, or twenty percent higher than the pressure threshold value).

In various embodiments, when reactor 120A does not contain enough liquid hydrogen carrier 111, it may be replenished (e.g., spent liquid hydrogen carrier 112 may be flowed front reactor 120A, and liquid hydrogen carrier 111 may be flowed into reactor 120A) as described further below. In various embodiments, reactor 120B may be configured to contain enough liquid hydrogen carrier 111 and may be engaged in supplying hydrogen gas to the external load while reactor 120A is being replenished.

In some cases, the synchronization of the hydrogen gas output through outflow 723 may be maintained with the configuration shown in FIG. 24. For example, check valves 702A and 702B may operate synchronously in order to maintain a continuous or substantially continuous hydrogen pressure/hydrogen gas flow rate at outflow 723. In some cases, the continuous flow rate may be constant or substantially constant. Such synchronous operation may include one check valve opening (e.g., 702A) while another one of the check valves (e.g., 702B) closes to maintain hydrogen gas pressure/flow at outflow 723. For instance, if the pressure in hydrogen gas reactor 120A is greater than the pressure in hydrogen gas reactor 120B by a certain pressure value, check valves 702A and 702B may be configured to respond to this difference in pressure by the opening of check valve 702A and closing of check valve 702B. Similarly, if the pressure in hydrogen gas reactor 120B is greater than the pressure in hydrogen gas reactor 120A by a certain pressure value, the difference in pressure leads to an opening of check valve 702B and closing check valve 702A. FIG. 24 shows an embodiment when check valve 702B is open and cheek valve 702A is closed. In various embodiments, check valve 702A (702B) is configured to allow a flow of the hydrogen gas from the hydrogen gas reactor 120A (120B) towards outflow end 723 of hydrogen gas flow conduit 720 when a pressure difference between the inflow side and the outflow side of check valve 702A (702B) is positive and above a threshold value.

While the operation described above is made relative to a condition in which there is a need for maintaining a continuous hydrogen gas output (which may be constant or substantially constant) either from hydrogen gas reactor 120A or hydrogen gas reactor 120B (or from any other available gas reactor), it should be noted that while a continuous supply may be a goal of the system, there may be instances where a flow rate of hydrogen gas may be increased or decreased. For example, in some cases, two or more hydrogen gas reactors may operate in tandem (or together), each being associated with a certain pressure level within a respective hydrogen reactor enclosure (or hydrogen gas pressure at an upstream end of a respective check valve, such as check valve 702A or 702B). In such cases, the check valves at the respective hydrogen gas reactor outputs (e.g., 702A and 702B) may operate such that the hydrogen gas flow at outflow 723 originates primarily or exclusively from a hydrogen gas reactor having a highest instantaneous pressure. In other words, the respective check valves may operate to allow flow from the gas reactor having the highest gas pressure, while blocking flow from other hydrogen gas reactors. If there is a need for increasing a hydrogen gas flow at outflow 723, such an increase may be affected, in some embodiments, by increasing a rate of hydrogen gas extraction from any available hydrogen gas reactor. As a hydrogen gas extraction rate increases from a particular hydrogen gas reactor, the pressure upstream of its respective outflow check valve will also increase. Once that pressure exceeds a pressure at the downstream side of the respective check valve, that check valve will open, and the hydrogen gas output of the overall system flowing from outflow 723 will be supplied by the particular hydrogen gas reactor in which the hydrogen gas extraction rate was increased.

In various embodiments, regardless of a particular operational scheme, system 2400 may be configured to flow the extracted hydrogen gas from hydrogen gas, reactor 120A through check valve 702A and block a flow of hydrogen gas from hydrogen gas reactor 120B through check valve 702B, when hydrogen gas pressure within gas outlet 752A of hydrogen gas reactor 120A is higher than hydrogen gas pressure within 752B of hydrogen gas reactor 120B by a selected pressure value. Alternatively, system 2400 may be configured to flow the extracted hydrogen gas from hydrogen gas reactor 120B through check valve 702B and block a flow of hydrogen gas from hydrogen gas reactor 120A through check valve 702A, when hydrogen gas pressure within gas outlet 752B of hydrogen gas reactor 120B is higher than hydrogen gas pressure within of hydrogen gas reactor 120A by a selected pressure value. Such a synchronized operation among output check valves may enable the continuous hydrogen gas output (at a constant or non-constant level) of the disclosed overall hydrogen gas production system.

In an example embodiment, reactor 120A may be engaged first, while reactor 120B may be disengaged. For example, valve 757A and valve 702A may be opened to engage reactor 120A and valve 757B may be closed to disengage reactor 120B. Reactor 120A may be engaged when hydrogen gas pressure associated with gas outlet 752A is higher than a required pressure value that may be based on art external load. The required pressure value can be a pressure required by the external load or it can be any suitable required pressure value. For example, a required pressure value can be five, ten, twenty, fifty, sixty or hundred percent higher than the pressure required by the external load. While reactor 120A is engaged and supplies hydrogen gas to an external load, reactor 120A participates in a depletion process. As defined herein, unless otherwise noted, the term "depletion process" refers to a process of extracting hydrogen gas form liquid hydrogen carrier and supplying the extracted hydrogen gas to the external load. When the pressure in gas outlet 752A is lower than the required pressure value, the depletion process may be completed, and reactor 120A may be disengaged. When reactor 120A is disengaged (or shortly prior to that moment) reactor 120B may be engaged. While reactor 120B is engaged, reactor 120A may undergo recovery. As defined herein unless otherwise noted, the term "recovery" refers to reactor 120A increasing hydrogen gas pressure such that pressure in gas outlet 752A is higher than the required pressure value at the completion of the recovery. Reactor 120B may be engaged when hydrogen gas pressure associated with gas outlet 752B is higher than the required pressure value. When the pressure in gas outlet 752B is lower than the required pressure value, reactor 120B may be disengaged and reactor 120A may be re-engaged after completing recovery.

In various embodiments, the rate of recovery for a reactor (i.e. how quickly the reactor can recover) depends on an amount of concentration of the remained hydrogen stored in liquid hydrogen carrier present within the reactor. In various embodiments, system 2400 may be configured to operate when the recovery rate is sufficiently high. For example, for system 2400 containing two reactors, the recovery rate may be higher than the depletion rate (e.g., how quickly depletion for a reactor can be completed) for reactor 120A and 120B. For system 2400 containing multiple reactors, the recovery rate may be higher than the depletion rate divided by the number of other reactors presented in the system. In various embodiments, reactor 120A (120B) may be engaged when the recovery process is complete for reactor 120A (120B). When reactor 120A (120B) recovery rate is lower than the required recovery rate, reactor 120A (120B) may be replenished. Additionally, or alternatively, system 2400 may be configured to replenish reactor 120A (120B) when replenishing rate for reactor 120A (120B) is higher than depletion rate for the other reactor 120B (120A).

In various embodiments, system 2400 may be configured to replenish reactor 120A prior to reactor 120B completing the depletion process. This may ensure that system 2400 is operating continuously without interrupting a supply hydrogen gas to the external load. It should be noted, that while system 2400 is described as using two reactors such as reactor 120A and 120B, more than two reactors may be used. In various embodiments, at least one of the reactors of system 2400 may supply hydrogen gas to the external load during a replenishing process of one of the other reactors of system 2400.

Figure 25:
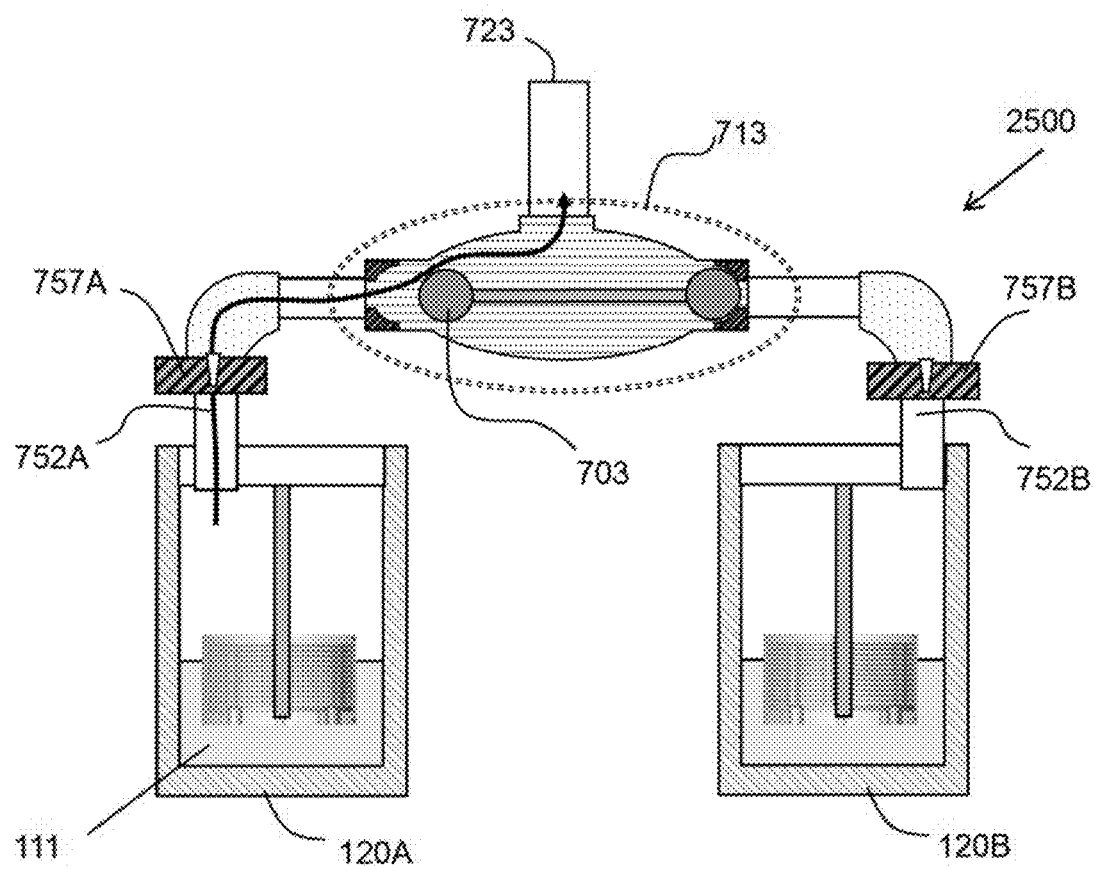
FIG. 25 shows another exemplary system of two hydrogen gas reactors consistent with disclosed embodiments.

FIG. 25, shows an illustrative system 2500, where instead of two check valves 702A and 702B, one check valve 703 is used. Check valve 703 may be designed to move inside an enclosure 713 where enclosure 713 may be part of hydrogen gas flow conduit 720. Single check valve 703 may be one example embodiment of a single check valve arrangement that can be used to selectively direct hydrogen gas from hydrogen gas reactor 120A or hydrogen gas reactor 120B. For example, check valve 703 may allow a flow of gas from reactor 120A, and may present a flow of gas from reactor 120B, and vice versa. It should be noted that there may be at least some period of time where check valve 703 is at least partially open to both reactor 120A and reactor 120B (e.g., during a transition of states of the check valve 703). Other valves may include dual-channel diverter valves and the like. Similar to the embodiment shown in FIG. 24, system 2500 shown in FIG. 25 may have valves 757A and 757B that may provide additional control over hydrogen gas flow from hydrogen gas reactor 120A and hydrogen gas reactor 120B.

FIG. 26 shows system 2600 that includes hydrogen gas reactor 120A, hydrogen gas reactor 120B and liquid hydrogen carrier reservoir 701 connected to hydrogen gas reactor 120A via liquid hydrogen carrier channel 711 for flowing liquid hydrogen carrier 111. Similar to hydrogen gas reactor 120 of system 700 as shown in FIG. 7A, hydrogen gas reactor 120A and hydrogen gas reactor 120B of system 2600 may include various elements that correspond to elements of hydrogen gas reactor 120. For example, hydrogen gas reactor 120A and hydrogen gas reactor 120B may include gas outlets 752A and 752B corresponding to gas outlet 752, as shown in FIG. 7A, and pressure sensors 754A and 754B corresponding to pressure sensor 754 catalysts 121A and 121B corresponding to catalyst 121. Additionally, as shown in FIG. 26, system 2600 includes elements that may be the same as elements of system 700 shown in FIG. 7A, such as liquid hydrogen carrier channel 711, liquid hydrogen carrier channel valve 745, as well as gas connecting channel 810, gas connecting channel valve 820, pressure sensor 734, valve 722 and branch 726 and the like. In addition, system 2600 may include inflow liquid hydrogen carrier channels 747A, and 747B as well as valves 749A and 749B. In various embodiments, system 2600 also includes hydrogen gas (low conduit 720 as well as check valves 702A and 702B. It should be noted, that similar elements of system 2600 and system 700 may function in a similar way. For example, liquid hydrogen carrier channel 711 may be configured to flow liquid hydrogen carrier 111 between liquid hydrogen carrier reservoir 701 and hydrogen gas reactor 120A in response to a pressure difference between liquid hydrogen carrier reservoir 701 and hydrogen gas reactor 120A, among other similarities.

One potential benefit of synchronized hydrogen gas reactor operation may include an ability to provide a continuous flow of hydrogen gas at outflow end 723 of hydrogen gas flow conduit 720. Such a continuous flow may be maintained, for example, when one of hydrogen gas reactor 120A or hydrogen gas reactor 120B, is not operational (e.g., when reactor 120A or 120B does not extract hydrogen gas from liquid hydrogen carrier 111 or does not (or cannot) extract sufficient hydrogen gas from the liquid hydrogen carrier to satisfy a particular demand for hydrogen gas). For example, one of the reactors may undergo maintenance procedures, or one of the reactors may require refueling. During such procedures relative to one or more reactors, the disclosed embodiments may seamlessly and continuously be able to supply hydrogen gas from at least one other, available hydrogen gas reactor.

Figure 27:
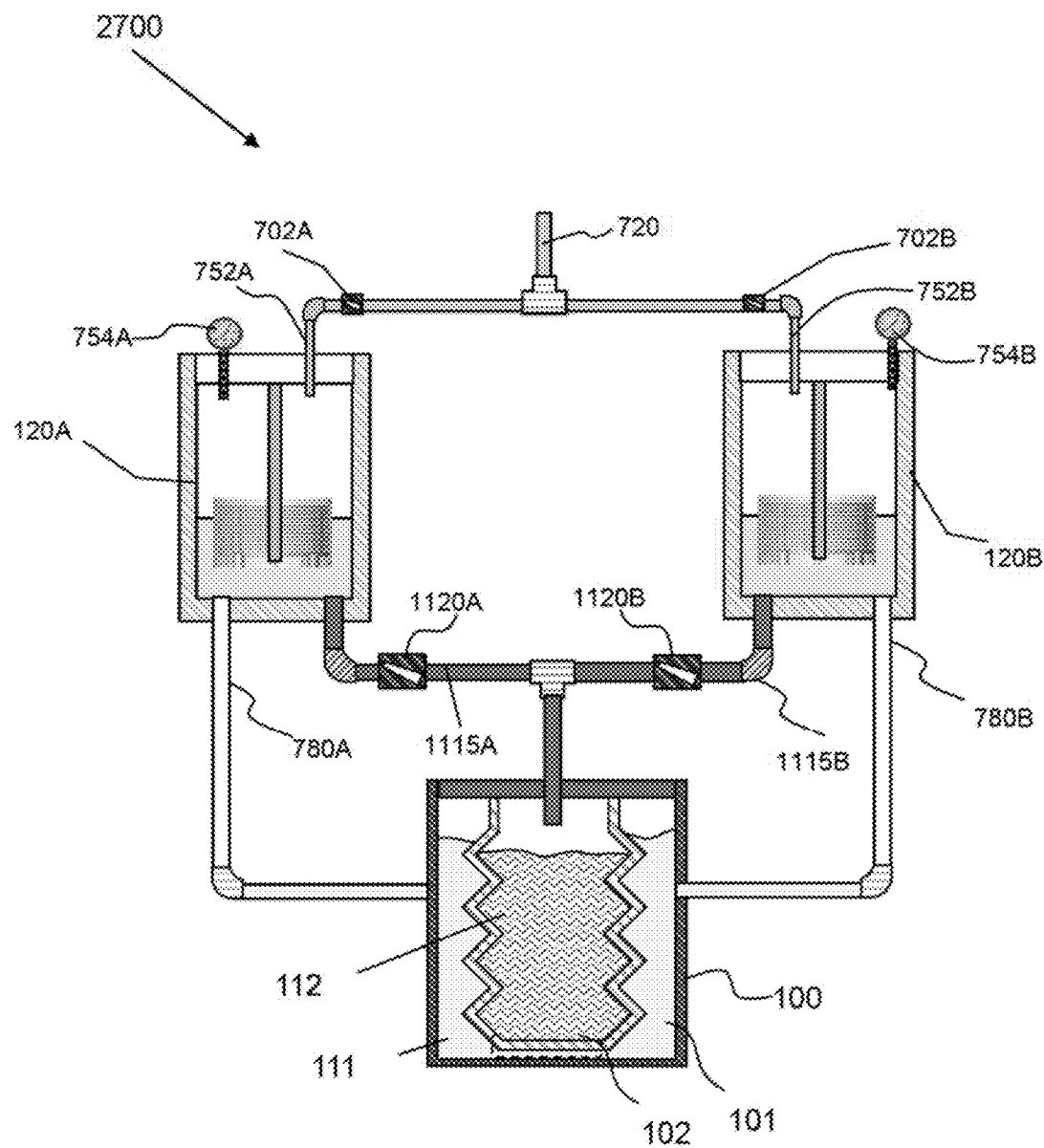
FIG. 27 shows an exemplary system of two hydrogen gas reactors and a spent liquid hydrogen carrier conduit connected to both reactors consistent with disclosed embodiments.

FIG. 27 shows an example system 2700 including hydrogen gas reactor 120A, hydrogen gas reactor 120B, gas outflow 752A and 752B, check valves 702A and 702B, hydrogen gas flow conduit 720, pressure sensors 754A and 754B, as well as liquid hydrogen carrier channels 780A and 780B for flowing liquid hydrogen carrier 111 from liquid hydrogen carrier tank 100 to respective hydrogen gas reactor 120A and hydrogen gas reactor 120B. In various embodiments, channels 780A and 780B may be configured to flow liquid hydrogen carrier 111 from chamber 101 of liquid hydrogen carrier tank 100, for example, by using a pump.

In various embodiments, hydrogen gas reactor 120A or hydrogen gas reactor 120B may be configured to dispose of spent liquid hydrogen carrier 112 when most or all of hydrogen gas 773 has been extracted from liquid hydrogen carrier 111. Similar to the embodiment of system 1100 as shown in FIG. 11, liquid hydrogen carrier tank 100 may be connected to hydrogen gas reactor 120A and hydrogen gas reactor 120B via a respective spent liquid hydrogen carrier channel 1115A and a spent liquid hydrogen carrier channel 1115B configured to carry spent liquid hydrogen carrier 112 front hydrogen gas reactor 120A and hydrogen gas reactor 120B respectively to chamber 102 of liquid hydrogen carrier tank 100. In various embodiments, spent liquid hydrogen carrier channel 1115A and spent liquid hydrogen carrier channel 1115B may include corresponding valves such as spent liquid hydrogen carrier channel valve 1120A and spent liquid hydrogen carrier channel valve 1120B configured to open and close a flow of spent liquid hydrogen carrier 112 between hydrogen gas reactor 120A or hydrogen gas reactor 120B and chamber 102. Similar to embodiments related to system 1100, as discussed above, system 2700 may be configured to flow spent liquid hydrogen carrier 112 from hydrogen gas reactor 120 into chamber 102 of liquid hydrogen carrier tank 100 when there may be no significant change in observed pressure in hydrogen gas reactor 120 when check valve 702 is closed.

In various embodiments, to ensure that hydrogen gas reactor 120A and hydrogen gas reactor 120B are not disposing of spent liquid hydrogen carrier 112 at the same time, hydrogen gas reactor 120A may be started first using any of the startup processes 1200A-1200E followed by hydrogen gas reactor 120B using any of the startup processes 1200A-1200E. In an example embodiment, a time delay between startup of hydrogen gas reactor 120A and hydrogen gas reactor 120B may be about half of the time needed for the entire main working cycle (referred here as a half-time) of hydrogen gas reactor 120A or hydrogen gas reactor 120B. Additionally, replenishing process (i.e., process of disposing spent liquid hydrogen carrier 112 and flowing liquid hydrogen carrier 111 into hydrogen gas reactor 120A or hydrogen gas reactor 120B or liquid hydrogen carrier reservoir 701 that may be connected to one of the reactors via liquid hydrogen carrier channel 711), may be configured to be shorter than the half-time, to ensure continuous flow of hydrogen gas via hydrogen gas flow conduit 720. In some embodiments, to reduce the time required for the replenishing process, the replenishing process may be activated even if there is an observable (and possibly significant) change in observed pressure in hydrogen gas reactor 120A (hydrogen gas reactor 120B) when check valve 702A (702B) is closed. In an example embodiment, replenishing process may be activated at a fraction of time of the main working cycle and may include disposing of least a fraction of liquid hydrogen carrier 111 that may be only partially depleted of hydrogen gas.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent, from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for extracting hydrogen gas using a liquid hydrogen carrier, the system comprising:
   a hydrogen gas reactor comprising an enclosure, the enclosure being configured to hold the liquid hydrogen carrier;
   a liquid hydrogen carrier conduit for delivering the liquid hydrogen carrier into and out of the hydrogen gas reactor;
   a hydrogen gas conduit for flowing the hydrogen gas out of the hydrogen gas reactor; and
   a catalyst configured to selectively move linearly into and out of the liquid hydrogen carrier, when the liquid hydrogen carrier is present in the hydrogen gas reactor, to generate the hydrogen gas in response to contact between the catalyst and the liquid hydrogen carrier.

2. The system of claim 1, further comprising:
   a mechanical linkage attached to the catalyst; and
   a motor configured to control a motion of the catalyst via the mechanical linkage.

3. The system of claim 1, wherein the enclosure of the hydrogen gas reactor comprises a contractible bladder.

4. The system of claim 1, further comprising:
   a pressure sensor configured to generate an output indicative of a pressure associated with the hydrogen gas reactor; and
   a control system configured to cause movement of the catalyst by an amount determined based on a difference between a target pressure value and the pressure associated with the hydrogen gas reactor, as indicated by the output of the pressure sensor.

5. The system of claim 1, further comprising:
   a temperature sensor configured to generate an output indicative of a temperature associated with the hydrogen gas reactor; and
   a control system configured to cause cooling of the hydrogen gas reactor in response to a sensed difference between a target temperature value and the temperature associated with the hydrogen gas reactor, as indicated by the output of the temperature sensor.

6. A system for extracting hydrogen gas using a liquid hydrogen carrier, the system comprising:

a hydrogen gas reactor comprising an enclosure, the enclosure being configured to hold the liquid hydrogen carrier, wherein the enclosure of the hydrogen gas reactor comprises a contractible bladder; and a catalyst configured to selectively move into and out of the liquid hydrogen carrier, when the liquid hydrogen carrier is present in the hydrogen gas reactor, to generate the hydrogen gas in response to contact between the catalyst and the liquid hydrogen carrier.

7. A system for extracting hydrogen gas using a liquid hydrogen carrier, the system comprising:

a hydrogen gas reactor comprising an enclosure, the enclosure being configured to hold the liquid hydrogen carrier;

a catalyst configured to selectively move into and out of the liquid hydrogen carrier, when the liquid hydrogen carrier is present in the hydrogen gas reactor, to generate the hydrogen gas in response to contact between the catalyst and the liquid hydrogen carrier;

a pressure sensor configured to generate an output indicative of a pressure associated with the hydrogen gas reactor; and a control system configured to cause movement of the catalyst by an amount determined based on a difference between a target pressure value and the pressure associated with the hydrogen gas reactor, as indicated by the output of the pressure sensor.

8. A system for extracting hydrogen gas using a liquid hydrogen carrier, the system comprising:

a hydrogen gas reactor comprising an enclosure, the enclosure being configured to hold the liquid hydrogen carrier; and a catalyst configured to selectively move into and out of the liquid hydrogen carrier, when the liquid hydrogen carrier is present in the hydrogen gas reactor, to generate the hydrogen gas in response to contact between the catalyst and the liquid hydrogen carrier;

a temperature sensor configured to generate an output indicative of a temperature associated with the hydrogen gas reactor; and a control system configured to cause cooling of the hydrogen gas reactor in response to a sensed difference between a target temperature value and the temperature associated with the hydrogen gas reactor, as indicated by the output of the temperature sensor.

* * * * *